(12) United States Patent
Wakutsu et al.

(10) Patent No.: US 11,836,075 B2
(45) Date of Patent: *Dec. 5, 2023

(54) CONTROLLING METHOD OF A MEMORY CARD

(71) Applicant: Kioxia Corporation, Tokyo (JP)

(72) Inventors: Takashi Wakutsu, Kamakura (JP); Shuichi Sakurai, Yokohama (JP); Kuniaki Ito, Funabashi (JP); Yasufumi Tsumagari, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,466

(22) Filed: Aug. 10, 2022

(65) Prior Publication Data
US 2022/0391319 A1 Dec. 8, 2022

Related U.S. Application Data

(63) Continuation of application No. 17/066,906, filed on Oct. 9, 2020, now Pat. No. 11,442,853, which is a (Continued)

(30) Foreign Application Priority Data

Feb. 4, 2011 (JP) .................................. 2011-023218
Mar. 2, 2011 (JP) .................................. 2011-045614

(51) Int. Cl.
G06F 12/02 (2006.01)
G06F 3/06 (2006.01)
(Continued)

(52) U.S. Cl.
CPC ............ G06F 12/0246 (2013.01); G06F 3/06 (2013.01); G06F 3/061 (2013.01); G06F 3/0607 (2013.01);
(Continued)

(58) Field of Classification Search
CPC ........ G06F 12/0246; G06F 3/06; G06F 3/061; G06F 3/0658; G06F 3/0659; G06F 3/0664; G06F 3/067; G06F 3/0679
See application file for complete search history.

(56) References Cited

U.S. PATENT DOCUMENTS 7,440,774 B2   10/2008   Croome
7,484,020 B2    1/2009   Takinosawa et al.
(Continued)

FOREIGN PATENT DOCUMENTS

CN        1464453 A     12/2003
CN      101895572 A     11/2010
(Continued)

OTHER PUBLICATIONS

SD Specifications Part 1 Physical Layer Simplified Specification, Version 3.01, May 18, 2010, SD Group.

(Continued)

Primary Examiner — Baboucarr Faal
(74) Attorney, Agent, or Firm — Oblon, McClelland, Maier & Neustadt, L.L.P.

(57) ABSTRACT

According to one embodiment, a memory system includes a nonvolatile semiconductor memory device, controller, memory, wireless communication function section, and extension register. The controller controls the nonvolatile semiconductor memory device. The memory is serving as a work area of the controller. The wireless communication module has a wireless communication function. The extension register is provided in the memory. The controller processes a first command to read data from the extension register, and a second command to write data to the extension register. The extension register records, an information specifying the type of the wireless communication function in a specific page, and an address information indicating a (Continued)

region on the extension register to which the wireless communication function is assigned.

16 Claims, 49 Drawing Sheets

Related U.S. Application Data continuation of application No. 16/415,095, filed on May 17, 2019, now Pat. No. 10,838,856, which is a continuation of application No. 16/032,434, filed on Jul. 11, 2018, now Pat. No. 10,380,017, which is a continuation of application No. 15/680,299, filed on Aug. 18, 2017, now Pat. No. 10,042,757, which is a continuation of application No. 15/188,533, filed on Jun. 21, 2016, now Pat. No. 9,760,483, which is a continuation of application No. 13/958,274, filed on Aug. 2, 2013, now Pat. No. 9,501,399, which is a continuation of application No. PCT/JP2011/071773, filed on Sep. 16, 2011.

(51) Int. Cl.
| | |
|---|---|
| G06K 19/077 | (2006.01) |
| H04B 1/3827 | (2015.01) |
| G06F 13/38 | (2006.01) |
| H04M 1/72412 | (2021.01) |
| H04M 1/02 | (2006.01) |
| H04W 12/47 | (2021.01) |

(52) U.S. Cl.
CPC ............ *G06F 3/067* (2013.01); *G06F 3/0658* (2013.01); *G06F 3/0659* (2013.01); *G06F 3/0664* (2013.01); *G06F 3/0679* (2013.01); *G06F 13/385* (2013.01); *G06K 19/07732* (2013.01); *G06K 19/07733* (2013.01); *G06K 19/07749* (2013.01); *H04B 1/3827* (2013.01); *H04M 1/72412* (2021.01); *G06F 2213/3804* (2013.01); *G06F 2213/3814* (2013.01); *H04M 1/0254* (2013.01); *H04W 12/47* (2021.01)

(56) References Cited

U.S. PATENT DOCUMENTS

| | | | |
|---|---|---|---|
| 7,532,611 B1 | 5/2009 | Jacks, Jr. | |
| 7,702,821 B2 | 4/2010 | Feinberg et al. | |
| 7,819,560 B2 | 10/2010 | Ohkawa | |
| 8,732,189 B2 | 5/2014 | Fujitga | |
| 2002/0065044 A1 | 5/2002 | Ito | |
| 2002/0174337 A1 | 11/2002 | Aihara | |
| 2007/0061581 A1 | 3/2007 | Holtzman et al. | |
| 2007/0094504 A1 | 4/2007 | Takinosawa et al. | |
| 2007/0233907 A1* | 10/2007 | Yoshikawa | G06F 13/387 710/26 |
| 2009/0164815 A1 | 6/2009 | Ohyama | |
| 2010/0169548 A1 | 7/2010 | Kanda et al. | |
| 2011/0320668 A1* | 12/2011 | Liu | G06F 13/409 710/301 |
| 2014/0230002 A1 | 8/2014 | Kitazatio | |

FOREIGN PATENT DOCUMENTS

| | | |
|---|---|---|
| JP | 9-35019 A | 2/1997 |
| JP | 2001-133294 | 5/2001 |
| JP | 2002-91709 A | 3/2002 |
| JP | 2002-171303 A | 6/2002 |
| JP | 2002-329180 | 11/2002 |
| JP | 2003-115890 A | 4/2003 |
| JP | WO2004/077306 A1 | 9/2004 |
| JP | 2007-294187 | 11/2007 |
| JP | 2009-124302 | 6/2009 |
| JP | 2009-157493 A | 7/2009 |

OTHER PUBLICATIONS

SD Specifications Part 1 Physical Layer Simplified Specification, Version 4.01, Jan. 22, 2013, SD Group.
Office Action dated Dec. 4, 2015 in European Patent Application No. 11779233.3.
Office Action dated Dec. 17, 2015 in Chinese Patent Application No. 201180068699.X, along with an English translation.
Combined Office Action and Search Report dated Oct. 20, 2014 in Taiwanese Patent Application No. 100133694 (with English language translation).
Office Action dated Jul. 8, 2014 in Japanese Patent Application No. 2013-190611 (with English language translation).
International Search Report dated Aug. 2, 2012 for PCT/JP2011/071773 filed on Sep. 16, 2011 in English.
International Written Opinion dated Aug. 2, 2012 for PCT/JP2011/071773 filed on Sep. 16, 2011.
"SDIO Card Specification", Secure Digital Input/Output (SDIO) Card Specification, SD Association, Hollister, CA, USA, No. Version 1.0, Oct. 1, 2001, pp. 1-17, XP002493459.
SD Specifications, Part 1, Physical Layer Simplified Specification, Version 3.01, May 18, 2010.
SD Specifications, Part E1, SDIO Simplified Specification, Version 3.00, Feb. 25, 2011.
"SD Card Specification Simplified Version of: Part E1 Secure Digital Input/Output (SDIO) Card Specification Version 1.00" SD Association, Oct. 2001, 29 Pages.
Combined Office Action and Search Report dated Jun. 9, 2015 in Chinese Patent Application No. 201180068699.X (with English translation).
International Preliminary Report on Patentability and Written Opinion dated Aug. 15, 2013 in PCT/JP2011/071773 (submitting English translation only).

* cited by examiner

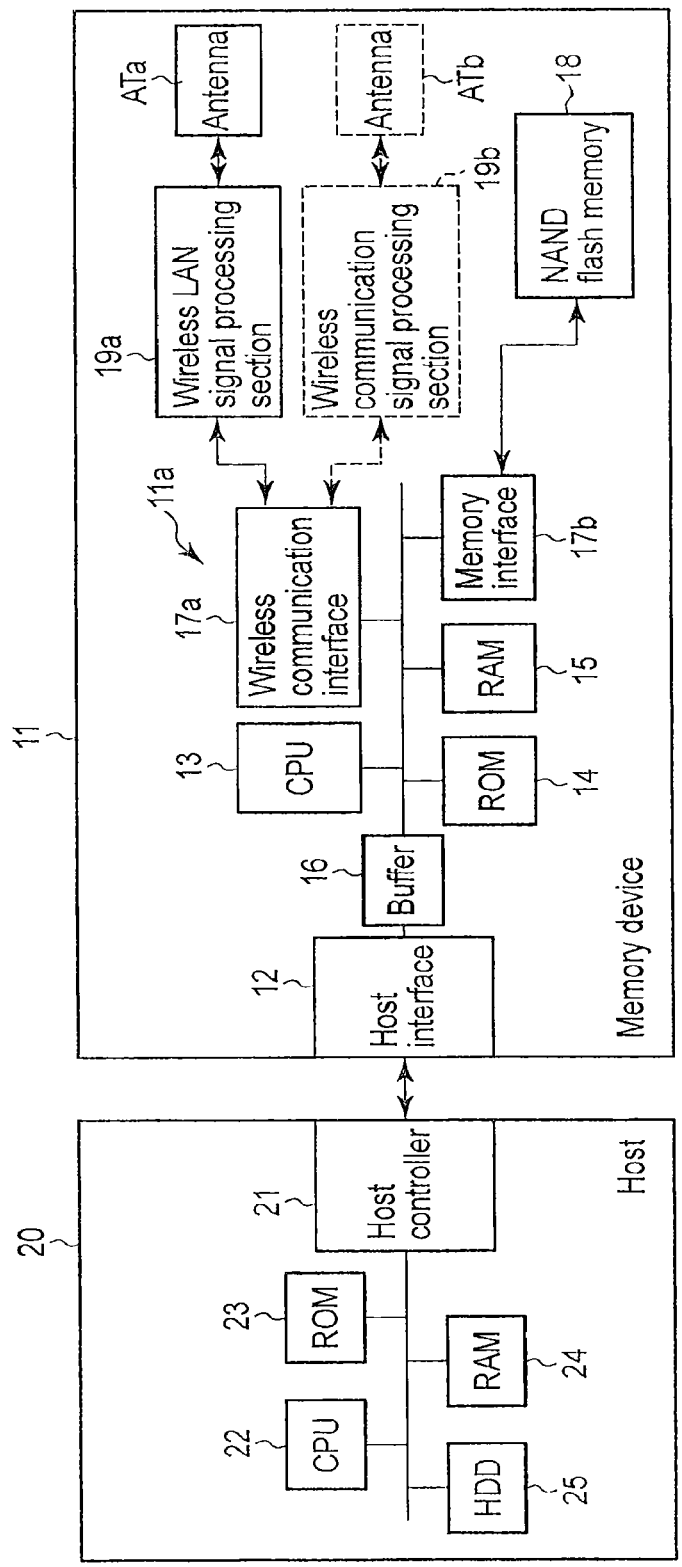
F I G. 1

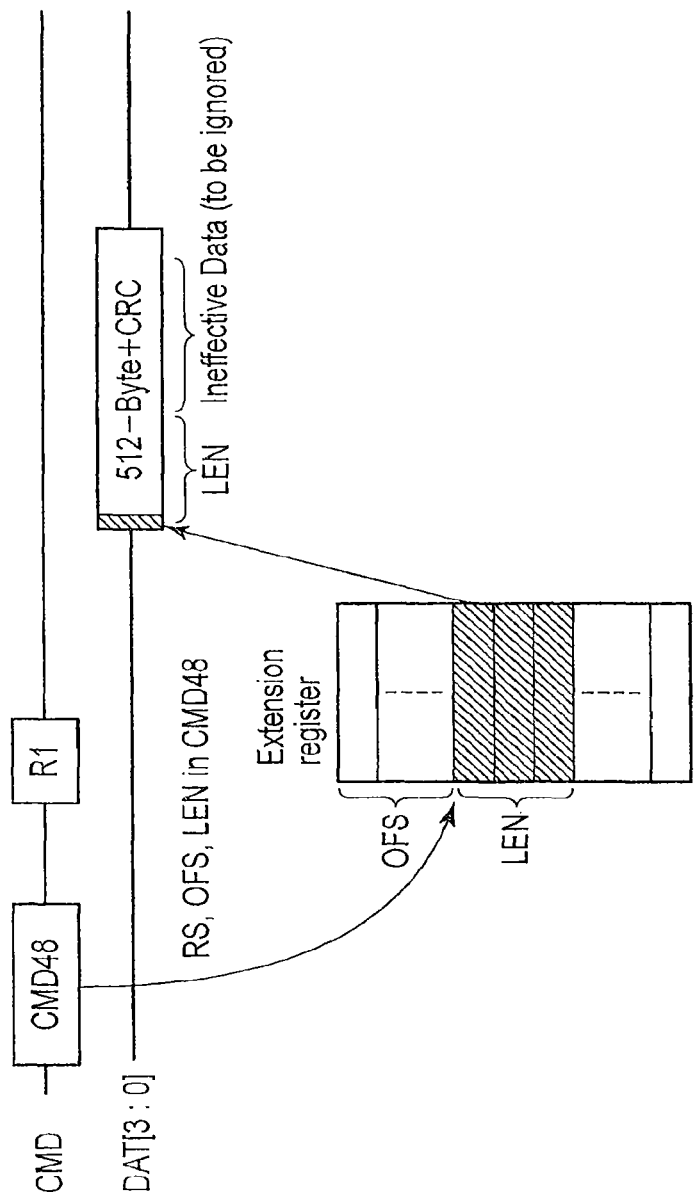
F I G. 4

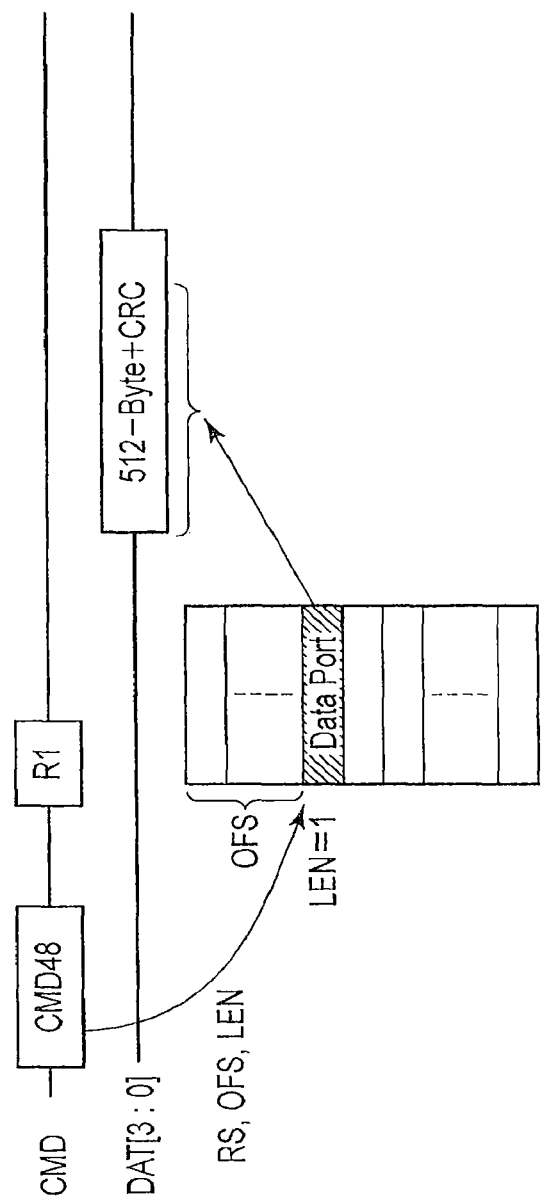
F I G. 5

| a | b | c | d | e | f | g | h |

F I G. 7A

| 1 | 0 | 1 | 1 | 1 | 0 | 0 | 1 |

F I G. 7B

| x | b | x | x | x | f | g | x |

F I G. 7C

| Structure revision | 2 bytes | Revision defining Page 0 format |
|---|---|---|
| Data length | 2 bytes | Effective data length recorded in Page 0 |
| Number of extended functions (=N) | 1 bytes | Number of extended functions supported by device |
| Spare | 1 bytes | (Adjust to make field configured in units of even number bytes) |
| Device 1 function identification code | 4 bytes | Use standardized device driver for extended function of standard device identification code. Set 0 to nonstandard function |
| Device 1 manufacturer identification information | 16 bytes | Record name of manufacturer or vendor in character string |
| Device 1 function identification information | 16 bytes | Provide information used to confirm whether or not dedicated driver is installed for extended function. Describe model number, revision, and the like in character string |
| Beginning address (Page 0) of next device | 2 bytes | When device 1 is not used, shift to checking of device 2 |
| Device 1 address length number (=X) | 2 bytes | Number of address length fields set below |
| Device 1 start address 1, length 1 | 2 bytes each | First area of extension register used by device 1. Beginning address in extension register space of pages 1 to 7, and size of extension register area to be used are shown |
| Device 1 start address 2, length 2 | 2 bytes each | Second area of extension register used by device 1 |
| ............ | | |
| Device 1 start address X, length X | 2 bytes each | Xth area of extension register used by device 1 |
| Device 2 function identification code | 4 bytes | Information area of device 2. Contents are identical to device 1 |
| Device 2 start address Y, length Y | 4 bytes | End of address length information of device 2 is shown |
| ............ | | |
| Device N function identification code | 4 bytes | Information area of device N. Contents are identical to device 1 |
| Device N start address Z, length Z | 4 bytes | End of address length information of device N is shown |
| Unused area | | |

FIG. 10

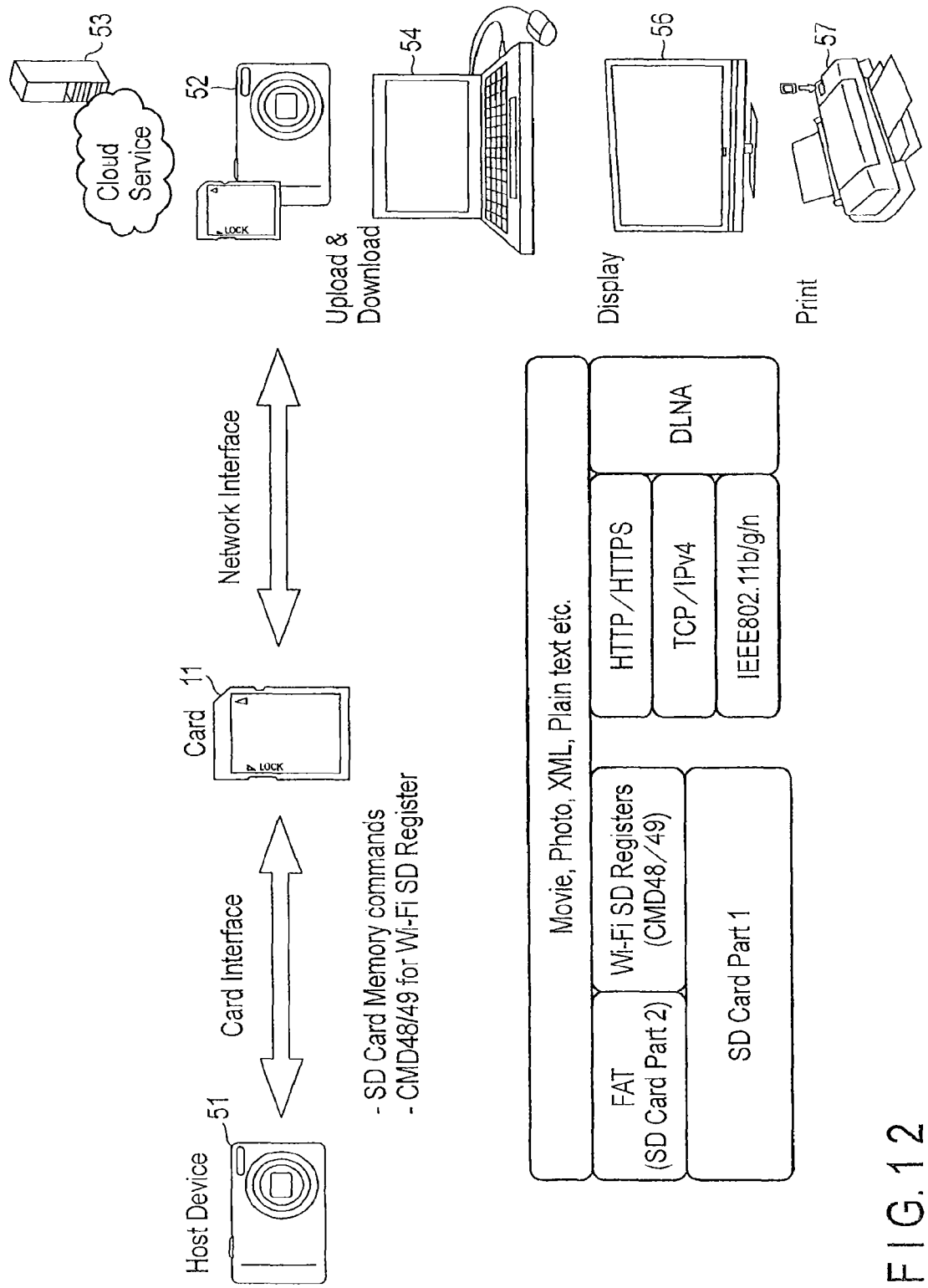
F I G. 12

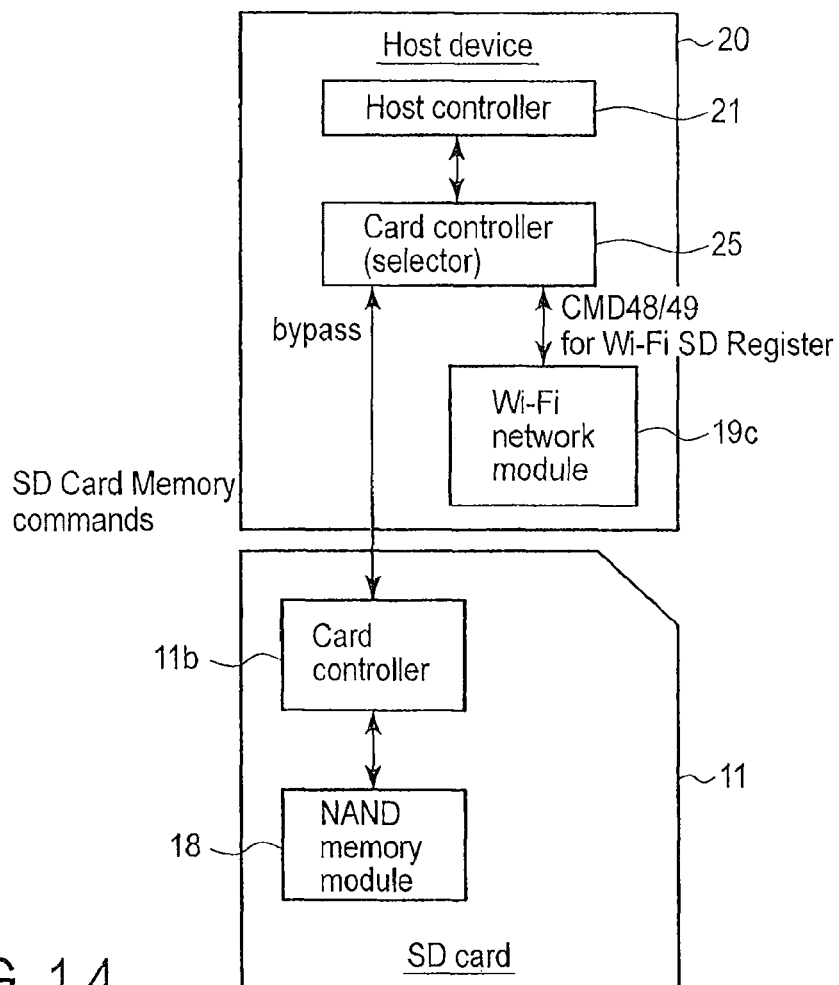
F I G. 14
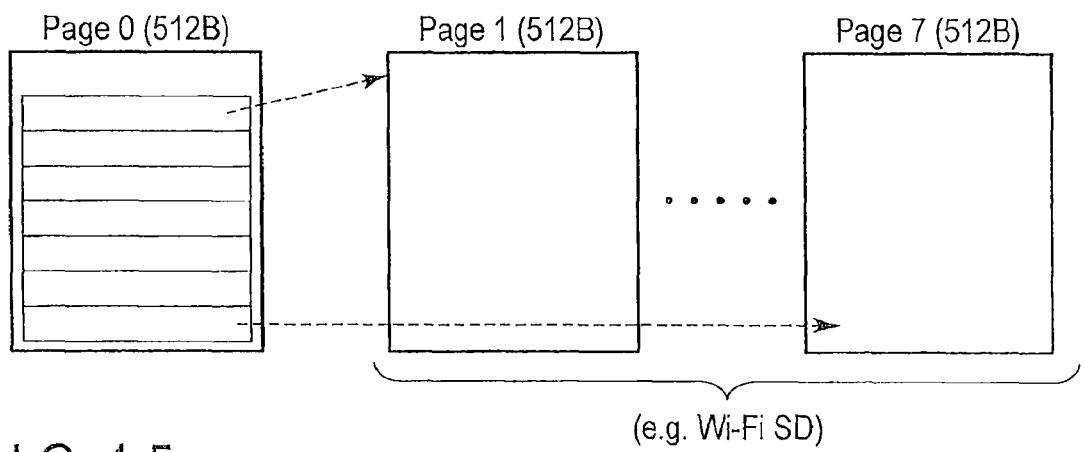
F I G. 15

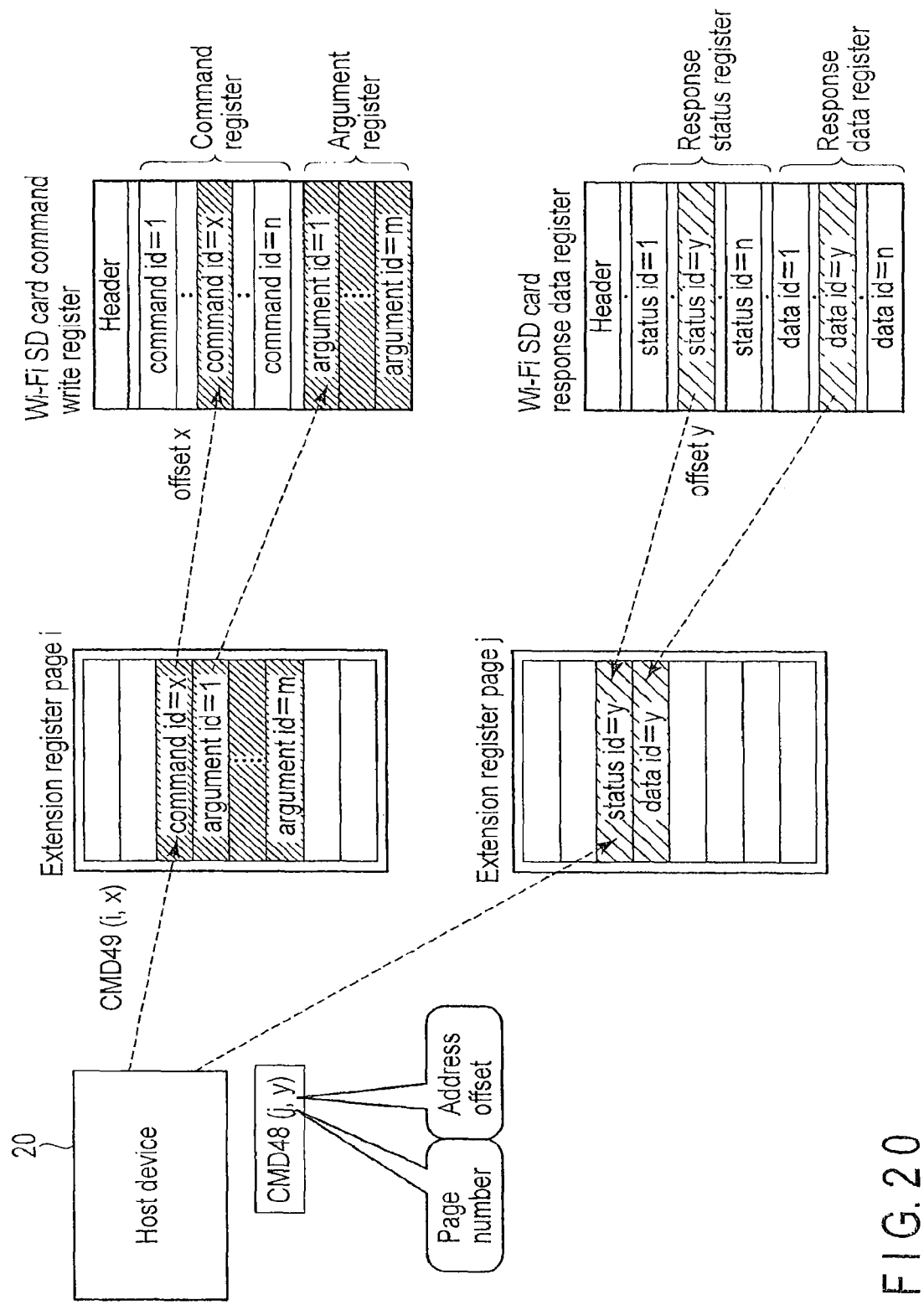
F I G. 20

| Size (byte) | Name | Short Description | RW |
|---|---|---|---|
| 8 | Wi-Fi SD Card Identifier | "WIFISD00" | R |
| 2 | Wi-Fi SD Card Specification Version | 0x0100 in this version | R |
| 16 | Wi-Fi SD Card Profile Indicator | Indicator to specify which functions are supported in a Card | R |
| 8 | Vendor Unique ID | Vendor Unique ID in ASCII character | R |
| 64 | Vendor Unique Field | Reserved for the Vendor | R |
| TBD | Reserved | TBD | |
| 1 | Command Write Register Port | Data Port to write the Wi-Fi SD Card Command Write Register | W |
| 512 | Status Register | Memory Area to read the Wi-Fi SD Card Status Register | R |
| 512 | Command Response Status Register | Memory Area to read the Wi-Fi SD Card Command Response Status Register | R |
| 512 | Asynchronous Command Response Status Register Port | Memory Area to read the Wi-Fi SD Card Asynchronous Command Response Status Register | R |
| 1 | Response Data Register Port | Data Port to read the Wi-Fi SD Card Response Data Register | R |
| 1 | ID List Register Port | Data Port to read the Wi-Fi SD Card ID List Register | R |
| 1 | SSID History Register Port | Data Port to read the Wi-Fi SD Card SSID History Register | R |

F I G. 21

| Size (byte) | Name | Short Description | RW |
|---|---|---|---|
| 8 | Wi-Fi SD Card Register Identifier | "WIFISDCR" | W |
| 2 | Size of Wi-Fi SD Card Register | Size of Wi-Fi SD Card Command Write Register. | W |
| 1 | Number of Wi-Fi SD command Information | The number of Wi-Fi SD command Information to be processed. | W |
| variable | Wi-Fi SD Command Information #1 | (below) | W |
| ... | ... | ... | |
| variable | Wi-Fi SD Command Information #n1 | (below) | W |

| Size (byte) | Name | Short Description | RW |
|---|---|---|---|
| 2 | Wi-Fi SD command id | (next slide) | W |
| 4 | Wi-Fi SD command sequence id | Sequence ID to distinguish from other processed commands. | W |
| 2 | Total Number of Arguments | Total number of Arguments for the command | W |
| 4 | Length of Argument #1 | Length of the argument for the command | W |
| L1 | Argument #1 | Argument for the command | W |
| ... | ... | ... | W |
| 4 | Length of Argument #n2 | ... | W |
| Ln | Argument #n2 | ... | W |

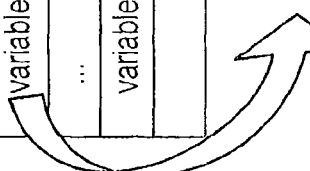

F I G. 22

| ID | Command Name | Short Description |
|---|---|---|
| 0x0001 | ScanWiFi() | Scan Wireless LAN and get the list of available SSIDs |
| 0x0002 | SetSSID(ssid, passphrase, authentication) | Set SSID to be connected or established (authentication is required for AP) |
| 0x0003 | SetCurrentTime(currentDate, currentTime) | Set the current time from a host to a Card |
| 0x0004 | StartApplication(application, currentDate, currentTime) | Start one of four Applications (Server Upload, P2P Restricted Server, P2P Server, P2P Client, DLNA Server, DLNA Controller) with specifying the current time |
| 0x0011 | SetWPS(mode, pin) | Set the WPS mode (WPS with PIN, WPS with PBC) |
| 0x0101 | Abort(sequenceID) | Abort the process of the specified Wi-Fi SD command |
| 0x0102 | Reset(status) | Reset the status for update |
| 0x0103 | Remove(ssid) | Remove the specified SSID from the SSID History |
| 0x0104 | EndApplication() | End the current Application |
| 0x0105 | ReadResponse(sequenceID) | Read the Response Data of the specified Wi-Fi SD command |
| 0x0201 | SendHttpMessage(hostName, messageFileName,headerRemoval) | Send an HTTP message stored in a file |
| 0x0202 | SendHttpFile(hostName, messageFileName,appendFileName,headerRemoval) | Send an HTTP message stored in a file appending a file |
| 0x0203 | SendHttpSSLMessage(hostName, messageFileName, headerRemoval) | Send an HTTP message stored in a file via SSL |
| 0x0204 | SendHttpSSLFile(hostName, messageFileName,appendFileName,headerRemoval) | Send an HTTP message stored in a file via SSL appending a file |
| 0x0205 | SendHttpMessageByRegister(hostName, message) | Send an HTTP message stored in the Register |
| 0x0206 | SendHttpFileByRegister(hostName, appendFileName,message) | Send an HTTP message stored in the Register via SSL appending a file |
| 0x0207 | SendHttpSSLMessageByRegister(hostName, message) | Send an HTTP message stored in the Register via SSL |
| 0x0208 | SendHttpSSLFileByRegister(hostName, appendFileName,message) | Send an HTTP message stored in the Register via SSL appending a file |

FIG. 23

| ID | Command Name | Short Description |
|---|---|---|
| 0x0301 | GetFile(requestFileName,saveFileName) | Get a file from the Card (Sender) and store it in the Card (Receiver) |
| 0x0401 | SelectID(id) | Select an ID of a Card (Receiver) which is allowed to connect the Card (Sender) |
| 0x0402 | CancelID(id) | Cancel an ID of a Card (Receiver) which has been allowed to connect the Card (Sender) |
| 0x0501 | SetMailAccount(accountName, password) | Set the mail account for a mail server |
| 0x0502 | SendSmtpMessage(address, messageFileName) | Send a mail stored in a file |
| 0x0503 | SendSmtpFile(address, messageFileName, appendFileName) | Send a mail stored in a file appending a file |
| 0x0504 | SendSmtpMessageByRegister(address, message) | Send a mail stored in the Register |
| 0x0505 | SendSmtpFileByRegister(address, appendFileName,message) | Send a mail stored in the Register appending a file |

F I G. 24

| ID | Command Name | Short Description |
|---|---|---|
| 0x1001 | ShowDeviceList() | Acquire device list in network |
| 0x1002 | PrintImageByDLNA(file, targetDevice) | Transfer designated image to device in network to print |
| 0x1003 | DisplayImageByDLNA(file, targetDevice) | Transfer designated image to device in network to display |
| 0x1004 | PlayVideoByDLNA(file, targetDevice) | Transfer designated video data to device in network to reproduce |
| 0x1005 | StopVideoByDLNA(file, targetDevice) | Transfer designated video data to device in network to stop reproduction |
| 0x1006 | PauseOnVideoByDLNA(file, targetDevice) | Transfer designated video data to device in network to give pause to reproduction |
| 0x1007 | PauseOffPlayVideoByDLNA(file, targetDevice) | Transfer designated video data to device in network to cancel pause of reproduction |
| 0x1008 | SeekVideoByDLNA (time, address, file, targetDevice) | Reproduce designated video data from part (address of file or reproduction start time of video data) desired to be transferred to device in network |
| 0x1009 | FastForwardVideoByDLNA(file, targetDevice) | Transfer designated video data to device in network to carry out fast-forward reproduction |
| 0x100A | SlowForwardVideoByDLNA(file, targetDevice) | Transfer designated video data to device in network to carry out slow reproduction |
| 0x100B | FastBackwardVideoByDLNA(file, targetDevice) | Transfer designated video data to device in network to carry out rewind/reproduction |
| 0x100C | SlowBackwardVideoByDLNA(file, targetDevice) | Transfer designated video data to device in network to carry out reverse slow reproduction |
| 0x100D | StreamingDownloadVideoByDLNA (file, targetDevice) | Transfer designated video data to device in network to carry out recording while carrying out reproduction |
| 0x100E | SendFileByDLNA(file, targetDevice) | Transfer designated file to device in network |
| 0x1101 | SelectFileByDLNA(file) | Open designated file to device in network |
| 0x1102 | CancelFileByDLNA(file) | Make designated file unopened to device in network |

F I G. 2 5

| Size (byte) | Name | Short Description | RW |
|---|---|---|---|
| 8 | Wi-Fi SD Card Register Identifier | "WIFISDSR" | R |
| 2 | Size of Wi-Fi SD Card Register | Size of Wi-Fi SD Card Status Register | R |
| 2 | iSDIO Status | Current iSDIO status | RW |
| 2 | iSDIO Status Mask | Current iSDIO status Mask | RW |
| 2 | Error Status | Current Error Staus | RW |
| 1 | WLAN | Current Wireless LAN status | R |
| 1 | Application | Current Application status | R |
| 32 | SSID | Current SSID | R |
| 1 | Network Authentication | Current network authentication and data encryption for the SSID | R |
| 1 | HTTP Processing | Denote whether a Card processes an HTTP message or not | R |
| 1 | HTTP Progress | Progress for the download or the upload of HTTP messages | R |
| 2 | Date | Current Date in a Card | R |
| 2 | Time | Current Time in a Card | R |
| 1 | Media Change | Denote whether FAT in NAND Memory Module is updated | R |
| 1 | SSID List Update | Denote whether SSID LIST is updated | R |
| 1 | File List Update | Denote whether FILE LIST is updated | R |
| 1 | ID List Update | Denote whether ID LIST is updated | R |
| 1 | Response Data Update | Denote whether Response Data is updated | R |
| 4 | Response Data Size | Denote the size in bytes of the Response Data | R |
| 1 | Signal Strength | Current signal strength | R |
| 6 | MAC Address | Mac Address of the Wi-Fi SD Card | R |
| 16 | ID | ID of this Card | R |

FIG. 26

| Size (byte) | Name | Short Description | RW |
|---|---|---|---|
| 1 | DHCP Enabled | Denote whether the DHCP is enabled | R |
| 4 | IP Address | Current IP Address | R |
| 4 | Subnet Mask | Current Subnet Mask | R |
| 4 | Default Gateway | Current Default Gateway | R |
| 4 | Preferred DNS Server | Current Preferred DNS Server | R |
| 4 | Alternate DNS Server | Current Alternate DNS Server | R |
| 2 | Time Out | Time-out in seconds | R |
| 1 | Power Save mode | Denote whether a Card works in power save mode or not | R |
| 1 | WPS mode | Current WPS mode | R |
| 1 | Selected Number of Proxy Server | Denote which Proxy Server is selected in the Card Configuration Information | R |
| 32 | Current Mail Account Name | Denote the current mail account name | R |

FIG. 27

| Size (byte) | Name | Short Description | RW |
|---|---|---|---|
| 8 | Wi-Fi SD Card Register Identifier | "WIFISDPS" | R |
| 2 | Size of Wi-Fi SD Card Register | Size of Wi-Fi SD Card Command Process Status Register | R |
| 1 | Number of Wi-Fi SD Command Process Status | Number of Command Response Status in the register | R |
| 16 | Wi-Fi SD Command Response Status #1 | (below) | R |
| ... | ... | ... | R |
| 16 | Wi-Fi SD Command Response Status #n3 | (below) | R |

| Size (byte) | Name | Short Description | RW |
|---|---|---|---|
| 1 | Status Registration | Denote the command status registration | R |
| 2 | Wi-Fi SD command id | Command id corresponding to the one in Command Write Register | R |
| 4 | Wi-Fi SD command sequence id | Command sequence id corresponding to the one in Command Write Register | R |
| 1 | Command Reaponse Status | Denote whether the specified command is accepted. 0x00:Initial (Default), 0x01:Command Processing, 0x02:Command Rejected, 0x03:Process Succeeded, 0x04:Process Terminated, 0x08-0xFF:Process Failed | R |
| 4 | Reserved for Vendors for Error Status | This field is reserved for vendors for the error status | R |

F I G. 28

| Size (byte) | Name | Short Description | RW |
|---|---|---|---|
| 8 | Wi-Fi SD Card Register Identifier | "WIFISDPS" | R |
| 2 | Size of Wi-Fi SD Card Register | Size of Wi-Fi SD Card Command Process Status Register | R |
| 1 | Number of Wi-Fi SD Asynchronous Command Response Status | Number of Asynchronous Command Response Status in the register | R |
| 16 | Wi-Fi SD Asynchronous Command Response Status #1 | (below) | R |
| ... | ... | | R |
| 16 | Wi-Fi SD Asynchronous Command Response Status #n4 | (below) | R |

| Size (byte) | Name | Short Description | RW |
|---|---|---|---|
| 1 | Status Registration | Denote the command status registration | R |
| 2 | Wi-Fi SD command id | Command id corresponding to the one in Command Write Register | R |
| 4 | Wi-Fi SD command sequence id | Command sequence id corresponding to the one in Command Write Register | R |
| 1 | Asynchronous Command Response Status | Denote the status of the asynchronous command response status. 0X00:Initial(Default),0x01:Command Processing,0x02:Command Rejected,0x03:Process Succeeded,0x04:Process Terminated, 0x08-0xFF:Process Failed | |
| 4 | Reserved for Vendors for Error Status | This field is reserved for vendors for the error status | R |

FIG. 29

| Size (byte) | Name | Short Description | RW |
|---|---|---|---|
| 8 | Wi-Fi SD Card Identifier | "WIFISDRD" | R |
| 2 | Size of Wi-Fi SD Card Register | Size of Wi-Fi SD Card Response Data Register | R |
| 1 | Number of Wi-Fi SD Response Data | Number of Response Data in the register | R |
| 2 | Wi-Fi SD command id #1 | Command id corresponding to the one in Command Write Register | R |
| 4 | Wi-Fi SD command sequence id #1 | Command sequence id corresponding to the one in Command Write Register | R |
| 2 | Size of Response Data #1 | Size of Response Data | R |
| ... | ... | ... | |
| 2 | Wi-Fi SD command id #n5 | | R |
| 4 | Wi-Fi SD command sequence id #n5 | | R |
| 2 | Size of Response Data #n5 | | R |
| L1 | Response Data #1 | This field stores Response Data by the command id 0x0205, 0x0206, 0x0207 and 0x0208 | R |
| ... | ... | ... | |
| Ln | Response Data #n5 | ... | R |

FIG. 30

| Size (byte) | Name | Short Description | RW |
|---|---|---|---|
| 8 | Wi-Fi SD Card Register Identifier | "WIFISDRD" | R |
| 2 | Size of Wi-Fi SD Card Register | Size of Wi-Fi SD Card ID List Register | R |
| 1 | Number of Receiver IDs | Number of Receiver IDs in the list | R |
| 16 | Receiver ID #1 | ID of a Card (Receiver) which requests to connect to the Card (Sender) | R |
| 6 | Receiver MAC Address #1 | MAC Address of a Card (Receiver) which requests to connect to the Card (Sender) | R |
| 1 | Receiver Permission #1 | Denote whether the Card (Receiver) is permitted to access the Card (Sender) | R |
| ... | ... | ... | R |
| 16 | Receiver ID #n6 | | R |
| 6 | Receiver MAC Address # n6 | | R |
| 1 | Receiver Permission # n6 | | R |

F I G. 31

| Size (byte) | Name | Short Description | RW |
|---|---|---|---|
| 8 | WiFi SD Card Register Identifier | "WIFISDRD" | R |
| 2 | Size of Wi-Fi SD Card Register | Size of Wi-Fi SD Card ID List Register | R |
| 1 | Number of SSIDs | Number of SSIDs in the SSID History | R |
| 32 | SSID #1 | SSID in the SSID History | R |
| 6 | MAC Address #1 | MAC Address corresponding to the SSID in the SSID History | R |
| ... | | ... | |
| 32 | SSID #n7 | | R |
| 6 | MAC Address #n7 | | R |

F I G. 3 2

| Size (byte) | Status Name | Description/Value |
|---|---|---|
| 8 | Wi-Fi SD Card Identifier | "WIFISDCI" |
| 2 | Size of Configuration Information | Size of Configuration Information |
| 16 | ID | ID of this Card |
| 1 | DHCP Enabled | Denote whether DHCP is enabled or not |
| 4 | IP Address | IP Address when DHCP is disabled |
| 4 | Subnet Mask | Subnet Mask when the DHCP is disabled |
| 4 | Default Gateway | Default Gateway when the DHCP is disabled |
| 4 | Preferred DNS Server | Preferred DNS Server when the DHCP is disabled |
| 4 | Alternate DNS Server | Alternate DNS Server when the DHCP is disabled |
| 2 | Time Out | Time-out in seconds. |
| 1 | Power Save mode | Denote whether a Card behaves in power save mode or not |
| 1 | Number of Proxy Servers | Number of proxy server in the list |
| 1 | Selected Proxy Server | Denote which Proxy Server is selected |
| 1 | Length of Proxy Server Name #1 | Length of Proxy Server Name in bytes. (L1) |
| L1 | Proxy Server Name #1 | Name of Proxy Server |
| 2 | Port Number #1 | Port Number of Proxy Server |
| ... | ... | ... |
| 1 | Length of Proxy Name #n8 | (Ln) |
| Ln | Proxy Server Name #n8 | |
| 2 | Port Number #n8 | |
| 1 | Length of Mail Address | (L(n+1)) |
| L(n+1) | Mail Address | Mail Address |

FIG. 33

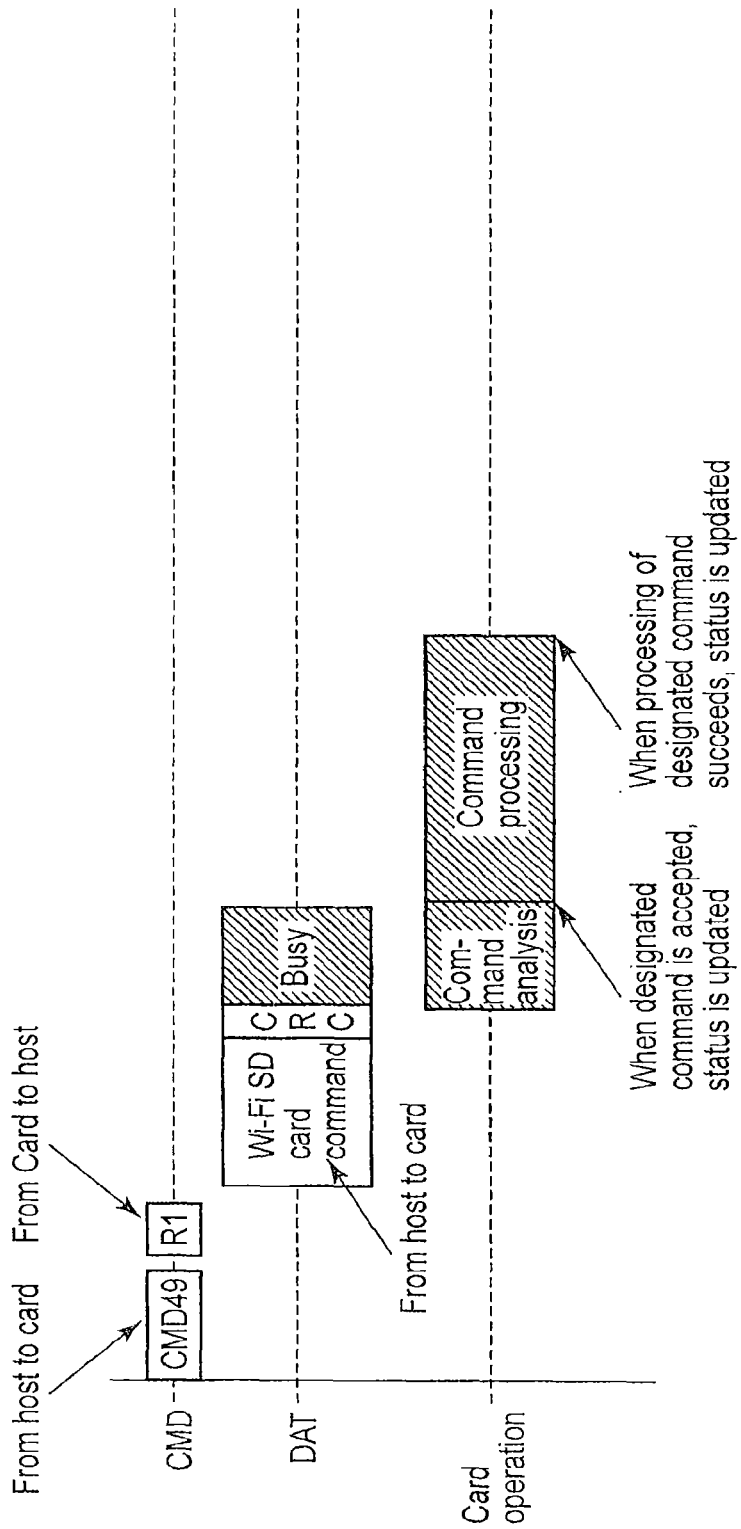
F I G. 34

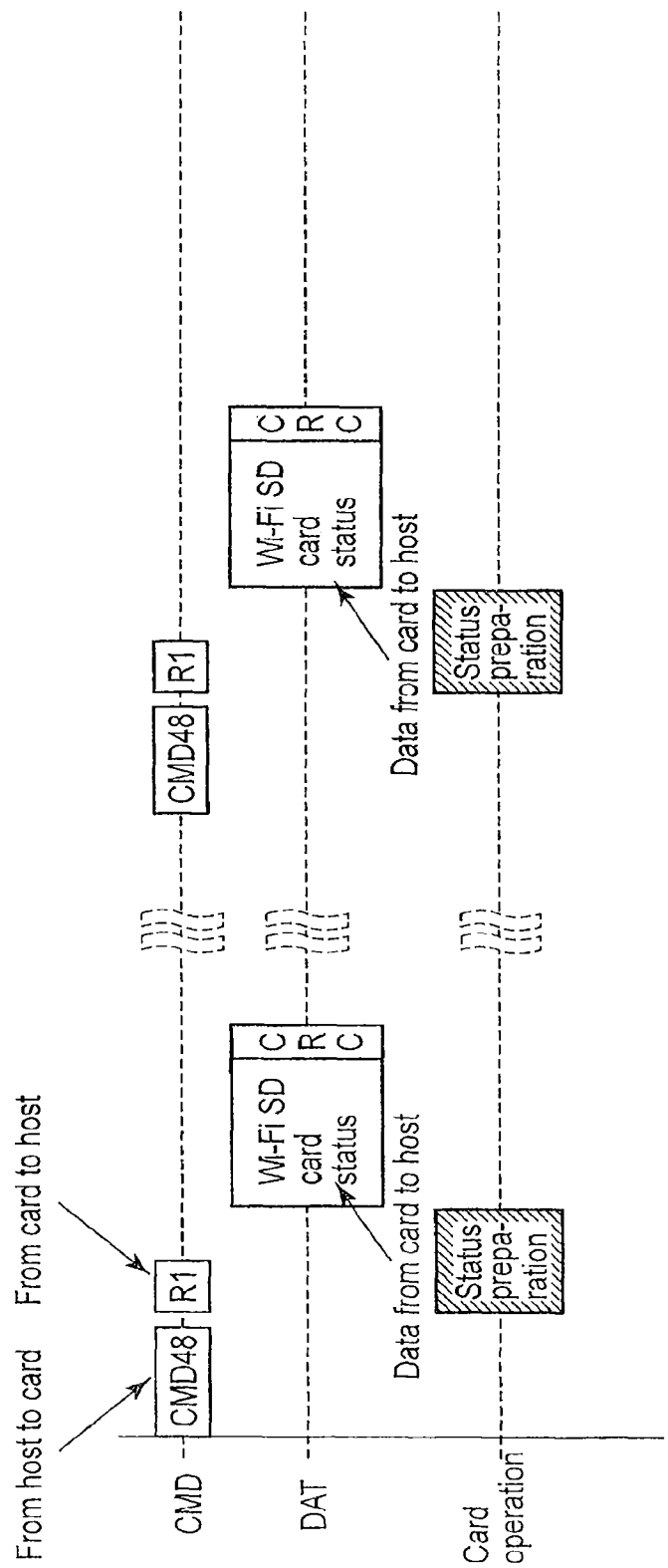
F I G. 38

| Application Name | WLAN | DHCP | Short Description |
|---|---|---|---|
| Server Upload App. | Infra-STA | Client | Upload photo data to Web server |
| P2P Server App. | Infra-AP | Server | Send photo data to other devices |
| P2P Restricted Server App. | Infra-AP | Server | Send photo data to other authenticated devices |
| P2P Client App. | Infra-STA | Client | Receive photo data from other devices |
| DLNA Server App. | Infra-STA | Client | Allow other DLNA devices to access photo data |
| DLNA Controller App. | Infra-STA | Client | Send photo data to other DLNA devices |
| Initial App. | — | — | Initial state of the Card |

FIG.39

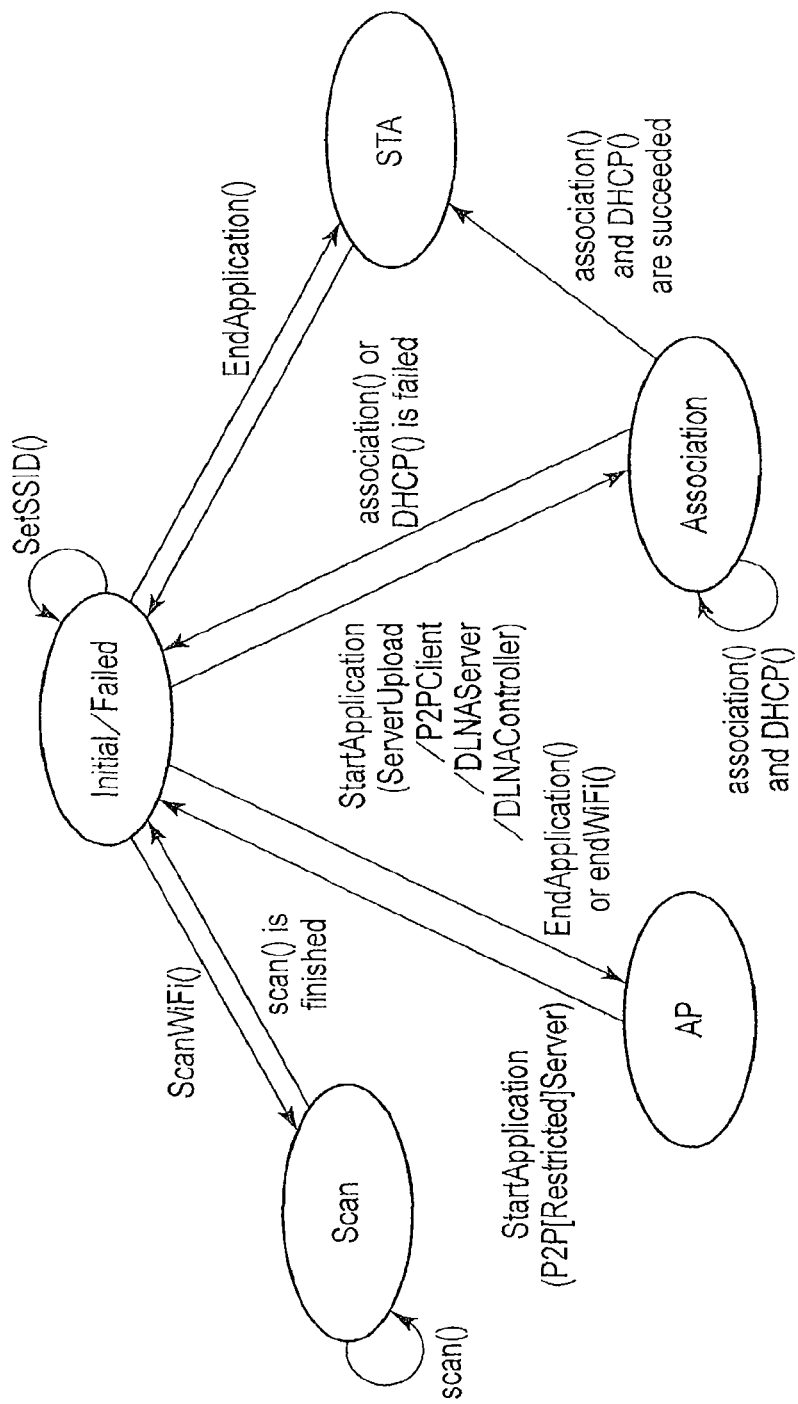
F I G. 42

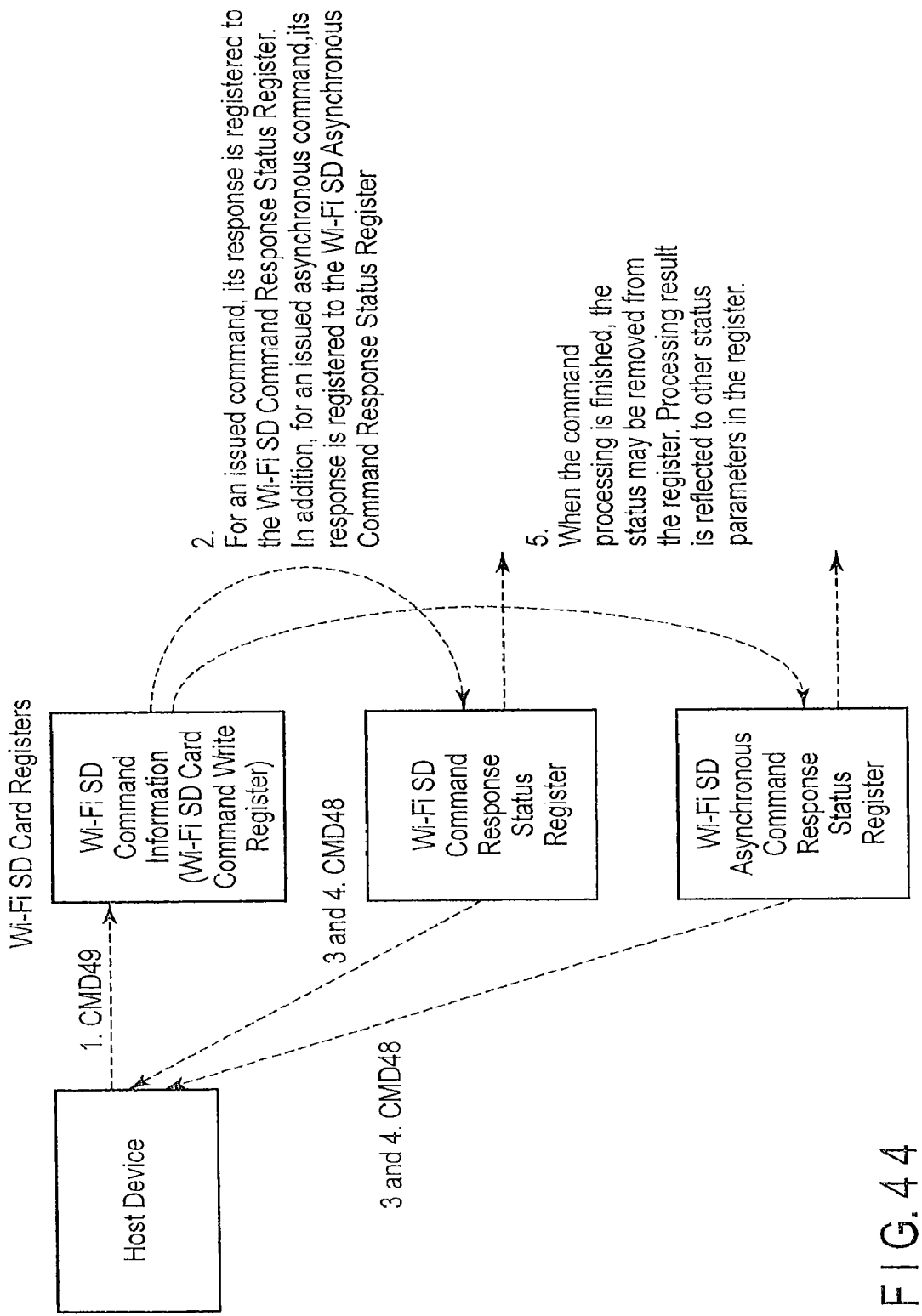
F I G. 44

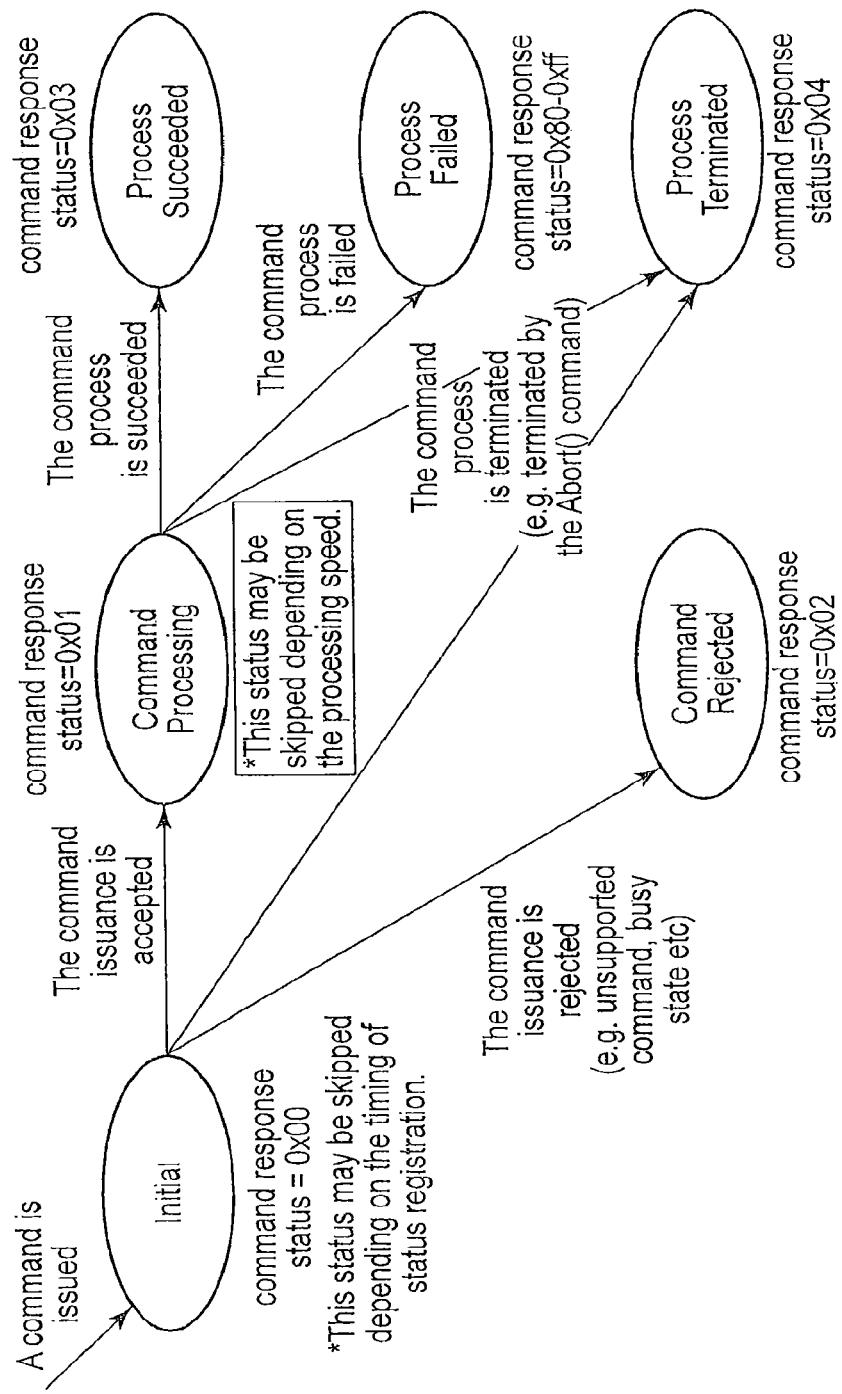
F I G. 50

CONTROLLING METHOD OF A MEMORY CARD

CROSS REFERENCE TO RELATED APPLICATIONS

This application is a Continuation of U.S. application Ser. No. 17/066,906, filed Oct. 9, 2020, which is a Continuation of U.S. application Ser. No. 16/415,095, filed May 17, 2019, which is a Continuation of U.S. Application Ser. No. 16/032,434, filed Jul. 11, 2018, which is a continuation of application Ser. No. 15/680,299 (now U.S. Pat. No. 10,042,757), filed Aug. 18, 2017, which is a continuation of U.S. application Ser. No. 15/188,533, filed Jun. 21, 2016 (now U.S. Pat. No. 9,760,483), which is a Continuation of U.S. application Ser. No. 13/958,274, filed Aug. 2, 2013 (now U.S. Pat. No. 9,501,399), which is a Continuation of PCT Application No. PCT/JP2011/071773, filed Sep. 16, 2011 and based upon and claiming the benefit of priority from Japanese Patent Applications No. 2011-023218, filed Feb. 4, 2011; and No. 2011-045614, filed Mar. 2, 2011, the entire contents of all of which are incorporated herein by reference.

FIELD

Embodiments described herein relate generally to a memory system having a wireless communication function.

BACKGROUND

A secure digital (SD) card provided with a wireless communication function and wireless LAN function is developed. In such a card, it has been sufficient if a unique wireless function is incorporated in the SD card, and control corresponding only to the uniquely added function can be carried out. However, the wireless communication function ranges widely, and hence if definitions configured to control all the wireless communication functions are given, the address space of commands becomes insufficient.

BRIEF DESCRIPTION OF THE DRAWINGS

FIG. 1 is a block diagram schematically showing a memory system to be applied to an embodiment.

FIG. 4 is a timing chart showing a read operation of an extension register carried out in accordance with a read command.

FIG. 5 is a timing chart showing a read operation of a data port carried out in accordance with a read command.

FIGS. 7A, 7B, and 7C are views each showing an operation of a mask register.

FIG. 10 is a view showing an example of an information field set in a top page of an extension register.

FIG. 12 is a view showing an interface function with which a memory device is provided.

FIG. 14 is a view showing another configuration example of the SD card and host device.

FIG. 15 is a view showing an example of an extension register to be accessed in accordance with a read command (CMD 48) or a write command (CMD 49).

FIG. 20 is a view showing another example of the case where the extension register is used for the Wi-Fi SD card.

FIG. 21 is a view showing an extension register of the case where the extension register is used for the Wi-Fi SD card.

FIG. 22 is a view showing a configuration example of a Wi-Fi SD card command write register.

FIG. 23 is a view showing a list of commands to be written to a Wi-Fi SD card command write register.

FIG. 24 is a view showing a list of commands to be written to the Wi-Fi SD card command write register.

FIG. 25 is a view showing a list of commands to be written to the Wi-Fi SD card command write register.

FIG. 26 is a view showing a configuration example of a Wi-Fi SD card status register.

FIG. 27 is a view showing a configuration example of a Wi-Fi SD card status register.

FIG. 28 is a view showing a configuration example of a Wi-Fi SD card command response status register.

FIG. 29 is a view showing a configuration example of a Wi-Fi SD card command response status register.

FIG. 30 is a view showing a configuration example of a Wi-Fi SD card response data register.

FIG. 31 is a view showing a configuration example of a Wi-Fi SD card ID list register.

FIG. 32 is a view showing a configuration example of a Wi-Fi SD card SSID history register.

FIG. 33 is a view showing a configuration example of Wi-Fi SD card Configuration Information.

FIG. 34 is timing chart showing a case where a command of a Wi-Fi SD card is issued by using a write command (CMD 49).

FIG. 38 is a timing chart showing a case where data of a Wi-Fi SD card is acquired by using a plurality of read commands (CMD 48).

FIG. 39 is a view showing application examples supported by a Wi-Fi SD card.

FIG. 42 is a view showing state transitions of a wireless LAN.

FIG. 44 is a view showing a flow of command processing of a Wi-Fi SD card.

FIG. 50 is a view showing a flow of the command response.

DETAILED DESCRIPTION

Figure 2:
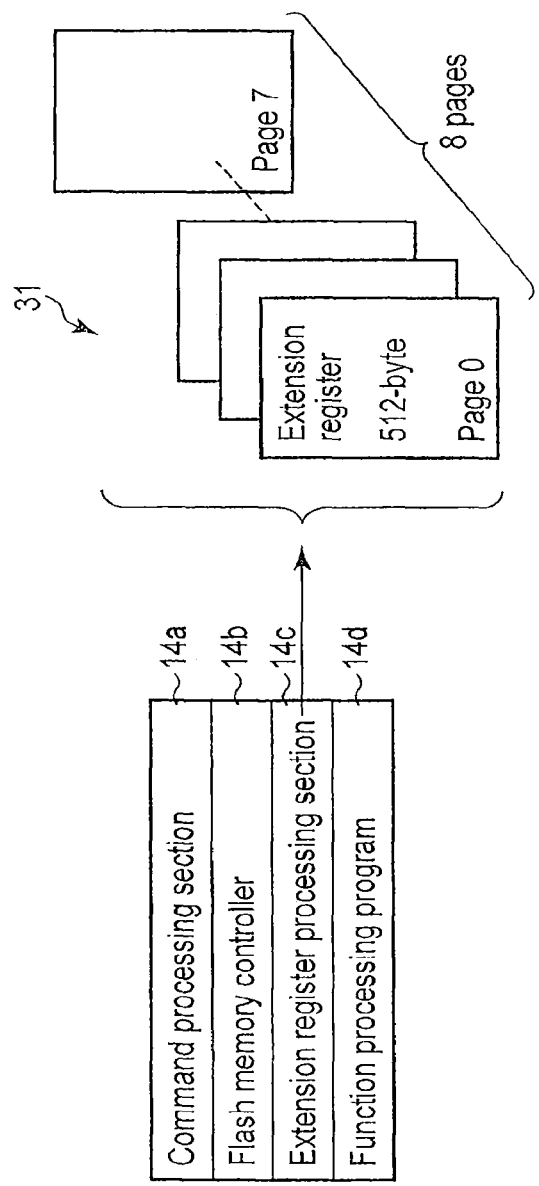
FIG. 2 is a block diagram showing an example of firmware of the memory system shown in FIG. 1.

In general, according to one embodiment, a memory system includes a nonvolatile semiconductor memory device, controller, memory, wireless communication function section, and extension register. The controller controls the nonvolatile semiconductor memory device. The memory is serving as a work area of the controller. The wireless communication module has a wireless communication function. The extension register is provided in the memory. The controller processes a first command to read data from the extension register, and a second command to write data to the extension register. The extension register records, an information specifying the type of the wireless communication function in a specific page, and an address information indicating a region on the extension register to which the wireless communication function is assigned. The extension register to which the wireless communication function is assigned, comprises: a first register which indicates the wireless communication function to support; a second register for writing a third command to perform a wireless communication; a third register for reading a processing state of the third command; and a fourth register for reading an execution result of the third command.

In recent years, data communication based on wireless communication is enabled between various electronic devices (particularly, portable digital devices). The various electronic devices include a personal computer, portable information terminal called, for example, a personal digital assistant (PDA), cellular phone, portable audio device, digital camera, and the like.

If data communication is enabled between these electronic devices by means of wireless communication, connection using a cable is made unnecessary, and hence the convenience can be improved. Particularly, with the spread of the wireless LAN system, a wireless LAN system has been introduced into the SD card used as a memory not only in the personal computer, and application of the built-in devices, but also in the digital camera or the like.

In order to realize such a function in the SD card, it is necessary to implement, in addition to a flash memory, constituent elements such as an interface configured to physically connect the SD card to a host, antenna, high-frequency processing section (processing section configured to carry out transmission/reception of a wireless signal), baseband processing section (processing section configured to process a baseband signal), and the like in the SD memory card.

In such an SD card provided with the wireless LAN function, the procedure configured to control the wireless LAN function depends on the implementation of the SD card manufacturer, and hence is not uniquely determined. Furthermore, how to implement the control procedure is problematic.

Further, it is also conceivable that an SD card is provided with a communication function other than the wireless LAN function. In this case, the host cannot use the function of the SD card without means for detecting the type of the function with which the SD card is provided.

Thus, this embodiment presents means for grasping an extended function other than the original memory function with respect to the SD card widely used as a memory in, for example, a digital camera or the like. Furthermore, this embodiment presents a control procedure for the function other than the original memory function. Particularly, in the command system of the SD memory, controlling of the wireless LAN or the like is enabled. Thereby, an SD card in which a wireless function or the like having high affinity for a digital device such as a digital camera serving as a host is incorporated is provided.

Thus, in this embodiment, an extension register constituted of a plurality of pages is provided in the SD card, and read or write of the extension register is enabled by using a command CMD 48 or CMD 49 which is one of specification commands of the SD memory. The command CMD 48 is a command configured to read data from an objective register in units of blocks, and the command CMD 49 is a command configured to write data to an objective register in units of blocks. The extension register has, for example, a page configured to indicate a function possessed by the SD card, page configured to control a communication function possessed by the SD card, and page used to deliver data of the communication object.

Embodiment

Hereinafter, an embodiment will be described with reference to the drawings.

FIG. 1 schematically shows a memory system according to this embodiment.

The memory system is constituted of a memory device 11 such as an SD card, and host 20. The memory device 11 is also called an SD card. Further, the host 20 is also called a host device.

When the memory device 11 is connected to the host 20, the memory device 11 receives power supply to operate, and carries out processing corresponding to access from the host 20. The memory device 11 includes a card controller 11a.

The card controller 11a is constituted of, for example, a host interface 12, CPU 13, read only memory (ROM) 14, random access memory (RAM) 15, buffer 16, wireless interface 17a, and memory interface 17b. These are connected to each other by a bus. For example, a NAND flash memory 18 is connected to the memory interface 17b. A wireless LAN signal processing section 19a serving as an extended function section is connected to the wireless communication interface 17a. An antenna ATa configured to transmit/receive a high-frequency signal is connected to the wireless LAN signal processing section 19a.

It should be noted that the extended function section is not limited to the wireless LAN signal processing section 19a, and it is possible to constitute a multifunctional SD card by adding the other wireless communication signal processing section 19b, and antenna ATb connected to the wireless communication signal processing section 19b to the extended function section. The wireless LAN signal processing section 19a controls a wireless communication function based on, for example, Wi-Fi (registered trademark), and the wireless communication signal processing section 19b controls a proximity wireless communication function based on, for example, TransferJet (registered trademark).

The host interface 12 carries out interface processing between the card controller 11a and host 20.

On the other hand, the wireless communication interface 17a carries out interface processing between the card controller 11a and wireless LAN signal processing section 19a or the wireless communication signal processing section 19b. The memory interface 17b carries out interface processing between the card controller 11a and NAND flash memory 18.

The CPU 13 is a unit configured to manage operations of the entire memory device 11. A program configured to control the CPU 13 executes predetermined processing by using firmware (control program and the like) stored in the ROM 14 or by loading the firmware into the RAM 15. That is, the CPU 13 creates various tables and an extension register, to be described later, on the RAM 18, receives a write command, read command or erase command from the host 20 to access an area on the NAND flash memory 18, and controls data transfer processing through the buffer 16.

The ROM 14 stores therein firmware such as a control program to be used by the CPU 13. The RAM 15 is used as a work area of the CPU 13, and stores therein a control program, various tables, and an extension register to be described later.

When data sent from the host 20 is to be written to, for example, the NAND flash memory 18, the buffer 16 temporarily stores therein data of a given amount (for example, data of one page) and, when data read from the NAND flash memory 18 is to be sent to the host 20, the buffer 16 temporarily stores therein data of a given amount. Further, the buffer 16 can control the SD bus interface and back-end asynchronously by carrying out the control through the buffer 16.

The NAND flash memory 18 is constituted of, for example, memory cells of a stacked gate structure or memory cells of a MONOS structure.

In the wireless LAN signal processing section 19a, signal processing of the wireless LAN is carried out. Control is carried out through the wireless communication interface 17a.

As the host 20, for example, a digital camera, cellular phone, personal computer, and the like can be adopted. The host 20 is constituted of a host controller 21, CPU 22, ROM 23, RAM 24 and, for example, hard disk 25 (including an SSD). These are connected to each other by a bus.

The CPU 22 controls the entire host. The ROM 23 stores therein firmware necessary for the operation of the CPU 22. Although the RAM 24 is used as, for example, a work area of the CPU 22, a program which can be executed by the CPU 22 is also loaded here to be executed. The hard disk 25 holds various data items. In the state where the memory device 11 is connected to the host controller 21, the host controller 21 carries out interface processing between itself and the memory device 11. Furthermore, the host controller 21 issues various commands, to be described later, in accordance with instructions from the CPU 22.

(Configuration of Firmware)

FIG. 2 shows an example of the functional configuration of the firmware stored in the ROM 14 of the memory device 11. These functions are realized by the combination of software and hardware items such as the CPU 13 and the like constituting the controller 11a. The firmware is constituted of, for example, a command processing section 14a, flash memory controller 14b, extension register processing section 14c, and function processing program 14d. When the memory device 11 is activated, the extension register processing section 14c creates an extension register 31 in the RAM 15. The extension register 31 is a virtual register, and is enabled to define an extended function.

(Configuration of Extension Register)

As shown in FIG. 2, the extension register 31 is constituted of, for example, eight pages. One page is constituted of 512 bytes. In order to access the 512-byte extension register in units of one byte, addresses of at least 9 bits are required and, in order to access the eight pages, addresses of at least 3 bits are required. By the addresses of a total of 12 bits, all the spaces of the extension register are made accessible. Although 512 bytes is an access unit which can be supported by almost all hosts, the access unit is not limited to 512 bytes, and may be made larger than 512 bytes. When the extension register 31 is constituted of an address field of a long bit length, some lower bits are used as an access unit, and remaining upper bits are used to select one of a plurality of pages.

The reason for making the 512 bytes a unit is that the configuration is made in such a manner that a large number of memory card host controllers carry out read/write transfer by using one block (=512 bytes) as a unit. Although a host controller compatible with the wireless LAN can carry out read/write in units of one byte, not all the host controllers support the above read/write. In order to enable most host controllers to control the extended function, it is convenient if access can be carried out in units of 512 bytes.

Of the eight pages (page 0 to page 7), page 0 is an area configured to record a general information field in order to carry out the plug-and-play operation of the extended function. Details of the general information field will be described later. In pages 1 to 7, registers configured to control the extended functions are defined. A position can easily be specified in page 0, and hence page 0 is a suitable place to record the general information field, but the page in which the general information field is to be recorded is not necessarily limited to page 0, and a position in a specific page can be defined as a place configured to describe the general information field.

For read/write of the extension register, dedicated read/write commands to be defined as follows are used. These commands each have a first operation mode in which read/write of the extension register is carried out, and second operation mode in which a data port is configured.

(Read Command (CMD 48) of Extension Register)

Figure 3:
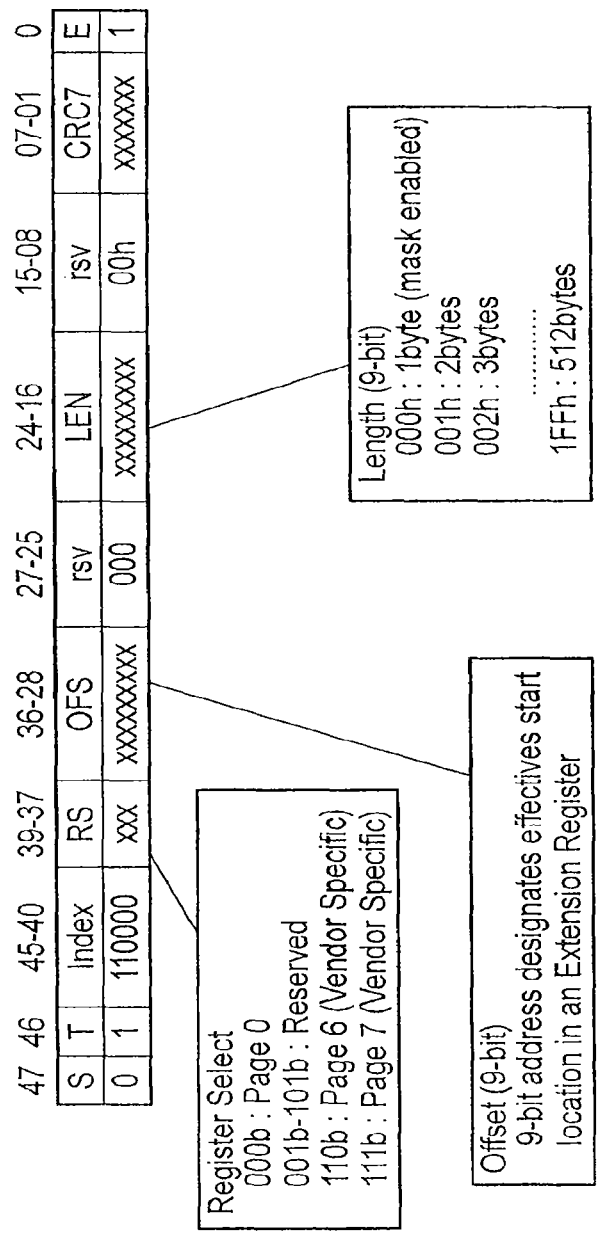
FIG. 3 is a block diagram showing an example of a read command of an extension register.

FIG. 3 shows an example of the field configuration of a read command (CMD 48) of the extension register. "S" indicates a start bit of the command, "T" is a bit indicating the transfer direction, and "index" indicates the command number. "RS" (register select) indicates a page in the extension register 31, and "OFS" indicates a position (offset from a head of the page) of data in the selected page. By using an "RS" of 3 bits, and "OFS" of 9 bits, a space corresponding to the 8 pages of the 512-byte extension register can be specified in units of one byte. More specifically, a read start position in the selected extension register is designated by "RS" and "OFS".

"LEN" indicates the data length. An effective data length necessary for read in the 512-byte extension register is designated by the 9-bit LEN field.

"CRC7" indicates a cyclic redundancy check code, and "E" indicates an end bit of the command. Further, "rsv" indicates a spare bit.

(Read Command of Extension Register, First Operation Mode)

FIG. 4 shows an example of a read operation of an extension register to be carried out in the first operation mode.

As shown in FIG. 4, upon receipt of a command (CMD 48) from the host 20, the memory device 11 returns a response (R1) to the host 20 and, thereafter reads a 512-byte data block from the extension register 31.

More specifically, by the arguments of the command (CMD 48), i.e., by "RS" and "OFS", a page in the extension register, and position of data to be read in the page are designated, and the data length is designated by "LEN". In the manner described above, the data in the designated extension register is set to the head of the 512-byte data block, and is read. Among data items in the 512-byte data block, data items having data lengths exceeding a data length specified by "LEN" become ineffective data items. A CRC code is added to the last part of the data block to make it possible to check whether or not the data has been properly received (checking of data is carried out by including ineffective data). Effective data items are arranged from the head, and hence it is not necessary for the host 20 to carry out an operation such as data shift or the like in order to look for effective data.

(Read Command of Extension Register, Second Operation Mode)

FIG. 5 shows an example of an operation of data port read to be carried out in the second operation mode.

Upon receipt of the command (CMD 48), the memory device 11 returns a response (R1) and, thereafter returns the 512-byte data block.

By arguments "RS" and "OFS" of the command, a position in a selected page of the extension register is designated. Although a plurality of bytes can be assigned to a data port, one byte is sufficient for the data port, and hence an example of a data port of a case of "LEN=1" (length is 1) is shown in FIG. 5. That is, it is sufficient if the data port occupies only an address of one byte on the extension register map. It is possible to read data of one block (512-byte unit) from the device assigned to this data port. That is, it is possible to read data of one block (512-byte unit) at one time. The read data is held in, for example, the buffer 16, and is then read by the host 20.

When the same data port is subsequently read, the subsequent 512-byte data can be read. The place from which data to be read from the data port is taken can be freely defined by the specification of the extended function. Regarding data port control, the control can be carried out by defining a control register on, for example, the extension register. A CRC code is added to the last part of the 512-byte data block to make it possible to check whether or not the data has been properly received.

(Write Command (CMD 49) of Extension Register)

Figure 6:
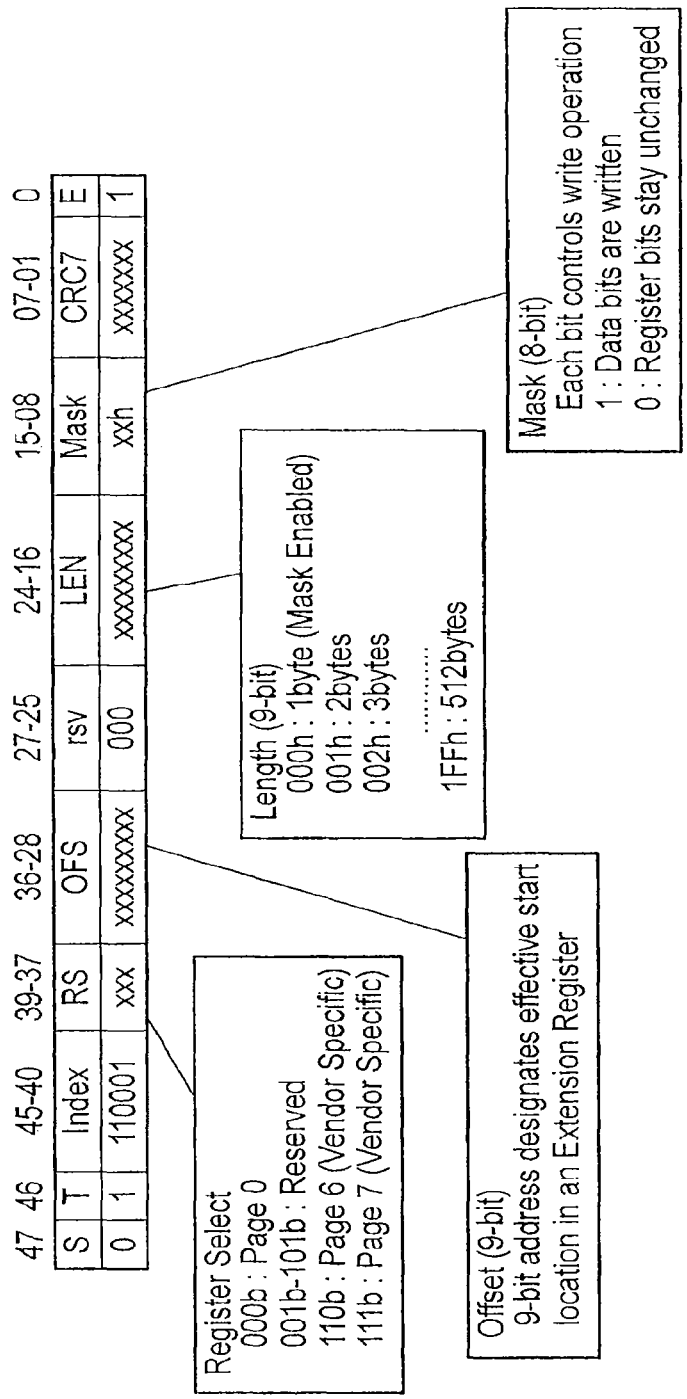
FIG. 6 is a block diagram showing an example of a write command of an extension register.

FIG. 6 shows an example of a write command of the extension register. In the write command (CMD 49), parts identical to the read command (CMD 48) are denoted by identical reference symbols. The write command and read command are distinguished from each other by "index". By using an "RS" of 3 bits, and "OFS" of 9 bits, a page in the extension register, and position of data in the selected page are designated. A length of data to be written to the 512-byte extension register is designated by a "LEN" field of 9 bits. Accordingly, it is possible to write data of an arbitrary data length (byte unit) within 512 bytes to an arbitrary page and place of the extension register.

The write command (CMD 49) is provided with a mask register in the argument of the command. That is, "Mask" indicates an 8-bit length mask register. By the mask register, it becomes possible to carry out an operation in units of one bit in data write of one byte, and write data to only a specific bit. Accordingly, in a bit operation within one byte, it is not necessary to carry out the read-modify-write operation.

When the data length is one byte, i.e., in the case of "LEN=0" (length is 1), the mask register becomes effective. Regarding a bit of the mask register "Mask" having data of "1", data is written to the bit, and regarding a bit of the mask register "Mask" having data of "0", the value already set is retained.

Figures 7A, 7B, 7C:
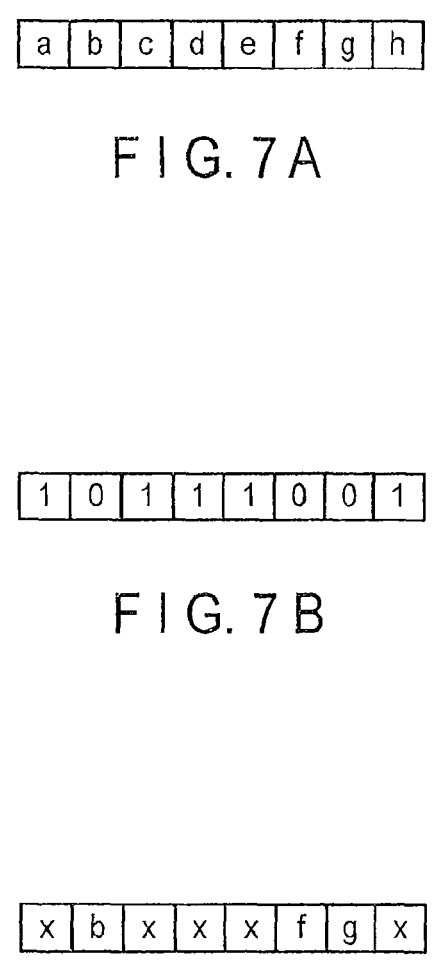

That is, when an extension register holding data shown in FIG. 7A is assumed, if data of the mask register is as shown in FIG. 7B, by executing a write command, data is written to a bit of the mask register having data of "1" as shown in FIG. 7C, and in a bit having data of "0", the original data is retained. Accordingly, it becomes possible to rewrite only the desired bits without carrying out the read-modify-write operation. The parts each indicated by "x" show the bits to which new data has been written.

Further, when longer mask data can be supplied by a separate means, even in the case of LEN greater than 1 (LEN>1), although mask write is enabled, in the example shown in FIG. 6, mask data is assigned to the command argument, and hence 8 bits are used.

(Write Command of Extension Register, First Operation Mode)

Figure 8:
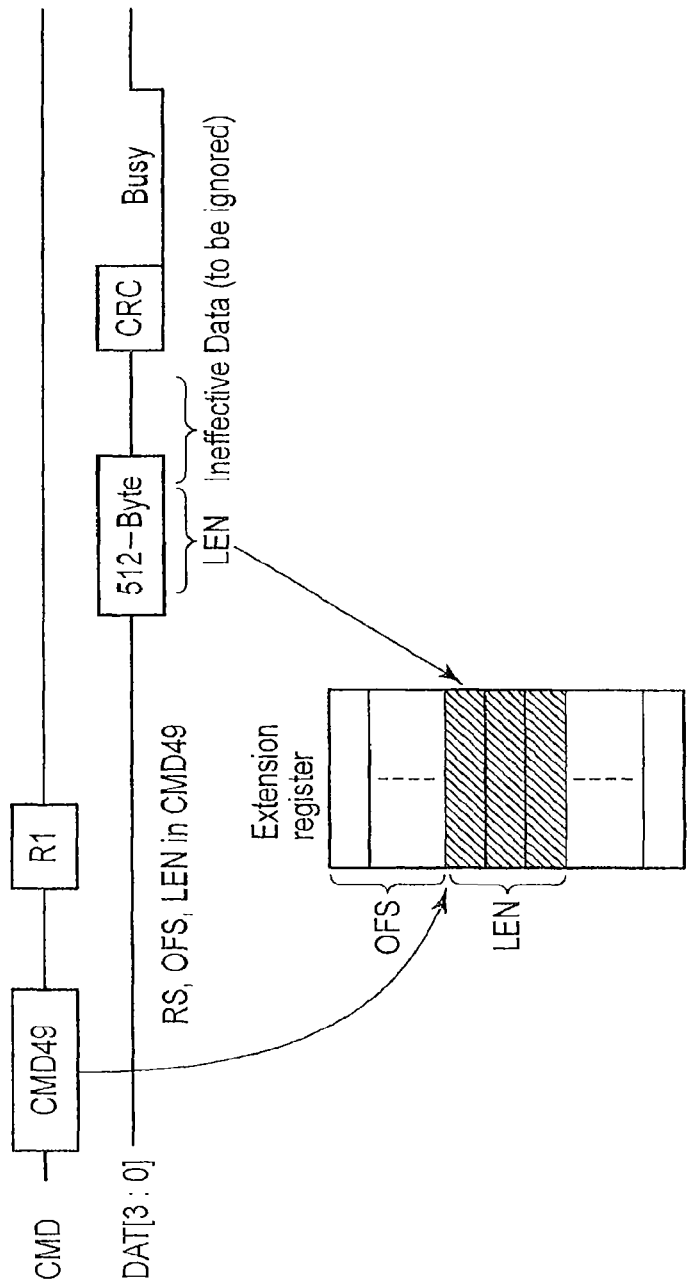
FIG. 8 is a timing chart showing a write operation of an extension register carried out in accordance with a write command.

FIG. 8 shows an example of a write operation of the extension register to be carried out in the first operation mode.

Upon receipt of the command (CMD 49), the memory device 11 returns a response (R1) and, thereafter receives a 512-byte data block.

The memory device 11 returns a CRC code indicating whether or not the data block has properly been received to the host 20. Thereafter, the memory device 11 returns information indicating the busy state until the processing of the command is completed, and notifies the host 20 of the timing at which the host 20 can issue the next command. The data block is held in the buffer 16.

In the command processing, a page and position in the extension register are designated by the arguments "RS" and "OFS" of the command, and a data length is designated by "LEN". Among the data blocks held in the buffer 16, data items each having a length designated by "LEN" are written to the extension register from the head thereof. Data in the data blocks having a length exceeding the data length designated by "LEN" is discarded as ineffective data.

By arranging effective data items from the head of the data block, it becomes unnecessary for the host system to carry out an operation of arranging the effective data items in the middle of the data block.

(Write Command of Extension Register, Second Operation Mode)

Figure 9:
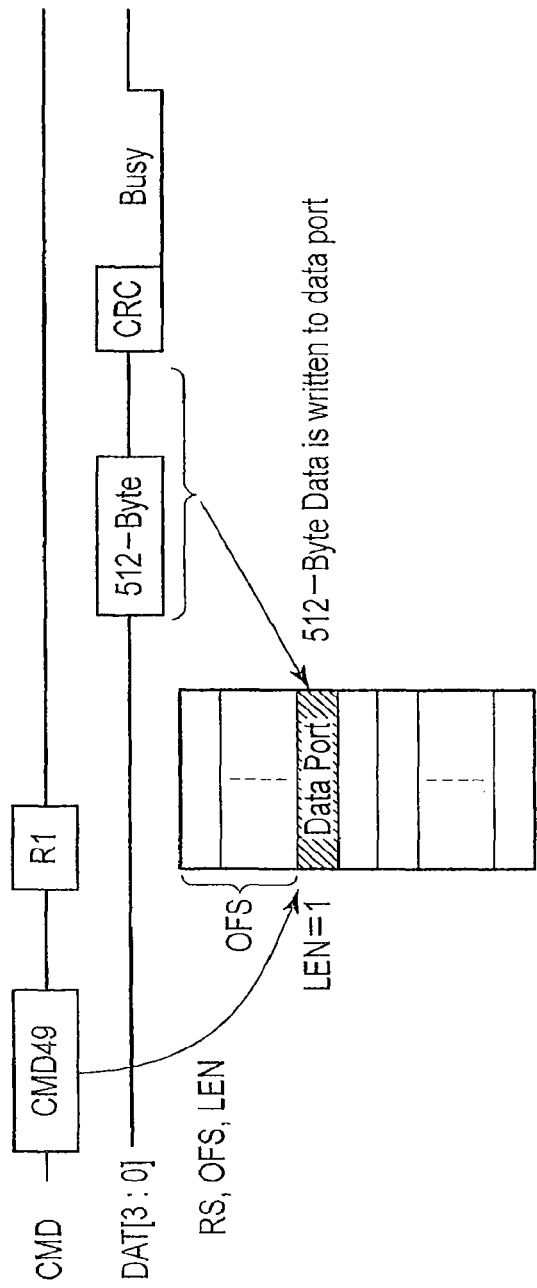
FIG. 9 is a timing chart showing a write operation of a data port carried out in accordance with a write command.

FIG. 9 shows an example of an operation of a write data port to be carried out in the second operation mode.

Upon receipt of the command (CMD 49), the memory device 11 returns a response (R1) and, thereafter receives a 512-byte data block.

The memory device 11 returns a CRC code indicating whether or not the data block has properly been received to the host. Thereafter, the memory device 11 returns information indicating the busy state until the processing of the command is completed, and notifies the host 20 of the timing at which the host 20 can issue the next command. The data block is held in the buffer 16.

In the command processing, a page and position in the extension register are designated by the arguments "RS" and "OFS" of the command, and a data port of one byte (LEN=0) is designated by "LEN". Although a plurality of bytes can be assigned to the data port, one byte is sufficient for the data port, and hence an example of a data port of a case of "LEN=0" (length is 1) is shown in FIG. 9. It is sufficient if the data port occupies only an address of one byte on the extension register map. It is possible to write data of one block (512-byte unit) held in the buffer 16 to a certain device assigned to this data port. That is, it is possible to write data of one block at one time.

When the same data port is subsequently written, the subsequent 512-byte data can be written to the device to which the data is assigned. The place to which the data of the data port is delivered can be freely defined by the specification of the extended function. Regarding data port control, the control can be carried out by defining a control register on, for example, the extension register.

(Usage example of information field in page 0)

FIG. 10 shows an example of the information field shown in page 0 of the extension register 31. By making it possible for the host 20 to specify a driver configured to control the extended function by using the information field, it is possible for the host system, when an extended function is added, to easily use the extended function, and realize plug-and-play.

A sequence example to be processed by a standard host driver will be described below with reference to FIG. 10.

(Structure Revision)

A structure revision is a revision configured to define the format of page 0 of the extension register 31. When new information is added to the device information field, which version of the information field is held is indicated by updating the structure revision. The host driver of the previous version ignores the new field.

(Data Length)

As a data length, the effective data length recorded in page 0 is shown.

(Number of Extended Functions (=N))

The number of extended functions indicates the number of extended functions supported by the device. At the time of start-up, the host driver repetitively checks whether or not the number of times drivers for extended functions were installed corresponds to the number of supported functions.

(Device 1 Function Identification Code)

When this code is set to the device 1 function identification code, it is indicated that the standard driver can be used. When the OS supports the standard driver, the device can be used without installing a dedicated driver. When a dedicated driver is installed, the dedicated driver is preferentially used. In the case of a nonstandard function, "0" is set to this field. In this case, this function is controlled by only a dedicated driver.

(Device 1 Manufacturer Identification Information, Device 1 Function Identification Information)

Each of the device 1 manufacturer identification information, and device 1 function identification information is information configured to specify a dedicated driver and, in each of these fields, a name of the manufacturer, name of the distributor or identification information of the extended function is described by using, for example, an ASCII character string. On the basis of these information items, the host driver checks whether or not a dedicated driver of the device 1 is installed.

As the function identification information, a model number of the device, revision, and the like are described by using, for example, an ASCII character string.

(Beginning Address of Next Device)

The beginning address of the next device indicates an address in page 0 in which device information of the next device is described. When the host system does not support this device, this device cannot be used, and hence the next device is checked. The fields after this are of a variable length, and hence a definition is set to this position.

(Device 1 Address Pointers 1 to X, Length Fields 1 to X)

The device I address pointers 1 to X, and length fields 1 to X indicate that a plurality of extension register areas can be defined for one function. The addresses and lengths are enumerated below. The length fields are not necessarily indispensable information items, and can be omitted.

(Device 1 Address Pointer 1 (Start Address), Length 1)

The first area of the extension register used by the device 1, beginning address in the space of pages 1 to 7 of the extension register, and size of the used extension register area are indicated by the device 1 address pointer 1.

That is, one or a plurality of extension register areas can be assigned to one device, and the address pointer indicates a place (start address) of an arbitrary extension area other than page 0. The length indicates a size for occupying the extension register having the pointer at the beginning address.

(Device 1 Address Pointer 2 (Start Address), Length 2)

A position and area size of the second area in the extension register assigned to the device 1 are indicated by the device 1 address pointer 2. Thereby, an application in which, for example, although a standard driver carries out control in only the first area, a dedicated driver is enabled to efficiently carry out control by using the first area and second area is enabled.

(Device 1 Address Pointer X (Start Address), Length X)

A position and area size of the Xth area assigned to the device 1 are indicated by the device 1 address pointer X.

As described above, a plurality of areas can be defined in the extension register. The areas are arranged in such a manner that they do not overlap each other. It is possible to check whether or not there is overlap between the areas by using the length information.

When an additional field becomes necessary, the additional field is additionally defined after this. A host which cannot recognize a new field reads the recognizable fields, and ignores the additional field. A skip can be carried out by using the above-mentioned (beginning address of the next device) field.

(Wireless LAN-Compatible SD Card)

Figure 11:
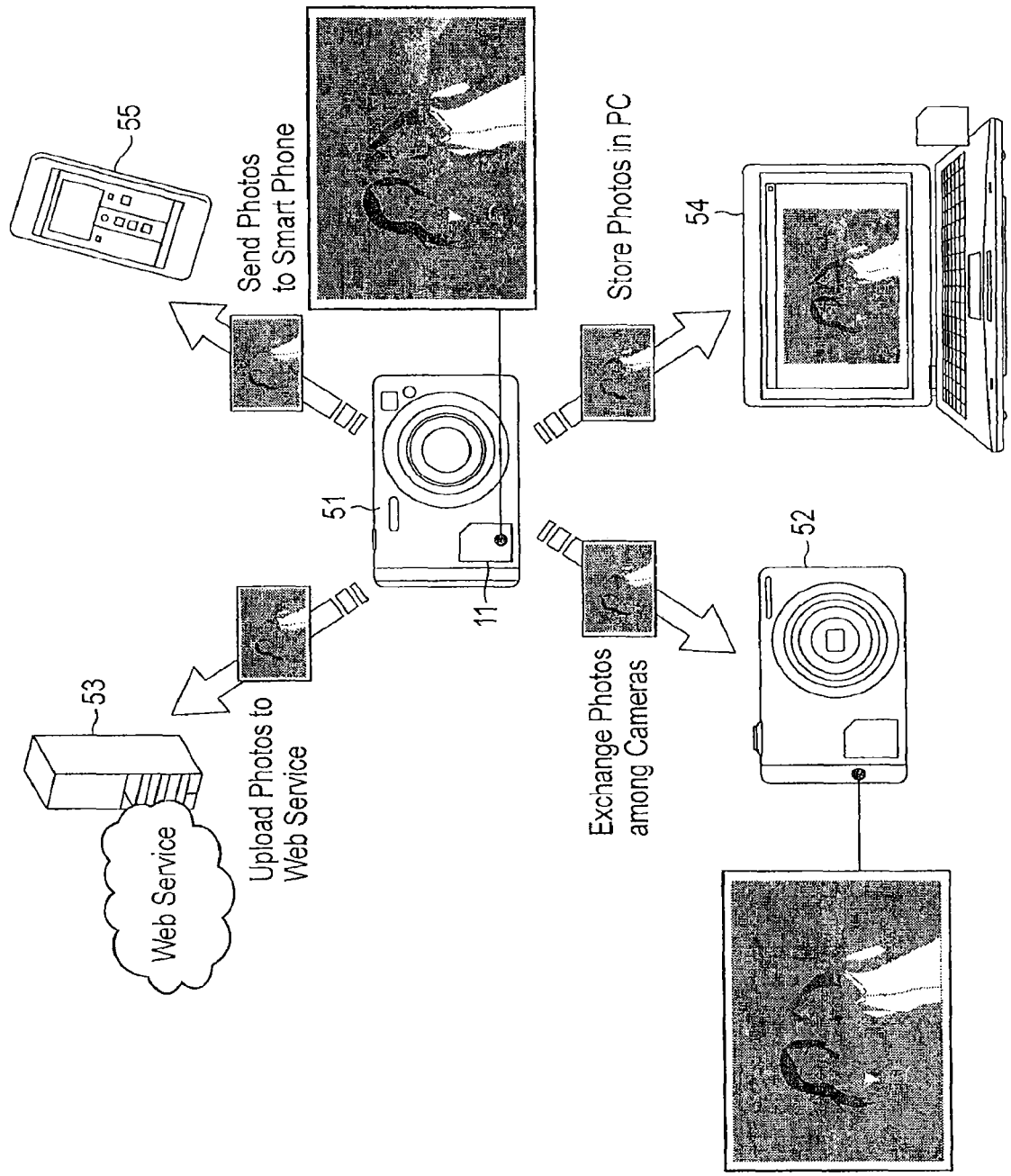
FIG. 11 is a block diagram showing a usage example of an SD card with a wireless local area network (LAN).

FIG. 11 shows a usage example of a memory device (SD card) 11 having a wireless communication function. The memory device 11 is installed in, for example, a digital camera 51 or 52, server 53, personal computer 54, and cellular phone 55 each of which serves as a host.

By using the memory device 11 having the wireless communication function together with a digital camera 51, it is possible for the memory device 11 to transmit photographic data to the other camera 52 on the wireless communication network, and receive data from the other camera 52. Further, it is also possible for the memory device 11 to connect itself to, for example, an external server 53 through the wireless communication network, and transfer photographic data from the digital camera 51 to the server 53. Furthermore, it is possible for the memory device 11 to connect itself to a device such as a personal computer 54, cellular phone 55 or the like through the wireless communication network, and transfer photographic data from the digital camera 51 to the personal computer 54 or the cellular phone 55.

FIG. 12 shows an interface function possessed by the memory device 11.

The memory device 11 having the wireless communication function also includes an interface function of serving as an interface with, for example, the digital camera 51 serving as a host device configured to control the memory device 11, and function of a network interface configured to carry out wireless LAN connection between the digital camera 51 and some other electronic device such as the camera 52, server 53, personal computer 54, television set 56, printer 57, and the like.

The aforementioned host interface (card interface) 12 has a function of accessing (reading/writing) data in the card through a FAT 32 in accordance with "SD Specifications Part 1" and "SD Specifications Part 2" standardized by SDA (SD Association), and function of accessing a register (for example, a Wi-Fi SD register) peculiar to a card having the wireless communication function. Here, for the access to the Wi-Fi SD register, a read command (CMD 48) and write command (CMD 49) are used. The read command (CMD 48) is, as described previously, a command configured to read data from an objective register in units of blocks, and the write command (CMD 49) is a command configured to write data to an objective register in units of blocks.

In this embodiment, for example, the host 20 issues a command peculiar to the Wi-Fi SD card to the memory device 11. Alternatively, the host 20 receives a status or a response peculiar to the Wi-Fi SD card from the memory device 11 by using the write command (CMD 49) in order to write data peculiar to the Wi-Fi SD card. Alternatively, this embodiment is characterized in that the read command (CMD 48) is used in order to read data peculiar to the Wi-Fi SD card.

In the wireless communication interface 17a, it is assumed that IEEE802.11b/g/n is supported in the physical layer, IPv4 and IPv6 are supported in the network layer, TCP is supported in the transport layer, SSL/TLS is supported in the presentation layer, and HTTP and FTP are supported in the application layer. Furthermore, the wireless interface 17a includes a digital living network alliance (DLNA) function for communication with a household device in some cases.

The memory device 11 includes two interfaces, whereby it becomes possible to transmit or receive photographic data (in the JPEG or RAW format) and animation data (in the MPEG-2 TS or MP4 format) created by a digital camera to or from a server or a device supporting the HTTP protocol. Furthermore, it becomes possible to reproduce photographic data and animation data, and carry out printing by using a server or a device supporting DLNA. Further, by additionally sending data (XML data and text data) created by the host device in addition to the photographic data and animation data, it becomes possible for the host device to carry out authentication in cooperation with the server and peripheral devices, and carry out transmission/reception of metadata.

Figure 13:
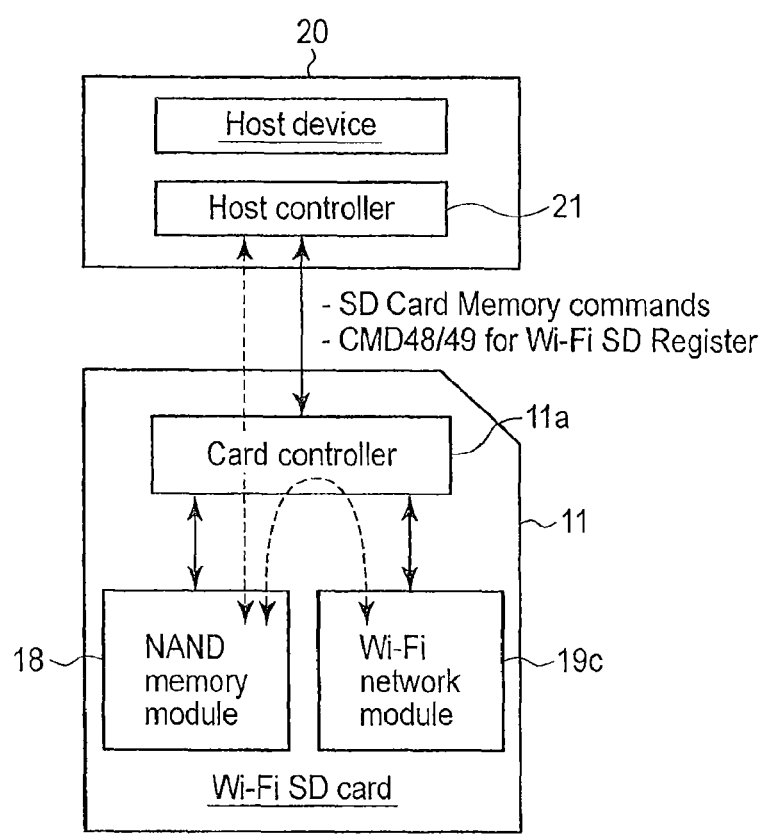
FIG. 13 is a view showing a configuration example of a Wi-Fi SD card and host device.

FIG. 13 shows a configuration example of a Wi-Fi SD card and host device.

As described previously, the host device 20 includes the host controller 21 configured to control the SD card 11, and can issue a command of "SD Specification Part 1" standardized by SDA in accordance with the card interface, and commands CMD 48 and CMD 49 configured to carry out control peculiar to the Wi-Fi SD card.

The SD card 11 includes a card controller 11a, NAND memory module (NAND flash memory) 18, Wi-Fi network module (wireless communication signal processing section 19b), and operates in accordance with a command issued from the host controller 21. In a general SD card, the card controller 11a can access the NAND memory module 18 to carry out read/write of data. In the Wi-Fi SD card of this embodiment, access (read/write) to the NAND memory module 18, access to the Wi-Fi network module 19c, and internal transfer of data recorded in the NAND memory module 18 to the Wi-Fi network module 19c are carried out. Alternatively, it is possible to carry out internal transfer of data of the Wi-Fi network module 19c to the NAND memory module 18. Thereby, it is possible for the Wi-Fi network module 19c to transmit, for example, photographic data recorded in the NAND memory module 18 to the outside without the intervention of the host device 20. That is, it is not necessary for the host device 20 to carry out the complicated control of the Wi-Fi network module 19c.

Furthermore, the photographic data is not internally transferred through the card interface, and hence the transfer speed can be increased. For example, when the internal transfer of the photographic data is controlled by a direct memory access (DMA) register in the card controller, it is possible for the host device 20 and SD card 11 to operate independently of each other.

Further, it is possible to automatically and directly record status information of the Wi-Fi network module 19c, and data downloaded from a server of the external network in the NAND memory module 18 without the host device 20 successively managing the data items.

FIG. 14 shows another configuration example of the SD card 11 and host device 20.

In FIG. 14, unlike FIG. 13, the SD card has no Wi-Fi function, and is constituted of a card controller 11b and NAND memory module 18. Further, the host device 20 has the Wi-Fi function. That is, the host device 20 includes a host controller 21, Wi-Fi network module 19c, and card controller 25 configured to separate the read command (CMD 48) and write command (CMD 49) from each other.

This configuration enables control of the Wi-Fi network module 19c by using the same control method as that of FIG. 13 when the digital camera has the Wi-Fi function.

FIG. 15 shows an example of an extension register to be accessed by using the read command (CMD 48) and write command (CMD 49). As described previously, page 0 of the extension register serves as an index of page 1 and pages subsequent to page 1, and the host device 20 can learn, by reading page 0, information about the type of the function possessed by the card, version information and profile information (information about supported functions among optional functions) about supported functions of the card, driver information (information about the manufacturer from which the driver is provided, and information about the version of the driver) used to control the function, and the like. For example, when a certain card has, together with the Wi-Fi function, the Bluetooth (registered trademark) function, a register configured to access the Bluetooth function is assigned to, for example, page 2. The host device 20 can access pages 1 and 2 as the need arises, and simultaneously use each of the functions of the pages. Thereby, it is possible to realize an operation of downloading data from an external server to temporarily record the data on the card by using the Wi-Fi function, and transferring, by using the Bluetooth function, the recorded data to the peripheral devices to reproduce or display the transferred data.

Figure 16:
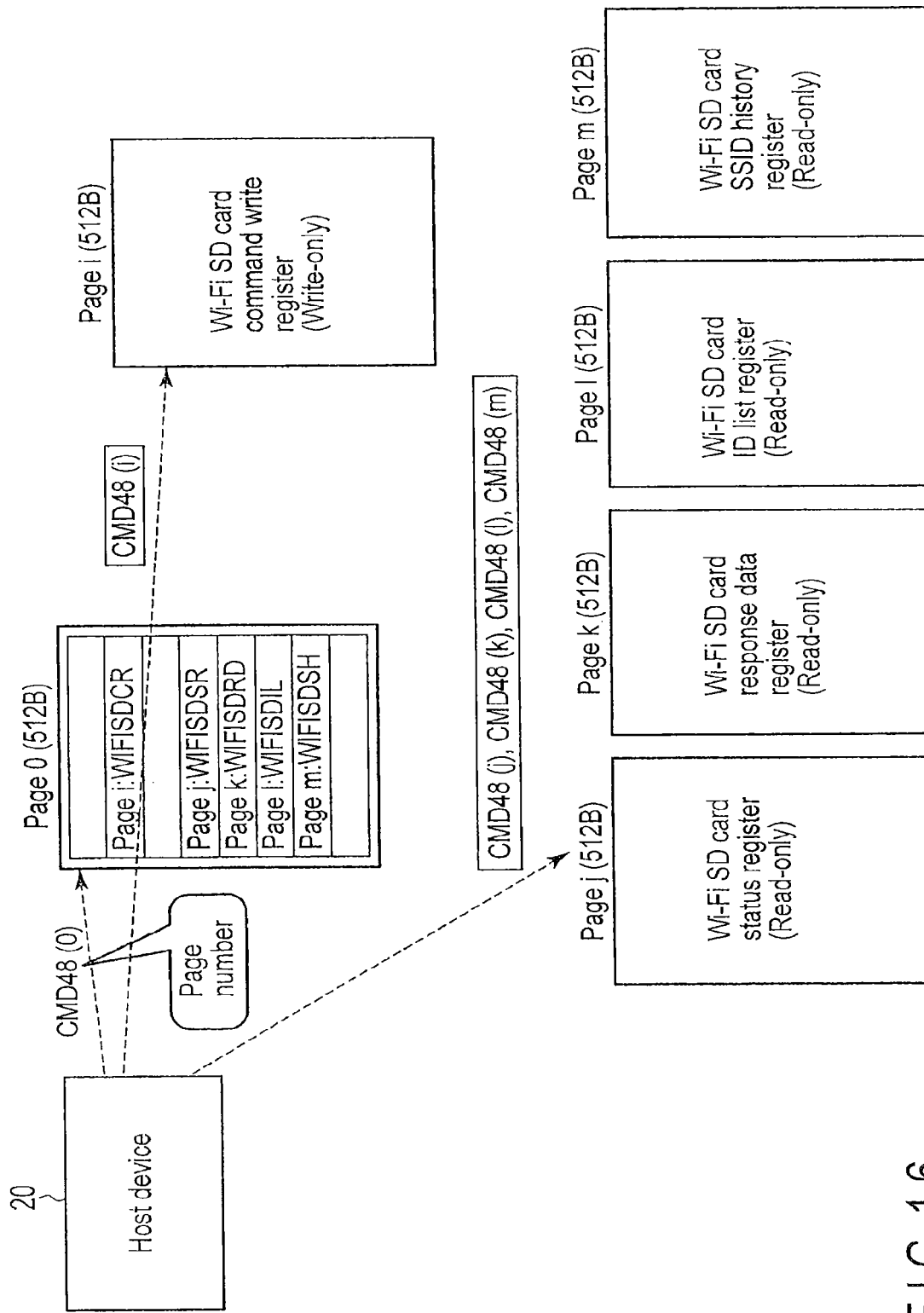
FIG. 16 is a view showing an example of a case where an extension register is used for a Wi-Fi SD card.

FIG. 16 shows an example of a case where an extension register is used in the Wi-Fi SD card.

The Wi-Fi SD card is constituted of five types of extension registers in accordance with the use thereof. A Wi-Fi SD card command write register is a register exclusively used for data write, and is accessed when the host device issues a command to the card. A Wi-Fi SD card status register is a register exclusively used for data read, and is accessed when the host device acquires status information of the card. A Wi-Fi SD card response data register is a register exclusively used for data read, and is accessed when the host device acquires data (HTTP response data) downloaded by the host device from the external server to the card. A Wi-Fi SD card ID list register is a register exclusively used for data read, and is accessed when the host device acquires an ID list of the other device connected (or is requested to be connected) to the card. A Wi-Fi SD card SSID history register is a register exclusively used for data read, and is accessed when the host device acquires a list of an SSID (or SSID to which the card has not been connected, and to which the card has been requested to be connected) to which the card has been connected in the past.

Further, although not shown, a Wi-Fi SD card command response register is a register exclusively used for data read, and is accessed when the host confirms whether or not a command issued by the host could have been received by the card. Furthermore, although not shown, a Wi-Fi SD card asynchronous command response register is a register exclusively used for data read, and is accessed when the host confirms the progress (that the command is in an unprocessed state, in an in-process state, in a successful state after the processing or in an unsuccessful state after the processing) of the processing of a command carried out by the card, the command being issued by the host.

In this embodiment, a case where each of the above Wi-Fi SD registers is assigned to a page of the extension register will be described. First, the host device 20 reads page 0 of the extension register by using a read command (CMD 48), then checks whether or not the Wi-Fi SD function is implemented in the card, and further confirms which page should be accessed in order to use each function. Here, pairs of page numbers (i, j, k, l, and m), and abbreviations of the Wi-Fi SD registers (WIFISDCR, WIFISDSR, WIFISDRD, WIFISDIL, and WIFISDSH) are recorded in page 0.

When the host device 20 is to issue a command to the card, the host device 20 carries out write to the Wi-Fi SD card command write register which is a register for command issuance by using a write command (CMD 49). At this time, it is known from the information about page 0 that the register in question is present in page 1, and hence page i is designated as an argument of the command CMD 49. Likewise, when the host device 20 is to acquire status information or the like from the card, the host device 20 reads data from one of the Wi-Fi SD card status register, Wi-Fi SD card response data register, Wi-Fi SD card ID list register, and Wi-Fi SD card SSID history register which are registers for data acquisition by using a read command (CMD 48). At this time, as arguments of the command CMD 48, j, k, l, and m which are page numbers corresponding to the registers are designated.

Here, in this embodiment, although a register for data write, and a register for data read are assigned to different pages, each of the registers is made exclusive for data write or data read, and hence it is also possible to assign these registers to the same page.

Figure 17:
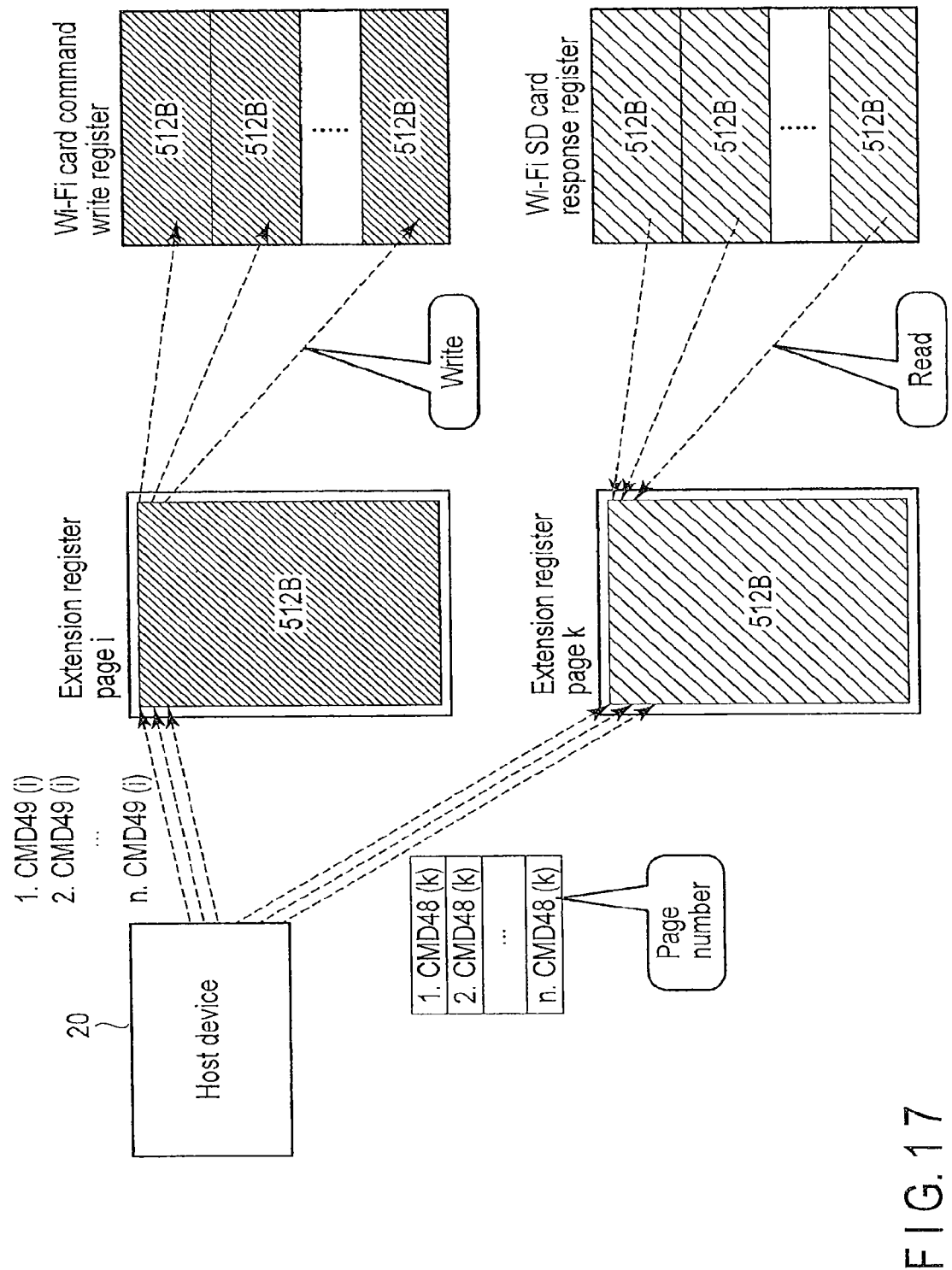
FIG. 17 is a view showing an example of a case where data of an amount exceeding 512 bytes is read/written when a Wi-Fi SD register is assigned to a page of an extension register.

FIG. 17 shows an example of a case where data of an amount exceeding 512 bytes (maximum size of an extension register per page) is read/written when a Wi-Fi SD register is assigned to a page of an extension register.

The maximum size of the extension register per page is limited to 512 bytes. However, the host device 20 successively issues read commands (CMD 48) or write commands (CMD 49), whereby read or write of data of an amount exceeding 512 bytes is enabled. For example, when data of an amount exceeding 512 bytes is to be written to the Wi-Fi SD card command write register, the host device writes first 512-byte data to the register by using a write command CMD 49.

More specifically, the host device designates a page by using register select "RS" of the command CMD 49, sets offset "OFS" to "0", and then designates 512 bytes by using data length "LEN". That is, first, the host device 20 sets "RS" to "1", sets "OFS" to "0", and sets "LEN" to 512 bytes and, thereafter writes 512-byte data to the Wi-Fi SD card command write register. Subsequently, the host device 20 sets "RS" to "2", sets "OFS" to "0", and sets "LEN" to 512 bytes and, thereafter writes 512-byte data to the Wi-Fi SD card command write register. Such an operation is successively repeated.

Here, a data size (Nw) of the data to be written to the Wi-Fi SD card command write register is recorded in the first 512-byte data. Accordingly, the SD card can recognize that the host device 20 is to issue the command CMD 49 the number of times corresponding to ceil (Nw/512). It should be noted that ceil 0 indicates rounding up of figures after the decimal fractions. That is, for example, when the data length is 513 bytes, it means that commands are issued twice.

On the other hand, when data of an amount exceeding 512 bytes is to be read from the Wi-Fi SD card response data register, the host device 20 repetitively reads the first 512-byte data from the register by using a read command (CMD 48). The method of setting an argument of the command CMD 48 is identical to that of the command CMD 49.

Here, a data size (Nr) of the data to be read from the Wi-Fi SD card response data register is recorded in the first 512-byte data. Accordingly, the host device 20 recognizes, by reading the data, that the host device 20 should issue the command CMD 48 the number of times corresponding to ceil (Nr/512).

For example, if a problem occurs while the host device 20 is carrying out read or write, the host device 20 stops the processing. In this case, it is possible for the host device 20 to stop the processing by issuing an Abort ( ) command used to stop processing, or by waiting for time-out processing to be carried out according to the time-out time set to the SD card.

Figure 18:
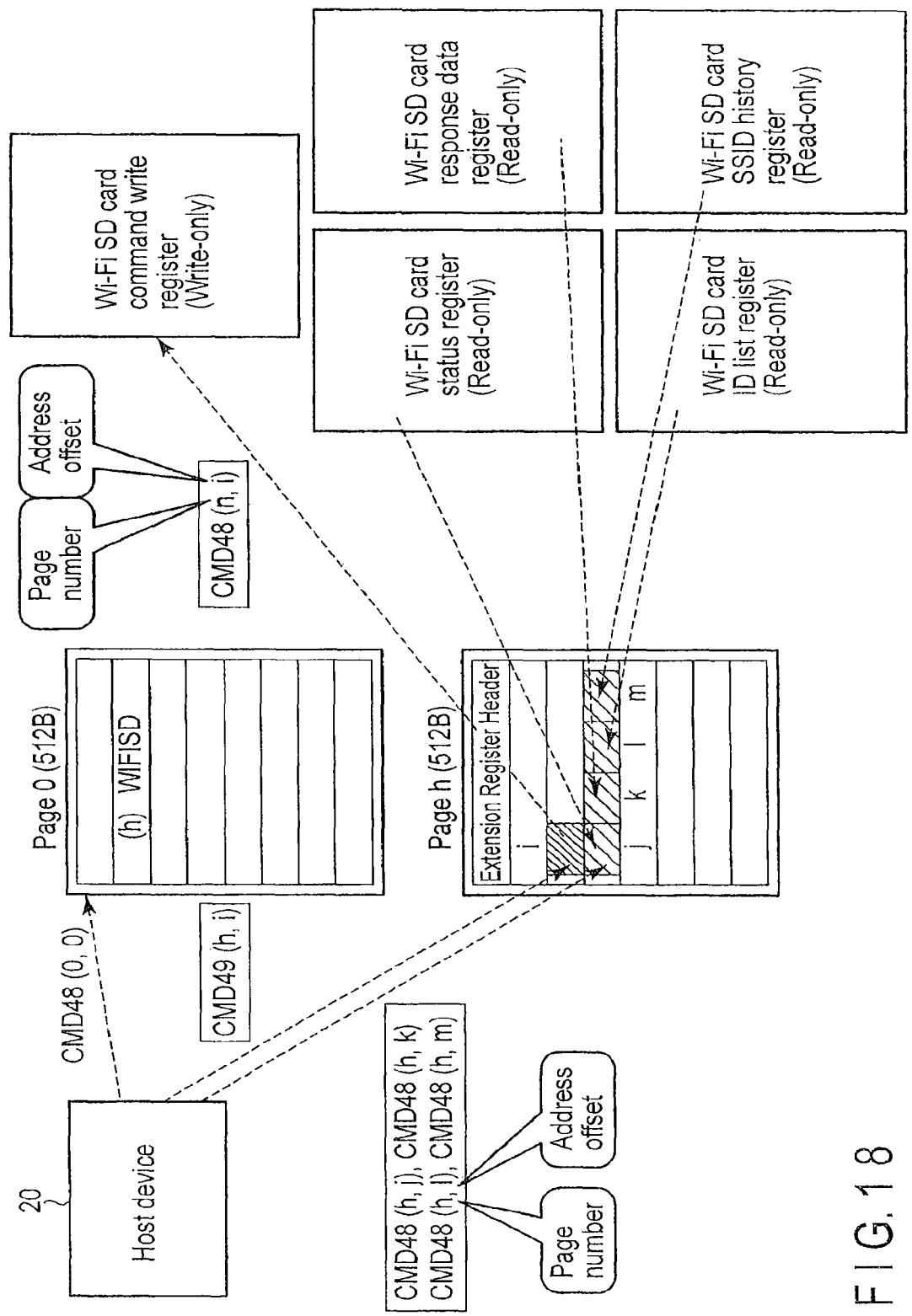
FIG. 18 is a view showing another example of the case where the extension register is used for the Wi-Fi SD card.

FIG. 18 shows another example of the case where the extension register is used for the Wi-Fi SD register. For example, when a status of wireless communication is transferred from the host device 20 to the extension register or when data of the extension register is transferred to the SD register, it is not necessary to transfer all the 512-byte data, and it is sufficient if specific data of a short data length is transferred in some cases. FIG. 18 shows an example of data transfer of such a case.

More specifically, a page of the extension register is designated by using the argument "RS" of the read command (CMD 48) or the write command (CMD 49), and further an offset address of the designated page is designated by using "OFS".

In this example, each of the five types of the Wi-Fi SD registers is assigned to an address (i, j, k, l or m) corresponding to one byte in a certain page (h) of the extension register.

First, the host device 20 reads page 0 of the extension register by using the read command (CMD 48), then checks whether or not the Wi-Fi SD function is implemented in the card, and further confirms which page should be accessed in order to use each function.

Here, pairs of the page number (h) plus offset addresses (i, j, k, l, and m), and abbreviations of the Wi-Fi SD registers (WIFISDCR, WIFISDSR, WIFISDRD, WIFISDIL, and WIFISDSH) are recorded in page 0.

When the host device 20 is to issue a command to the SD card, the host device 20 carries out write to the Wi-Fi SD card command write register which is a register for command issuance by using a write command (CMD 49). At this time, it is known from the information about page 0 that the register in question is present at an offset address "1" in page "h", and hence "RS"="h" and "OFS"="1" are designated as arguments of the command CMD 49.

On the other hand, when the host device 20 acquires status information or the like from the SD card, data is read from one of the Wi-Fi SD card status register, Wi-Fi SD card response data register, Wi-Fi SD card ID list register, and Wi-Fi SD card SSID history register which are registers as data acquisition, by using a read command (CMD 48). At this time, as arguments of the command CMD 48, page numbers corresponding to the registers, and (h, j), (h, k), (h, l), and (h, m) which are offset addresses are designated. That is, "RS" is set to "h", and "OFS" is set to one of j, k, l, and m.

In the embodiment shown in FIG. 18, although the configuration of the extension register, and the configuration of each Wi-Fi SD register do not correspond to each other, the embodiment has an advantage that the consumption amount of the extension register is small.

Further, in FIG. 18, although the register for data write (Wi-Fi SD card command write register) and registers for data read (Wi-Fi SD card status register, Wi-Fi SD card response data register, Wi-Fi SD card ID list register, and Wi-Fi SD card SSID history register) are assigned to different offset addresses, each of the registers is used exclusively for data write or data read, and hence it is also possible to assign the registers to the same offset address.

Figure 19:
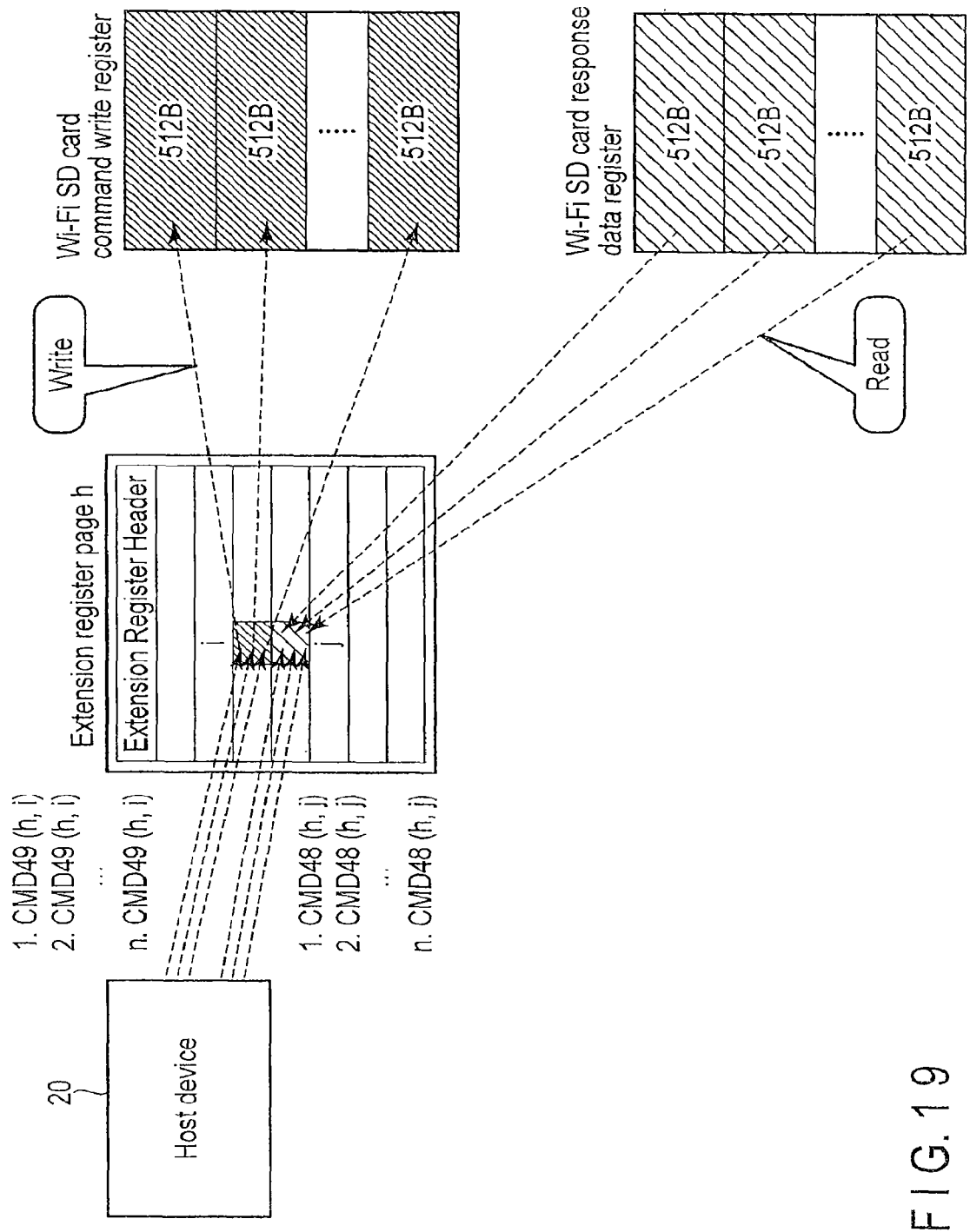
FIG. 19 is a view showing another example of the case where the extension register is used for the Wi-Fi SD card.

FIG. 19 shows an example of a case where when the Wi-Fi SD registers are assigned to addresses of a certain page, data of an amount exceeding 512 bytes, i.e., data of a size exceeding the maximum size of the extension register per page is read/written.

Like the example shown in FIG. 17, although the amount of data which can be transferred to the extension register is limited to 512 bytes, read or write of data of an amount exceeding 512 bytes is enabled by successive issuance of the command CMD 48 or CMD 49 carried out by the host device 20. In this case, the data recorded in page h of the extension register has a function of serving as, for example, an index of 512-byte data items recorded in the Wi-Fi SD card command write register, and Wi-Fi SD card response data register.

Accordingly, it is possible to write 512-byte data to the Wi-Fi SD card command write register by designating the page "h" of the extension register, offset "OFS", and "LEN", while setting "OFS" to "i", and setting "LEN" to 512 bytes by means of the arguments of the write command (CMD 49), and it is also possible to successively write 512-byte data to the Wi-Fi SD card command write register by successively issuing the write command (CMD 49).

Further, it is possible to read 512-byte data in the Wi-Fi SD card response data register by designating the page "h" of the extension register, offset "OFS", and "LEN", while setting "OFS" to "j", and setting "LEN" to 512 bytes by means of the arguments of the read command (CMD 48), and it is also possible to successively read 512-byte data from the Wi-Fi SD card response data register by successively issuing the read command (CMD 48).

Here, a data size (Nw) of data to be written to the Wi-Fi SD card command write register is recorded in the first 512-byte data. Accordingly, the SD card recognizes, by reading the data, that the host device 20 is to issue the command CMD 49 the number of times corresponding to ceil (Nw/512). It should be noted that ceil ( ) indicates rounding up of figures after the decimal fractions. That is, for example, when the data length is 513 bytes, it means that commands are issued twice.

On the other hand, when data of an amount exceeding 512 bytes is to be read from the Wi-Fi SD card response data register, the host device 20 repetitively reads the first 512-byte data from the register by using a read command (CMD 48). The method of setting an argument of the command CMD 48 is identical to that of the command CMD 49.

Here, a data size (Nr) of the data to be read from the Wi-Fi SD card response data register is recorded in the first 512-byte data. Accordingly, the host device 20 recognizes, by reading the data, that the host device 20 should issue the command CMD 48 the number of times corresponding to ceil (Nr/512).

For example, if a problem occurs while the host device 20 is carrying out read or write, the host device 20 stops the processing. In this case, it is possible for the host device 20 to stop the processing by issuing an Abort ( ) command used to stop processing, or by waiting for time-out processing to be carried out according to the time-out time set to the SD card.

FIG. 20 is a view showing still another example of the case where the extension register is used for the Wi-Fi SD register.

FIG. 20 shows a case where a plurality of Wi-Fi SD card commands configured to control wireless communication are included in data issued by using one write command (CMD 49), and a case where a plurality of statuses are included in data issued by using one read command (CMD 48). Issuance of a plurality of Wi-Fi SD card commands is employed, for example, when transfer of a plurality of files is successively carried out.

The Wi-Fi SD card command write register is constituted of, for example, a command register section, and argument register section, and the Wi-Fi SD card response data register is constituted of, for example, a response register section, and response data register section.

In the Wi-Fi SD card command write register, a register for command issuance is assigned to each command in the command register section, and a value is written to a corresponding register in accordance with an ID of a written command. In the argument register section, a register for argument data write is assigned to each argument, and argument data is written to a corresponding register in accordance with contents of an ID of a written command.

For example, when a command CMD 49 (i, x) is issued from the host device 20, "i" indicates a page number of the extension register, "x" indicates a command ID, then the command ID=x, and argument data of the number (m) of arguments corresponding to the command ID are written to the extension register, and a value is written to each of a corresponding command register, and argument register in the Wi-Fi SD card command write register.

It should be noted that "x" may be defined as an offset address of a register of a corresponding command ID.

On the other hand, in the Wi-Fi SD card response data register, a register for status information is assigned to each command in the response status register section, and a value is read from a corresponding register for status information in accordance with an ID of a command written to the Wi-Fi SD card command write register. In the response data register section, a register for response data is assigned to each command ID, and response data is read from a corresponding register in accordance with contents of an ID of a written command.

When, for example, a command CMD 48 (j, y) is issued from the host device 20, "j" indicates a page number, "y" indicates a command ID, and status information and response data corresponding to the command ID="y" are read by the host device 20 from the Wi-Fi SD card status register and the Wi-Fi SD card response status register through the extension register.

It should be noted that "y" may be defined as an offset address of a register of a corresponding command ID.

In the embodiment shown in FIG. 20, values of the Wi-Fi SD registers are assigned to the corresponding functions and processing items in a one-to-one correspondence. Accordingly, it is possible to carry out efficient processing without carrying out processing of interpreting the contents of the register.

Hereinafter, although details of the Wi-Fi SD registers will be described below on the basis of a case where each of the Wi-Fi SD registers described by using FIG. 18 and FIG. 19 is assigned to an address of a certain page, the description can also be applied to other embodiments.

According to the embodiment shown in FIG. 20, it is possible to transfer data including a plurality of Wi-Fi SD card commands or the like by using one command (CMD 49 or CMD 48), and hence it is not necessary to issue the command (CMD 49 or CMD 48) a plurality of times. Accordingly, data can be efficiently transferred, and high-speed processing is enabled.

FIG. 21 shows an extension register of the case where the extension register is used for the Wi-Fi SD card.

In FIG. 21, "Wi-Fi SD Card Identifier" is information indicating that an extension register is used for the Wi-Fi SD card, and a character string "WIFISD00" is recorded therein.

"Wi-Fi SD Card Specification Version" is a version of the Wi-Fi SD card standard supported by the Wi-Fi SD card, and when, for example, Ver. 1.0 is supported, a hexadecimal number "0x0100" is recorded therein.

"Wi-Fi SD Card Profile Indicator" is information configured to indicate functions supported by the Wi-Fi SD card. Among the Wi-Fi SD card functions shown in, for example, FIG. 39, applications which can be used by the Wi-Fi SD card are indicated. After first acquiring this information, it is necessary for the host to execute only functions supported by the card.

In "Vendor Unique ID", a character string of an ID of a vendor manufactured the card is recorded. By referring to this ID, the host can recognize the card vendor, and additional functions unique to the card vendor are implemented in the card, whereby the host can recognize that the host can use the functions.

In "Vendor Unique Field", the card vendor can record information unique thereto, and can rerecord information indicating which functions of additional functions unique to the card vendor are implemented in the card.

"Command Write Register Port" is a data port configured to access the Wi-Fi SD card command write register used by the host device to issue a command to the card.

"Status Register" is a memory area used by the host device to acquire status information about the card, and is included in the Wi-Fi SD card status register.

"Command Response Status Register" is a memory area used by the host device to acquire response status information about a command issued by the host device, and is included in the Wi-Fi SD card status register.

"Asynchronous Command Response Status Register" is a memory area used to acquire response status information particularly about asynchronous commands among commands issued by the host device, and is included in the Wi-Fi SD card status register. The asynchronous command mainly corresponds to a command configured to transmit/receive data through a network and, even while the asynchronous command is executed, other commands can be executed. It should be noted that the asynchronous command corresponds, in FIG. 23, to SendHttpMessage, SendHttpFile, SendHttpSSLMessage, SendHttpSSLFile, SendHttpMessageByRegister, SendHttpFileByRegister, SendHttpSSLMessageByRegister, SendHttpSSLFileByRegister, and GetFile.

"Response Data Register Port" is a data port used by the host device to access the Wi-Fi SD card response data register configured to acquire, from the card, data (HTTP response data) downloaded from an external server.

"ID List Register Port" is a data port used by the host device to access the Wi-Fi SD card ID list register used by the host device to acquire an ID list of the other device connected (or requested to be connected) to the card.

"SSID History Register Port" is a data port used by the host device to access the Wi-Fi SD card SSID history register used by the host device to acquire a list of SSIDs to which the card has been connected in the past (or SSIDs to which the card has not been connected, but to which the card has been requested to be connected).

FIG. 22 shows a configuration example of the Wi-Fi SD card command write register.

The "Wi-Fi SD Card Register Identifier" is information indicating that this register is the Wi-Fi SD card command write register, and a character string "WIFISDCR" is recorded therein.

The "Size of Wi-Fi SD Card Register" is information indicating a size of a register, and by referring to this information, the card learns how many times the command CMD 49 should be issued, and what size of data should be received.

The "Number of Wi-Fi SD Command Information" is information indicating how many Wi-Fi SD commands have been issued by write to the Wi-Fi SD card command write register carried out once. By making a list of commands of a number designated by the host, the card carries out sequential processing of the listed commands. Furthermore, it is also possible for the card to rearrange the commands in the order in which the highest efficiency can be obtained according the type of the command, and carry out parallel processing for the commands for which parallel execution can be carried out. For example, when data is uploaded to a plurality of servers, processing for a server to which no load is applied is preferentially carried out and, when the transfer rate of the card is sufficiently higher than the network transfer rate of the server of the transfer destination, it becomes possible to simultaneously execute transfers to a plurality of servers.

The "Wi-Fi SD Command Information" is constituted of "Wi-Fi SD command id", "Wi-Fi SD command sequence id", "Total Number of Arguments", "Length of Argument", and "Argument".

"Wi-Fi SD command id" indicates the type of a Wi-Fi SD command to be issued, and one of Wi-Fi SD commands shown in FIGS. 23 to 25 is recorded.

"Wi-Fi SD command sequence id" is a value assigned by the host in order to recognize and distinguish issued Wi-Fi SD commands one by one, and the host can learn the state of each of the issued commands by the Wi-Fi SD card status register.

"Number of Arguments" is the number of issued arguments, "Length of Argument" indicates a size of argument data, and "Argument" indicates argument data.

FIGS. 23 to 25 each show a list of commands to be written to the Wi-Fi SD card command write register.

The "ScanWiFi" command is constituted of a command having no argument. When the command is executed, the host requests the card to search for a wireless LAN to which the card can be connected, and the result can be stored in the "SSIDLIST" shown in FIG. 43.

The "SetSSID" command is constituted of three arguments including "ssid" indicating an SSID name, "passphrase" indicating a passphrase, and "authentication" indicating an authentication method. The host can either set an SSID name and passphrase of a wireless LAN to which the card is to be connected for the sake of "Server Upload Application" and "P2P Application" or set an SSID name, passphrase, and authentication method of a wireless LAN to be constructed for the sake of "P2P Restricted Server Application" and "P2P Server Application". It should be noted that this setting is used when the "StartApplication" command is executed to connect to a wireless LAN or to constitute a wireless LAN. It should be noted that the authentication method implies an authentic method of a network, and data encryption method, and one of "Open System and no encryption", "Open System and WEP", "Shared Key and WEP", "WPA and TKIP", "WPA and AES", "WPA-PSK and TKIP", "WPA-PSK and AES", "WPA2 and TKIP", "WPA2 and AES", "wPA2-PSK and TKIP", and "WPA2-PSK and AES" is selected by the host.

The "SetCurrentTime" command is constituted of two arguments of "currentDate" indicating the current date, and "currentTime" indicating the current time. When the command is executed, the current date, and current time designated by the host can be set to the card. When power is not supplied to the card at all times, it is difficult to retain the date/time information in the card at all times. In such a case, the host carries out date/time setting for the card, whereby the card can retain the date/time information, and the current date/time can be set to data requiring date/time information such as a file created by the card.

Figure 35:
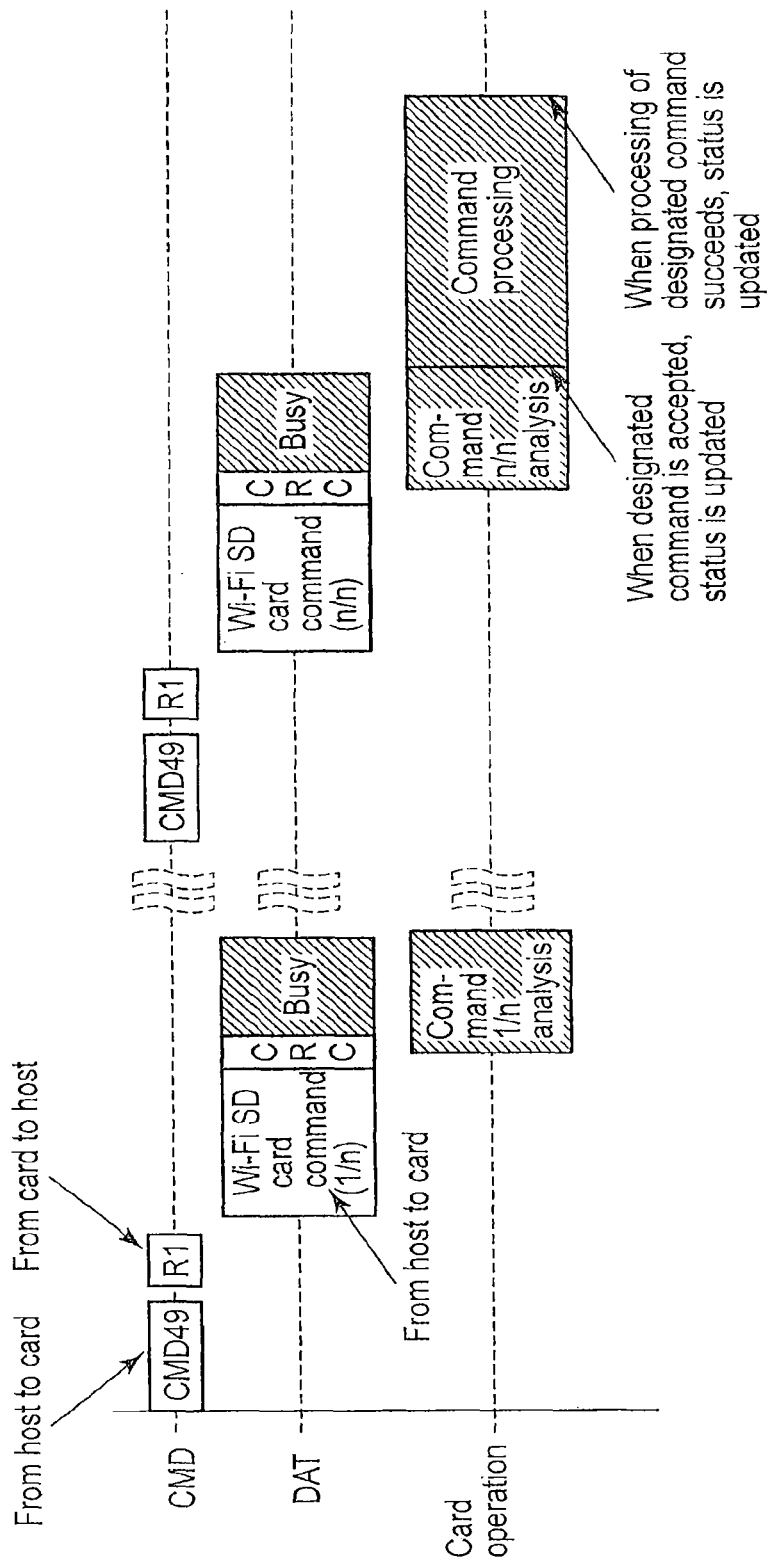
FIG. 35 is a timing chart showing a case where commands of a Wi-Fi SD card are issued by using a plurality of write commands (CMD 49).

The "StartApplication" command is constituted of three arguments of "application" indicating an application to be activated, "currentDate" indicating the current date, and "currentTime" indicating the current time. When the command is executed, it is possible to carry out connection to a wireless LAN in accordance with the setting of the wireless LAN network or to carry out construction of a wireless LAN. Then, it is possible to carry out activation of the designated applications ("Server Upload Application", "P2P Server Application", "P2P Restricted Server Application", "P2P client Application", "DLNA Server Application", "DLNA Controller Application" which are shown in FIG. 35). If activation setting of Wi-Fi Protected Setup (WPS) has already been carried out by the "SetWPS" command, connection to the wireless LAN before the application activation or constitution thereof is carried out by the WPS. If an SSID has already been set by the "SetSSID" command, connection to the wireless LAN or constitution thereof is carried out by using the setting. If an SSID has not been set by the "SetSSID" command yet, connection to the wireless LAN or constitution thereof is carried out by using one SSID recorded in "SSID History" in the card shown in FIG. 32.

The "SetWPS" command is constituted of two arguments of "mode" indicating the WPS system, and "pin" indicating a pin code. When the command is executed, the card can use WPS when wireless LAN connection or constitution is carried out. Here, when the WPS system is a system of "WPS with PIN", pin code authentication using the set pin code is carried out and, when the WPS system is a system of "WPS with PBC", push-button authentication is carried out.

The "Abort" command is constituted of one argument "sequenceID" indicating "Wi-Fi SD Command Sequence ID" described in FIG. 22. When the command is executed, it is possible to stop processing of a command having a designated "Wi-Fi SD command Sequence ID" among already executed commands. The command can be used, for example, when it is necessary for the user to stop the processing for the reason of a need for power-off while the user carries out upload or download of a file to or from a device or a web server in the network.

The "Reset" command is constituted of one argument "status" indicating status information. Here, the status information implies information indicating one of information items including "Media Change", "SSID List Update", "File List Update", "ID List Update", "Response Data Update", and the like described in FIG. 26. When the command is executed, it is possible to rest designated status information to restore the initial value. For example, although the "Media Change" is status information indicating that the file-system information in the card has been updated, when the file-system information cached in the host device can be updated, the host refers to the "Media Change" information and, if the file system of the card has already been updated, the host causes the file-system information of the host device to reflect the file-system information of the card. At this time, the "Rest" command is executed to return the "Media Change" information to the initial value so that the "Media Change" information can be referred to again, whereby it is possible to recognize that the file-system information of the card can be updated again.

The "Remove" command is constituted of one argument "ssid" indicating an SSID name. When the command is executed, it is possible to delete a designated SSID from an "SSIDHistory" register recorded in the card. For example, when an SSID which has already become unused remains among the SSiDs recorded in the "SSID History" register, the card carries out connection to the unused SSID, and hence useless connection processing occurs. Likewise, when an SSID to which the user does not intend to connect is present in the SSIDs recorded in the "SSID History" register, the card carries out connection to the card, and hence connection to the other SSID cannot be carried out. In such cases, by executing the "Remove" command, it is possible to prevent the card from carrying out connection to an undesired SSID.

The "EndApplication" command is a command constituted by using no argument. When the command is executed, the application presently being executed is terminated, and the card can return to the initial state.

The "ReadResponse" command is constituted of one argument "sequenceID" indicating the "Wi-Fi SD Command Sequence ID" described in FIG. 22. When the command is executed, it is possible to acquire response data of a command having the designated "Wi-Fi SD Command Sequence ID" among commands already executed. For example, in a state where processing of a plurality of commands has already been completed, it is possible to read response data items for the completed commands in arbitrary order by designating the "Sequence ID". It should be noted that by assigning "Wi-Fi SD Command Response Status #1" described in FIG. 28 to the response data register port by default, it becomes possible to omit issuance of the "ReadResponse" command when only one command is issued at one time.

The "SendHttpMessage" command is constituted of three arguments of "hostname" indicating a server of a transmission destination, "messageFileName" indicating a filepath and filename of a file in which an HTTP request message to be transmitted is recorded, and "headerRemoval" indicating whether or not an HTTP header is to be recorded in the file. Before a command is executed, an HTTP request message constituted of an HTTP request line, HTTP message header, and HTTP message body is recorded in the file. When the host executes the command, the card transmits the file to a server of a designated transmission destination as an HTTP request message. The server of the transmission destination returns an HTTP response message in response to the HTTP request message from the card. The card receives the HTTP response message constituted of an HTTP response line, HTTP message header, and HTTP message body, and records the message in the card as a file. However, when a value of "headerRemoval" is designated to "1", the HTTP response line, and HTTP message header are deleted, and only the HTTP message body is recorded in the card as a file. Thereby, when attached data is included in the HTTP response message, it is possible to preserve the attached data as a file without the HTTP response message being processed by the host. At this time, the file is recorded in the RESPONSE directory shown in FIG. 43 with a filename of "Wi-Fi SD command sequence id". The "Wi-Fi SD command sequence id" is a value which the host can arbitrarily specify for each command in such a manner that the value differs between commands and, even when the other command "SendHttpMessage" is simultaneously executed, it is possible to receive the file of the HTTP response message in a distinguishing manner. Furthermore, when an attached file is included in the HTTP response message, the card recognizes the type of the attached file by the MIME type described in the message, and records the attached file in a directory corresponding to the MIME type shown in FIG. 43 as a file. At this time, if information about the filename is included in the HTTP response message, the file is recorded on the basis of the information. An example of the contents of a file constituting an HTTP request message is shown below.

```
POST /hoge/ HTTP/1.1
Content-Type: text/plain
User-Agent: XXXXXXXX
Host: hogehoge.com
ContentLength=25
THIS IS AN EXAMPLE
```

The "SendHttpFile" command is constituted of four arguments of "hostname" indicating a server of a transmission destination, "messageFileName" indicating a filepath and filename of a file in which an HTTP request message to be transmitted is recorded, "appendFileName" indicating a filepath and filename of a file to be attached to the HTTP request message to be transmitted, and "header Removal" indicating whether or not an HTTP header is to be recorded in a file. Although the fundamental configuration is identical to the "SendHttpMessage" command, the different point is that a specific character string (for example, "<!--WIFISDFILE-->") in the HTTP request message can be replaced with the contents of a file to be attached to the HTTP request message when the card transmits the HTTP request message. By using this command, it is possible to transmit a file already recorded in the card as an HTTP request message without processing it. For example, the command can be used when photographic data in the card is uploaded to a web server. An example of contents of a file constituting an HTTP request message is shown below.

```
POST /hoge/ HTTP/1.1
Content-Type: image/jpeg
User-Agent: XXXXXXXX
Host: hogehogr.com
ContentLength=1234567
<!--WIFISDFILE-->
```

Regarding the above HTTP request message, the card replaces <!--WIFISDFILE--> with a designated file, and transmits the resultant as follows.

```
POST /hoge/ HTTP/1.1
Content-Type: image/jpeg
User-Agent: XXXXXXXX
Host: hogehogr.com
ContentLength=1234567
<Binary data is inserted here by a Card from a specified file>
```

The "SendHttpSSLMessage" command is constituted of three arguments of "hostname" indicating a server of a transmission destination, "messageFileName" indicating a filepath and filename of a file in which an HTTP request message to be transmitted is recorded, and "headerRemoval" indicating whether or not an HTTP header is to be recorded in a file. Although the fundamental configuration is identical to the "SendHttpMessage" command, the different point is that transmission of an HTTP request message, and reception of an HTTP response message can be carried out by encrypting these messages by means of the SSL (Secure Socket Layer) or TLS (Transport Layer Security) by using this command.

The "SendHttpSSLFile" command is constituted of four arguments of "hostname" indicating a server of a transmission destination, "messageFileName" indicating a filepath and filename of a file in which an HTTP request message to be transmitted is recorded, "appendFileName" indicating a filepath and filename of a file to be attached to the HTTP request message to be transmitted, and "headerRemoval" indicating whether or not an HTTP header is to be recorded in a file. Although the fundamental configuration is identical to the "SendHttpFile" command, the different point is that transmission of an HTTP request message, and reception of an HTTP response message can be carried out by encrypting these messages by means of the SSL (Secure Socket Layer) or TLS (Transport Layer Security) by using this command.

The "SendHttpMessageByRegister" command is constituted of two arguments of "hostname" indicating a server of a transmission destination, and "message" indicating an HTTP request message to be transmitted. Unlike the "SendHttpMessage" command, an HTTP message is not written to a file in the card, and the host can directly write an HTTP message to the Wi-Fi SD card command write register. For example, when information such as a password or the like is to be sent to a server of a transmission destination, it is possible to prevent an outflow of a password to the outside resulting from writing of the password to a file from occurring. When the host executes the command, the card transmits an input HTTP request message (constituted of an HTTP request line, HTTP message header, and HTTP message body) to a server of a designated transmission destination. The server of the transmission destination returns an HTTP response message in response to the HTTP request message from the card. The card receives the HTTP response message constituted of an HTTP response line, HTTP message header, and HTTP message body, and writes the HTTP response message to the Wi-Fi SD card response data register as the "Response Data" shown in FIG. 30. The host can read the HTTP response message for the executed "SendHttpMessageByRegister" by reading the Wi-Fi SD card response data register by using the command CMD 48.

The "SendHttpFileByRegister" command is constituted of three arguments of "hostname" indicating a server of a transmission destination, "appendFileName" indicating a filepath and filename of a file to be attached to an HTTP request message to be transmitted, and "message" indicating the HTTP request message to be transmitted. Although the fundamental configuration is identical to the "SendHttpMessageByRegister" command, the different point is that a specific character string (for example, "<!--WIFISDFILE-->") in the HTTP request message can be replaced with the contents of a file to be attached to the HTTP request message when the card transmits the HTTP request message.

The "SendHttpSSLMessageByRegister" command is constituted of two arguments of "hostname" indicating a server of a transmission destination, and "message" indicating an HTTP request message to be transmitted. Although the fundamental configuration is identical to the "SendHttpMessageByRegister" command, the different point is that transmission of an HTTP request message, and reception of an HTTP response message can be carried out by encrypting these messages by means of the SSL (Secure Socket Layer) or TLS (Transport Layer Security) by using this command.

The "SendHttpSSLFileByRegister" command is constituted of three arguments of "hostname" indicating a server of a transmission destination, "appendFileName" indicating a filepath and filename of a file to be attached to an HTTP request message to be transmitted, and "message" indicating the HTTP request message to be transmitted. Although the fundamental configuration is identical to the "SendHttpFileByRegister" command, the different point is that transmission of an HTTP request message, and reception of an HTTP response message can be carried out by encrypting these messages by means of the SSL (Secure Socket Layer) or TLS (Transport Layer Security) by using this command.

The "GetFile" command is constituted of two arguments of "requestFileName" indicating a filepath and filename of a file to be received, and "saveFileName" indicating a filepath and filename of a recording destination of the received file. This command is executed in the P2P Client application, and the receiver can acquire a desired file from the sender on the basis of a filepath and filename of an acquirable file described in the "FILELIST" file (shown in FIG. 43) acquired from the sender, and record the file in a designated file.

The "SelectID" command is constituted of one argument "id" indicating an ID of a receiver permitting access. This command is executed in the P2P Restricted Server application. The P2P Restricted Server application requests the receiver to transmit an ID in order to determine whether or not permission for access is to be given to the receiver. The receiver sends the ID of the receiver to the sender in order to acquire permission for access, and the sender executes this command only for a receiver to whom the sender intends to give permission for access. An ID of a receiver for whom the command is not executed cannot obtain access to the sender. At this time, in consideration of a case where a plurality of receivers have the identical ID as a value of "id" other than the ID of the receiver, the host may designate a MAC address of a receiver card which enables unique determination of the receiver card.

The "CancelID" command is constituted of one argument "id" indicating an ID of a receiver canceling access. This command is executed in the P2P Restricted Server application. By executing this command in the P2P Restricted Server application, it is possible to cancel permission for access for a receiver already given permission for access. At this time, in consideration of a case where a plurality of receivers have the identical ID as a value of "id" other than the ID of the receiver, the host may designate a MAC address of a receiver card which enables unique determination of the receiver card.

The "SetMailAccount" command is constituted of two arguments of "accountName" indicating an account name, and "password" indicating a password thereof. By executing this command, it is possible to set a mail account to a mail server, and carry out transmission and reception of mail.

The "SendSmtpMessage" command is constituted of two arguments of "address" indicating an address of a transmission destination, and "messageFileName" indicating a filepath and filename of a file in which a body of the mail to be transmitted is recorded. By executing this command, the card transmits a designated file to the address of the transmission destination as the body of the mail.

The "SendSmtpFile" command is constituted of three arguments of "address" indicating an address of a transmission destination, "messageFileName" indicating a filepath and filename of a file in which a body of the mail to be transmitted is recorded, and "appendFileName" indicating a filepath and filename of a file to be attached. By executing this command, the card makes a designated file a body of the mail, subjects a designated attached file to Base64 conversion, then converts the file from the binary data to the text data to attach the converted file to the mail body at the tail end thereof, and carries out transmission of the mail to the address of the transmission destination.

The "SendSmtpMessageByRegister" command is constituted of two arguments of "address" indicating an address of a transmission destination, and "message" indicating a body of the mail to be transmitted. By executing this command, the card transmits data input as an argument of the command to the address of the transmission destination as the body of the mail.

The "SendSmtpFileByRegister" command is constituted of three arguments of "address" indicating an address of a transmission destination, "appendFileName" indicating a filepath and filename of a file to be attached, and "message"

indicating a body of the mail to be transmitted. By executing this command, the card makes data input as an argument of the command a body of the mail, subjects a designated attached file to Base64 conversion, then converts the file from the binary data to the text data to attach the converted file to the mail body at the tail end thereof, and carries out transmission of the mail to the address of the transmission destination.

The "ShowDeviceList" command is a command configured to acquire a device list in the network.

The "PrintImageByDLNA(file, targetDevice)" command is a command configured to transfer a designated image to a device in a network to print the image.

The "DisplayImageByDLNA(file, targetDevice)" command is a command configured to transfer a designated image to a device in a network to display the image.

The "PlayVideoByDLNA(file, targetDevice)" command is a command configured to transfer designated video data to a device in a network to reproduce the video data.

The "StopVideoByDLNA(file, targetDevice)" command is a command configured to transfer designated video data to a device in a network to stop reproduction.

The "PauseOnVideoByDLNA(file, targetDevice)" command is a command configured to transfer designated video data to a device in a network to pause reproduction.

The "PauseOffPlayVideoByDLNA(file, targetDevice)" is a command to transmit designated video data to a device in a network to cancel a pause of reproduction.

The "SeekVideoByDLNA(time, address, file, targetDevice)" command is a command configured to reproduce designated video data from a part (an address of a file or the reproduction start time of the video data) desired to be transferred to a device in a network.

The "FastForwardVideoByDLNA(file, targetDevice)" command is a command configured to transfer designated video data to a device in a network to carry out fast-forward reproduction.

The "SlowForwardVideoByDLNA(file, targetDevice)" command is a command configured to transfer designated video data to a device in a network to carry out slow reproduction.

The "FastBackwardVideoByDLNA(file, targetDevice)" command is a command configured to transfer designated video data to a device in a network to carry out rewind/reproduction.

The "SlowBackwardVideoByDLNA(file, targetDevice)" command is a command configured to transfer designated video data to a device in a network to carry out reverse slow reproduction.

The "StreamingDownloadVideoByDLNA(file, targetDevice)" command is a command configured to transfer designated video data to a device in a network to carry out recording while carrying out reproduction.

The "SendFileByDLNA(file, targetDevice)" command is a command configured to transfer a designated file to a device in a network.

The "SelectFileByDLNA(file)" command is a command configured to open a designated file to a device in a network.

The "CancelFileByDLNA(file)" command is a command configured to make a designated file unopened to a device in a network. The opened state of a file already opened to the device can be canceled.

FIG. 26 and FIG. 27 show a configuration example of the Wi-Fi SD card status register.

The "Wi-Fi SD Card Register Identifier" is configured to indicate that this register is a Wi-Fi SD card status register, and a character string "WIFISDSR" is recorded therein.

The "Size of Wi-Fi SD card Register" indicates the size of this register and, if this value is greater than 512, the host cannot read all the values of the register by execution of the command CMD 48 of one time, and the host needs to execute the command CMD 48 the number of times corresponding to ceil (register size/512).

The "iSDIO Status" is information indicating a status of the entire card, and is constituted of "Command Response Update (CRU)", "Asynchronous Command Response Update (ARU)", "Media Change Update (MCU)", and "Wi-Fi SD Data Update (WFU)" each of which is constituted of one bit. Further, in the case where the card supports interrupts, when each bit is set to "1b" (data "1"), an interrupt occurs on the interrupt line. "CRU" is a flag to be set when the "Command Response Status" shown in FIG. 28 is changed (to be set, for example, when the value of the Command Response Status is changed to 0x02, 0x03, 0x04 or 0x80 to 0xFF). "ARU" is a flag to be set when the "Asynchronous Command Response Status" shown in FIG. 29 is changed (to be set, for example, when the value of the Asynchronous Command Response Status is changed to 0x02, 0x03, 0x04 or 0x80 to 0xFF). "MCU" is a flag to be set when the value of the memory status is changed (to be set, for example, when the value of the Media Change shown in FIG. 26 is changed). "WFU" is a flag to be set when the value of the Wi-Fi status is changed (to be set, for example, when the value of the SSID List Update, File List Update or ID List Update shown in FIG. 26 is changed).

The "iSDIO Status Mask" is information configured to make the "iSDIO Status" effective or ineffective, and is constituted of "CRU MSK", "ARU MSK", "MCU MSK", and "WFU MSK" each of which is constituted of one bit. When "CRU MSK" is set to "0b" (data "0"), "CRU" corresponding thereto becomes ineffective (interrupt capability also becomes ineffective) and, "CRU MSK" is set to "1", and "CRU" becomes effective (interrupt capability also becomes effective). The same is true of "ARU MSK", "MCU MSK", and "WFU MSK".

The "Error Status" is information configured to indicate the error status of the entire card, and is constituted of "Command Response Error (CRE)", and "Asynchronous Command Response Error (ARE)" each of which is constituted of one bit. "CRE" is a flag to be set when the "Command Response Status" shown in FIG. 28 is changed to an error status (to be set, for example, when the value of the Command Response Status is changed to 0x02 or 0x80 to 0xFF). "ARE" is a flag to be set when the "Asynchronous Command Response Status" shown in FIG. 29 is changed to an error status (to be set, for example, when the value of the Asynchronous Command Response Status is changed to 0x02 or 0x80 to 0xFF).

The "WLAN" is information indicating the status of the wireless LAN, and indicates the status of one of "Initial", "Scan", "Association", "STA", and "AP" which are shown in FIG. 42.

Figure 41:
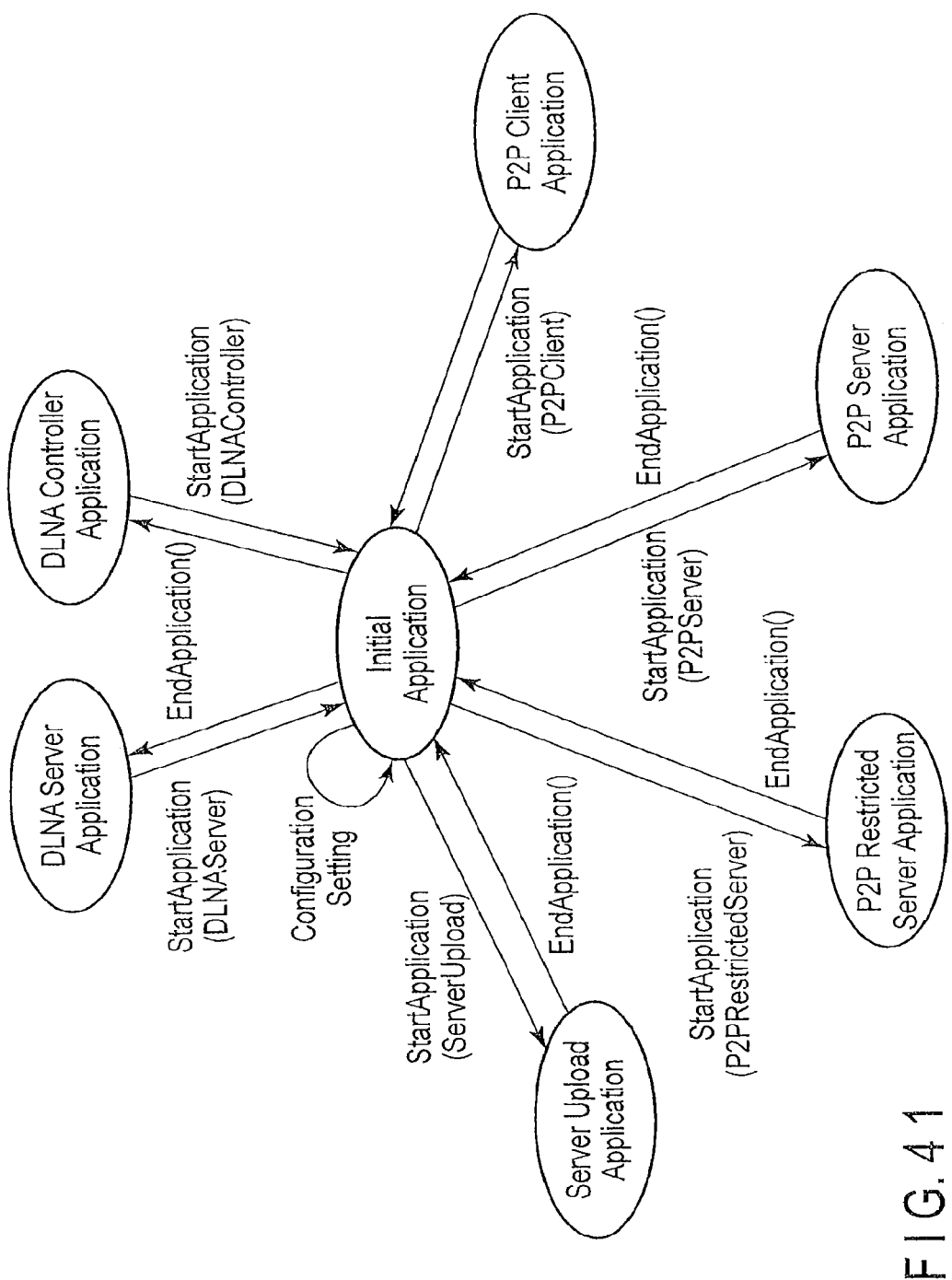
FIG. 41 is a view showing a state transition of each application.

The "Application" is information indicating an application presently being executed, and indicates the status of one of "Initial Application", "Server Upload Application", "P2P Server Application", "P2P Restricted Server Application", "P2P Client application", "DLNA Server Application", and "DLNA Controller Application" which are shown in FIG. 41.

The "SSID" shows the SSID name of a wireless LAN to which the card is currently connected or which constitutes the wireless LAN. When the card is in the state where the card is not connected to the wireless LAN, an SSD name which is to be used when the card is connected to the wireless LAN or when the wireless LAN is constituted is indicated.

The "Network Authentication" indicates the authentication system and data encryption scheme of a network which is currently connected to a wireless LAN or which constitutes the wireless LAN, and one of "Open System and no encryption", "Open System and WEP", "Shared Key and WEP", "WPA and TKIP", "WPA and AES", "WPA-PSK and TKIP", "WPA-PSL and AES", "WPA2 and TKIP", "WPA2 and AES", "WPA2-PSK and TKIP", and "WPA2-PSK and AES" is selected.

The "HTTP Processing" indicates whether or not the card is presently carrying out transmission/reception of an HTTP message.

The "HTTP Progress" indicates the degree of progress of transmission/reception of an HTTP message in percentage. The card can learn the total size of the message from the header of the HTTP message presently being transmitted/received, and calculates the degree of progress from the size of the HTTP message already transmitted/received.

The "Date" indicates the current date.

The "Time" indicates the current time.

The "Media Change" is information indicating whether or not the File Allocation Table (FAT) information of the NAND Memory Module in the card is updated. When the FAT information is updated, if there is FAT information cached in the host, the host needs to cache the FAT information in the card again. It should be noted that it is possible to set this information to the initial value by executing the "EndApplication" command configured to terminate an application or the "Reset" command configured to initialize status information.

The "SSID List Update" is information indicating whether or not the "SSID List" is updated. When the "ScanWiFi" command is executed, the card carries out a search for the wireless LAN, creates the "SSIDLIST" file, and sets the "SSID List Update" information. By referring to this information, the host can learn whether or not the search work of the card is completed. It should be noted that it is possible to set this information to the initial value by executing the "ScanWiFi" command again or by executing the "Reset" command configured to initialize status information.

The "File List Update" is information indicating whether or not the "File List" is updated. In the P2P Client Application, when the access of the receiver side is permitted, the card records the "File List" received from the sender side as the "FILELIST", and sets the "File List Update" information. By referring to this information, the host can learn whether or not the card has acquired the "FileList". It is possible to set this information to the initial value by executing the "EndApplication" command configured to terminate an application or the "Reset" command configured to initialize status information.

The "Response Data Update" is information indicating whether or not the "Response Date" is updated. The host executes transmission/reception of an HTTP message through the Wi-Fi SD card register by using the "SendHttpMessageByRegister" or the like, and the card receives the HTTP response message, and sets the "Response Data" information. By referring to this information, the host can learn that the card has received the HTTP response message, and it has become possible to refer to the Wi-Fi SD card response data register. It is possible to set this information to the initial value by executing the "EndApplication" command configured to terminate an application or the "Reset" command configured to initialize status information. It is possible to set this information to the initial value when the host has completed read of all the "Response Data" by using the command CMD 48 or by executing the "Reset" command configured to initialize status information.

The "Response Data Size" is information indicating the size of the received response data. By referring to this information, the host can determine the number of times of issuance of the command CMD 48 to be issued to read the response data.

The "Signal Strength" is information indicating the current signal strength. One of "no signal", "level 1", "level 2", "level 3", "level 4", and "level 5" is set.

The "MAC Address" is information indicating an MAC address of the Wi-Fi SD card.

The "ID" is information indicating an ID of the Wi-Fi SD card. This value reflects the value set to the ID information of the user-settable "Card Configuration Information" shown in FIG. 33.

The "DHCP Enabled" is information indicating whether or not the "DHCP" is enabled. This value reflects the value set to the "DHCP" information of the user-settable "Card Configuration Information" shown in FIG. 33.

The "IP Address" is information indicating the IP address currently set.

The "Subnet Mask" is information indicating the subnet mask currently set.

The "Default Gateway" is information indicating the default gateway currently set.

The "Preferred DNS Server" is information indicating the preferred DNS server currently set.

The "Alternate DNS Server" is information indicating the alternate DNS server currently set.

The "Time Out" is information indicating the time-out to the time when the card carries out time-out processing. This value reflects the value set to the "Time Out" information of the user-settable "Card Configuration Information" shown in FIG. 33.

The "Power Save mode" is information indicating whether or not the card is operating in the power-saving mode. Although this information reflects the value set to the "Power Save mode" information of the user-settable "Card Configuration Information" shown in FIG. 33, a card not supporting the power-saving mode is set to the normal mode at all times.

The "WPS mode" is information indicating the WPS system employed when connection or constitution of the wireless LAN is carried out by using "WPS". This information can be set by the "SetWPS" command, and one of "WPS with PIN" configured to carry out pin code authentication using the set pin code, and "WPS with PBC" configured to carry out push-button authentication is set. It should be noted that when the "SetWPS" command is not executed, a mode in which "WPS" is not used is set, and connection or constitution of a wireless LAN is carried out without using "WPS".

The "Selected Number of Proxy Server" is information indicating which proxy server of the "Proxy server Name" recorded in the user-settable "Card Configuration Information" shown in FIG. 33 is used. This information reflects the value set to the "Selected Proxy Server" information of the "Card Configuration Information".

The "Current Mail Account Name" is information indicating the current mail account name. This information reflects the value set by the "SetMailAccount" command.

FIG. 28 shows a configuration example of the Wi-Fi SD card command response status register.

The "Wi-Fi SD Card Register Identifier" is information indicating that this register is a Wi-Fi SD card command response status register, and a character string "WIFISDRS" is recorded therein.

The "Size of Wi-Fi SD Card Register" is information indicating the size of the register, and the host refers to this information, thereby recognizing how many times the command CMD 48 should be issued, and what size of data should be read.

The "Number of Wi-Fi SD Command Response Status" is information indicating how many "Wi-Fi SD Command Response Statuses" can be acquired by read of the Wi-Fi SD card command response status register of one time.

The "Wi-Fi SD Command Response Status" is constituted of "Status Registration", "Wi-Fi SD command id", "Wi-Fi SD command sequence id", "Command Response Status", and "Reserved for Vendors for Error Status".

"Status Registration" is a flag indicating whether or not the "Wi-Fi SD Command Response Status" is present. When this flag is set to "0", no information is present (the host need not read the "Wi-Fi SD Command Response Status") and, when this flag is set to "1", information is present (the host needs to read the "Wi-Fi SD Command Response Status").

The "Wi-Fi SD command id" indicates the type of the Wi-Fi SD command issued by the host through the Wi-Fi SD card command register, and one of the Wi-Fi SD commands shown in FIG. 23, FIG. 24, and FIG. 25 is recorded.

The "Wi-Fi SD command sequence id" is one of values assigned by the host to commands in order to recognize each of the commands, when the host has issued the commands, and the identical value is set.

The "Command Response Status" is information indicating the status of a command issued by the host, and indicates a status such as whether or not the issued command has been received and processed by the card without any problem, whether or not the issued command has failed to be received because of any problem, whether or not the processing of the issued command has been completed, whether or not the processing of the issued command has been suspended, and whether or not the processing of the issued command has been unsuccessful. There is the possibility of reception of a command being unable to be carried out; for example, when there is a problem with the setting of the issued command or when a new command cannot be received because the card side is processing another command.

The "Reserved for Vendors for Error Status" is information indicating, when an error has occurred, for what reason the error has occurred.

FIG. 29 shows a configuration example of the Wi-Fi SD card asynchronous command response status register.

The "Wi-Fi SD Card Register Identifier" is information indicating that this register is the Wi-Fi SD card asynchronous command response status register, and a character string "WIFISDPS" is recorded therein.

The "Size of Wi-Fi SD Card Register" is information indicating the size of the register, and the host refers to this information to learn how many times the command CMD 48 should be issued, and what size of data should be read.

The "Number of Wi-Fi SD Asynchronous Command Response Status" is information indicating how many "Asynchronous Command Response Statuses" can be acquired by read of the Wi-Fi SD card asynchronous command response status register of one time.

The "Wi-Fi SD Asynchronous Command Response Status" is constituted of "Status Registration", "Wi-Fi SD command id", "Wi-Fi SD command sequence id", "Asynchronous Command Response Status", and "Reserved for Vendors for Error Status".

"Status Registration" is a flag indicating whether or not the "Wi-Fi SD Command Response Status" is present. When this flag is set to "0", no information is present (the host need not read the "Wi-Fi SD Command Response Status") and, when this flag is set to "1", information is present (the host needs to read the "Wi-Fi SD Command Response Status").

The "Wi-Fi SD command id" indicates the type of the Wi-Fi SD command issued by the host through the Wi-Fi SD card command register, and one of the Wi-Fi SD commands shown in FIG. 23, FIG. 24, and FIG. 25 is recorded.

The "Wi-Fi SD command sequence id" is one of values assigned by the host to commands in order to recognize each of the commands, when the host has issued the commands, and the identical value is set.

The "Asynchronous Command Response Status" is information indicating the status of a command issued by the host, and indicates a status such as whether or not the issued command has been received and processed by the card without any problem, whether or not the issued command has failed to be received because of any problem, whether or not the processing of the issued command has been completed, whether or not the processing of the issued command has been suspended, and whether or not the processing of the issued command has been unsuccessful.

The "Reserved for Vendors for Error Status" is information indicating, when an error has occurred, for what reason the error has occurred.

FIG. 30 shows a configuration example of the Wi-Fi SD card response data register.

The "Wi-Fi SD Card Identifier" is information indicating that this register is the Wi-Fi SD card response data register, and a character string "WIFISDRD" is recorded therein.

The "Size of Wi-Fi SD Card Register" is information indicating the size of the register, and the host refers to this information to learn how many times the command CMD 48 should be issued, and what size of data should be read.

The "Number of Wi-Fi SD Response Data" is information indicating how many "Response Data" can be acquired by read of the Wi-Fi SD card response data register of one time.

The "Wi-Fi SD command id" indicates the type of the Wi-Fi SD command issued by the host through the Wi-Fi SD card command register, and one of the Wi-Fi SD commands shown in FIG. 23, FIG. 24, and FIG. 25 is recorded.

The "Wi-Fi SD command sequence id" is one of values assigned by the host to commands in order to recognize each of the commands when the host has issued the commands, and the identical value is set.

The "Size of Response Data" is information indicating the size of the "Response Data" and, as the "Response Data", data received when a command such as the "SendMessageByRegister" command used when an HTTP request message is transmitted through the Wi-Fi SD command write register or when an HTTP response message is received through the Wi-Fi SD response data register is issued is recorded.

FIG. 31 shows a configuration example of the Wi-Fi SD card ID list register.

The "Wi-Fi SD Card Register Identifier" is information indicating that this register is the Wi-Fi SD card ID list register, and a character string "WIFISDIL" is recorded therein.

The "Size of Wi-Fi SD Card Register" is information indicating a size of a register, and by referring to this information, the host learns how many times the command CMD 48 should be issued, and what size of data should be read.

The "Number of Receiver IDs" indicates how many receiver IDs are included in the list. That is, it indicates how many receivers are each executing the "P2P Client Application" request access to a sender executing the "P2P Restricted Server Application".

The "Receiver ID" is an ID of a receiver requesting access to the sender. The ID of the receiver is set by the "Card Configuration Information" of the receiver.

The "Receiver MAC Address" is a MAC address of the receiver requesting access to the sender.

The "Receiver Permission" is information indicating whether or not access of the receiver requesting access to the sender is permitted by the sender. That is, the "Receiver Permission" is information indicating whether or not the sender has permitted each receiver access to the sender by using the "SelectID" command.

FIG. 32 shows a configuration example of the Wi-Fi SD card SSID history register.

The "Wi-Fi SD Card Register Identifier" is information indicating that this register is the Wi-Fi SD card SSID history register, and a character string "WIFISDSH" is recorded therein.

The "Size of Wi-Fi SD Card Register" is information indicating a size of a register, and by referring to this information, the host learns how many times the command CMD 48 should be issued, and what size of data should be read.

In the "SSID", a name of the SSID in the SSID history list used when the card has heretofore been connected to a wireless LAN or when a wireless LAN has been constructed is recorded.

In the "MAC Address", a MAC address of an access point (AP) corresponding to the SSID in the SSID history list used when the card has heretofore been connected to a wireless LAN or when a wireless LAN has been constructed is recorded.

It should be noted that although not recorded in the register, information such as a passphrase, channel, and the like for each SSID is held in the card and, when the host is connected to a wireless LAN or when a wireless LAN is constructed, if a specific SSID is not designated, the card carries out a search for an SSID to which the card can be connected or which can be constructed by using the aforementioned information.

FIG. 33 shows a configuration example of the Wi-Fi SD card "Configuration Information".

The "Wi-Fi SD Card Identifier" is information indicating that this information is the Wi-Fi SD card "Configuration Information", and a character string "WIFISDCI" is recorded therein.

The "Size of Configuration Information" is information indicating a size of the Wi-Fi SD card "Configuration Information".

The "ID" is information configured to set an ID of this card, and is used when an ID of the receiver is to be sent to the sender at the time of execution of the "P2P Client Application".

The "DHCP Enabled" is information configured to set whether or not the DHCP is used for setting of an IP address or the like.

The "IP Address" is information used when an IP address is manually set.

The "Subnet Mask" is information used when the "Subnet Mask" is manually set.

The "Default Gateway" is information used when the "Default Gateway" is manually set.

The "Preferred DNS Server" is information used when the preferred DNS server is manually set.

The "Alternate DNS Server" is information used when the alternate DNS server is manually set.

The "Time Out" is information configured to set the waiting time to the time when the card carries out the time-out processing. The "Time Out" information of the Wi-Fi SD card status register shown in FIG. 27 reflects this value, and the host can refer to the information.

The "Power Save mode" is information configured to set whether or not the card is to be operated in the power-saving mode. In a card not supporting the power-saving mode, this setting is ignored.

The "Number of Proxy Servers" is the number of proxy servers set to this card.

The "Selected Proxy Server" is information indicating which proxy server of the proxy servers set to this card is currently used. (For example, a number of a list is indicated.)

The "Length of Proxy Server Name" is the number of characters of the set proxy server name.

The "Proxy Server Name" is the set proxy server name.

The "Port Number" is the port number of the set proxy server.

As the "Mail Address", a mail address of the user carrying out transmission/reception of mail is set.

Further, although not shown, the host name of a web service to which the card can be connected, information necessary for connection to the web service (for example, the user account name, password, and token data), and the like can also be recorded.

It should be noted that setting of these items correspond to the information items of the Wi-Fi SD card status register shown in FIG. 26 and FIG. 27 except part of them, and regarding which value is used for the actual operation, it is possible to refer to the Wi-Fi SD card status register by issuing the command CMD 48.

FIG. 34 shows a timing chart of a case where a command of the Wi-Fi SD card is issued by using the write command (CMD 49), i.e., a timing chart at the time when access to the Wi-Fi SD card command write register is obtained. Here, CMD and DAT in FIG. 34 indicate a command bus and data bus on the card interface, and the card operation indicates the operating status of the card at that time.

When a write command (CMD 49) is issued from the host device, the SD card 11 returns a response (R1) to the host device 20.

Next, the host device 20 sends the data (Wi-Fi SD card command) of the Wi-Fi SD card command write register to the SD card 11 together with a CRC. The data sent to the SD card 11 is recorded in a designated extension register of the SD card 11. In the SD card 11, analysis of the sent data is carried out, and hence the data bus is brought into a busy state. Accordingly, an additional command cannot be issued from the host device 20.

After carrying out the analysis of the data, the SD card 11 sets "0x01" to the command status on the Wi-Fi SD card status register when the SD card 11 can receive a command, and sets "0x02" thereto when the card 11 cannot receive a command. If the SD card 11 can receive a command, the SD card 11 shifts to execution processing of the command. The execution status of the command can be referred to by the command status on the Wi-Fi SD card status register shown in FIGS. 24 to 28. When the execution processing of the command is completed, the execution status of the command is deleted from the command status, and an execution result is reflected in another status information item on the Wi-Fi SD card status register in exchange for the command execution status.

FIG. 35 is a figure corresponding to FIG. 17, and shows a timing chart of a case where Wi-Fi SD card commands are issued by a plurality of write commands (CMD 49), i.e., a case where the size of the Wi-Fi SD card command write register exceeds 512 bytes.

When a command CMD 49 is issued from the host device 20, the SD card 11 returns a response (R1) to the host device 20.

Next, the host device 20 first sends one nth (1/n) of the data (Wi-Fi SD card commands) of the Wi-Fi SD card command write register to the SD card 11 together with a CRC. That is, the first 512 bytes of the data of an amount exceeding 512 bytes are transferred. The transferred data is recorded in a designated extension register of the SD card 11. At this time, in the SD card 11, analysis of the data sent thereto is carried out, and hence the data bus is brought into a busy state, whereby an additional command cannot be issued from the host device 20. In this state, the SD card 11 carries out analysis of the data.

In the first data, a data size (Nr) is recorded, and hence it is known by the data analysis that the commands CMD 45 are to be successively issued. After this, the busy state is canceled, and a state is set where issuance of the next command CMD 49 is waited for. After the busy state is canceled, the host device 20 issues a command 49 in the same manner as described above, and transfers the remaining part of the data of the Wi-Fi SD card command write register. After the last command CMD 49 is issued from the host device 20, and the last one nth (n/n) of the data of the Wi-Fi SD card command write register is transferred, the SD card 11 analyzes the data (command), and executes the processing of the command.

Figure 36:
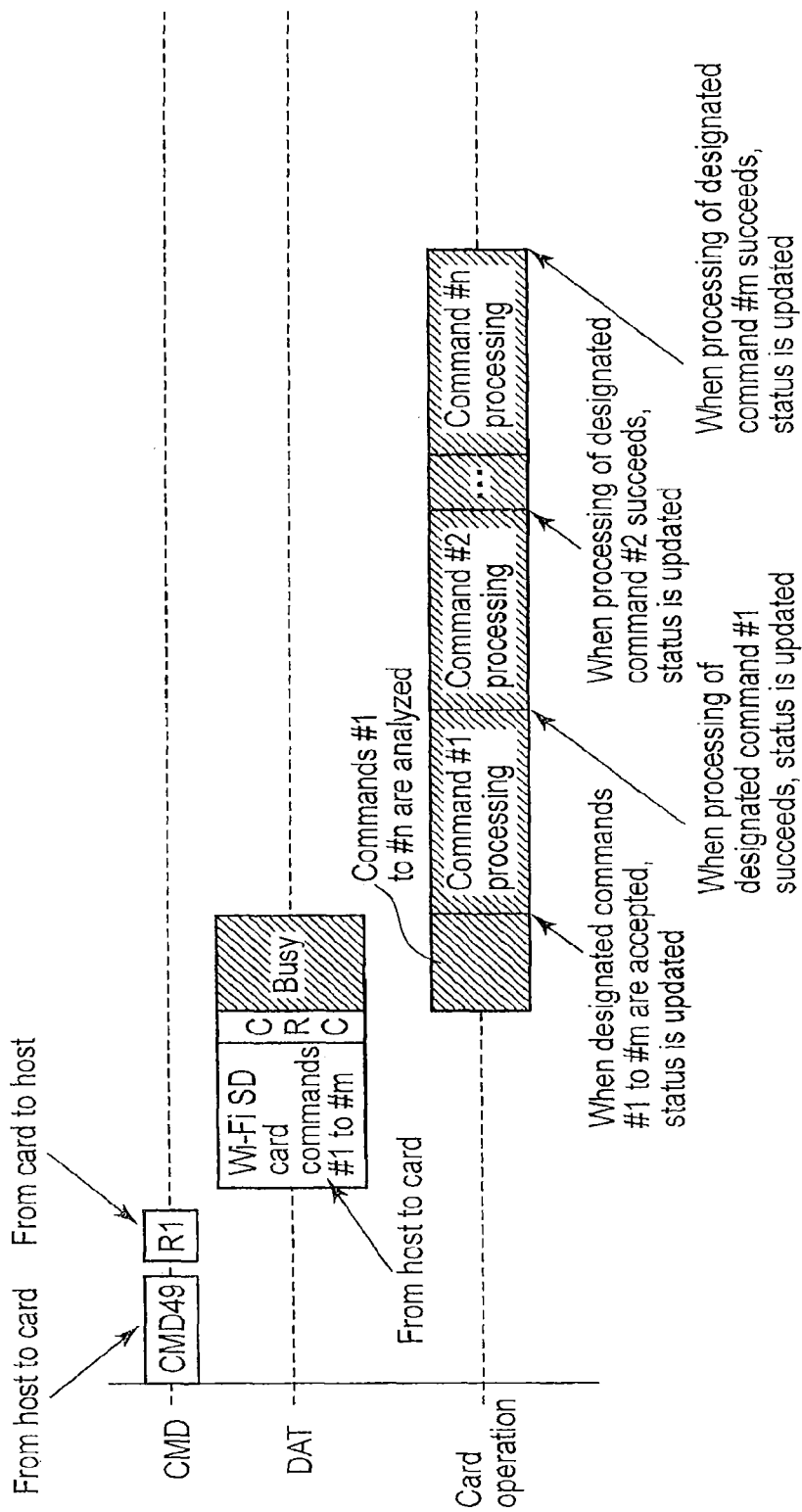
FIG. 36 is a timing chart showing a case where a plurality of Wi-Fi SD card commands are included in data issued by one write command (CMD 49).

FIG. 36 is a figure corresponding to FIG. 20, and shows a timing chart of a case where a plurality of Wi-Fi SD card commands are included in data issued by one write command (CMD 49).

Issuance of a plurality of Wi-Fi SD card commands is employed, for example, when transfer of a plurality of files is successively carried out.

When a command CMD 49 is issued from the host device 20, the SD card 11 returns a response (R1) to the host device 20.

Next, the host device 20 sends data of the Wi-Fi SD card command write register to the SD card 11 together with a CRC. The data sent to the SD card 11 is recorded in a designated extension register of the SD card 11. In the SD card 11, the data (commands #1 to #m) sent thereto is analyzed, hence the data bus is brought into a busy sate, and an additional command cannot be issued by the host device 20.

After carrying out the analysis of the data, the SD card 11 sets "0x01" to the command status on the Wi-Fi SD card status register for each of a plurality of issued commands when the SD card 11 can receive a command, and sets "0x02" thereto for each of the plurality of issued commands when the card 11 cannot receive a command. If the SD card 11 can receive a command, the SD card 11 executes each command. The execution status of all the commands can be referred to by the command status on the Wi-Fi SD card status register.

When the execution processing of one command is completed, the execution status of the command is deleted from the command status, and an execution result is reflected in another status information item on the Wi-Fi SD card status register in exchange for the command execution status.

Next, a command not executed yet is executed. Although a timing chart in which execution processing of the command is successively carried out is shown in FIG. 32 as an example, it is also possible to carry out execution processing of the command in parallel. Further, it is also possible for the SD card 11 to carry out command execution processing by optimizing the execution order of the commands.

According to the embodiment of FIG. 36, a plurality of Wi-Fi SD card commands are included in the data issued by one command, and hence it is possible to efficiently transfer and execute the Wi-Fi SD card command.

Figure 37:
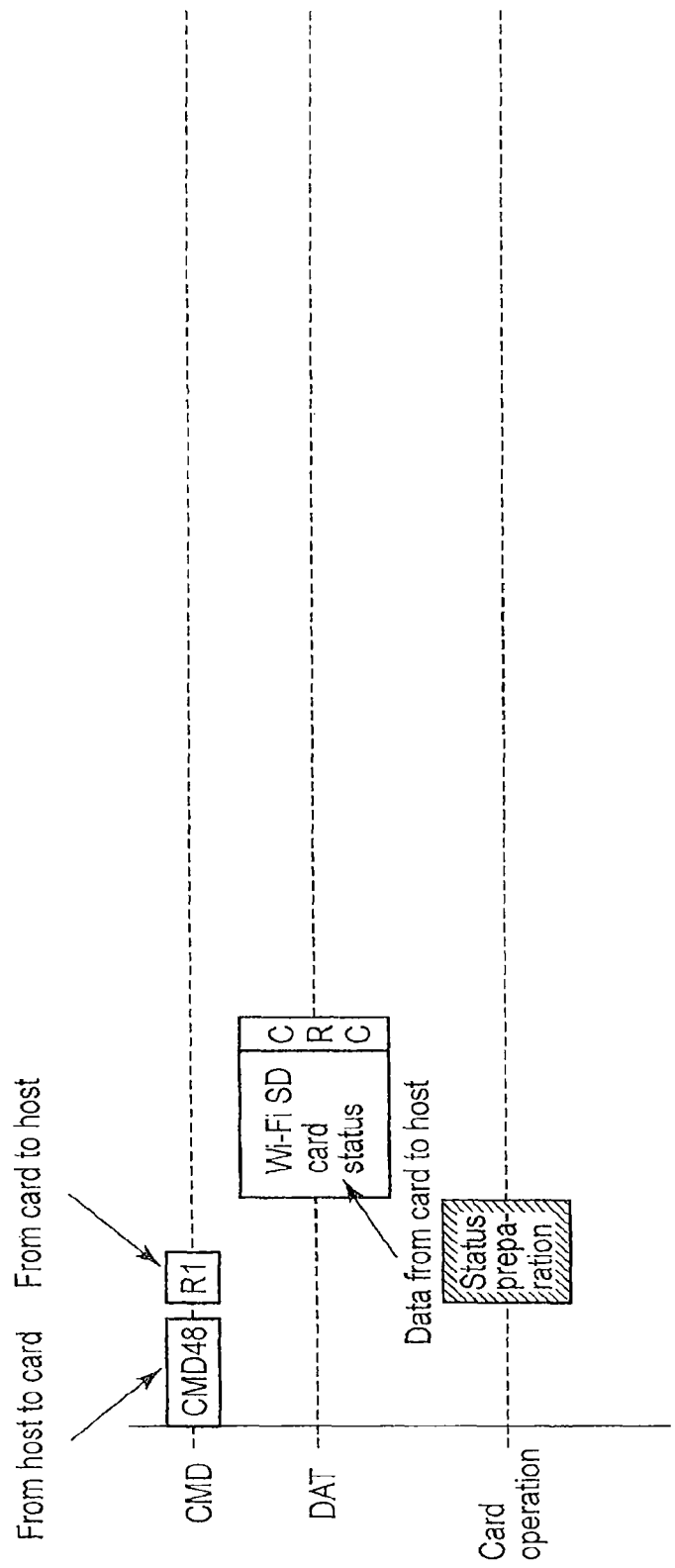
FIG. 37 is a timing chart showing a case where data is acquired from a Wi-Fi SD card 11 by using a read command (CMD 48).

FIG. 37 shows a timing chart of a case where data is acquired from the Wi-Fi SD card 11 by using a read command (CMD 48), i.e., a case where access to the Wi-Fi SD card status register, Wi-Fi SD card response data register, Wi-Fi SD card ID list register or Wi-Fi SD card SSID history register is obtained.

When a read command (CMD 48) is issued from the host device 20, the SD card 11 returns a response (R1) to the host device 20.

Next, the SD card 11 prepares data (for example, status) of one of the Wi-Fi SD card status register, Wi-Fi SD card response data register, Wi-Fi SD card ID list register, and Wi-Fi SD card SSID history register in the extension register according to the argument or arguments of the command CMD 48. Furthermore, the SD card 11 sends the data in the extension register to the host device 20 together with a CRC.

FIG. 38 is a figure corresponding to FIG. 17, and shows a timing chart of a case where data of the Wi-Fi SD card is acquired by using a plurality of read commands (CMD 48), i.e., a case where the size of the Wi-Fi SD card response data register or the like exceeds 512 bytes.

When a command CMD 48 is issued from the host device 20, the SD card 11 returns a response (R1) to the host device 20.

Next, the SD card 11 prepares data of the Wi-Fi SD card response data register or the like in the extension register according to the argument or arguments of the command CMD 48, and sends the data in the extension register to the host device 20 together with a CRC.

The host device 20 analyzes the received data. The data size (Nr) is recorded in the first data, and hence it is known that the commands CMD 48 needs to be successively issued. Accordingly, after completion of the data analysis, the next command CMD 48 is issued. The operation to be carried out thereafter is identical to the operation of the command CMD 49 shown in FIG. 35, and hence a description thereof is omitted.

According to the embodiment shown in FIG. 38, it is possible to securely read data a data length of which exceeds 512 bytes.

FIG. 39 shows application examples supported by the SD card.

Figure 40:
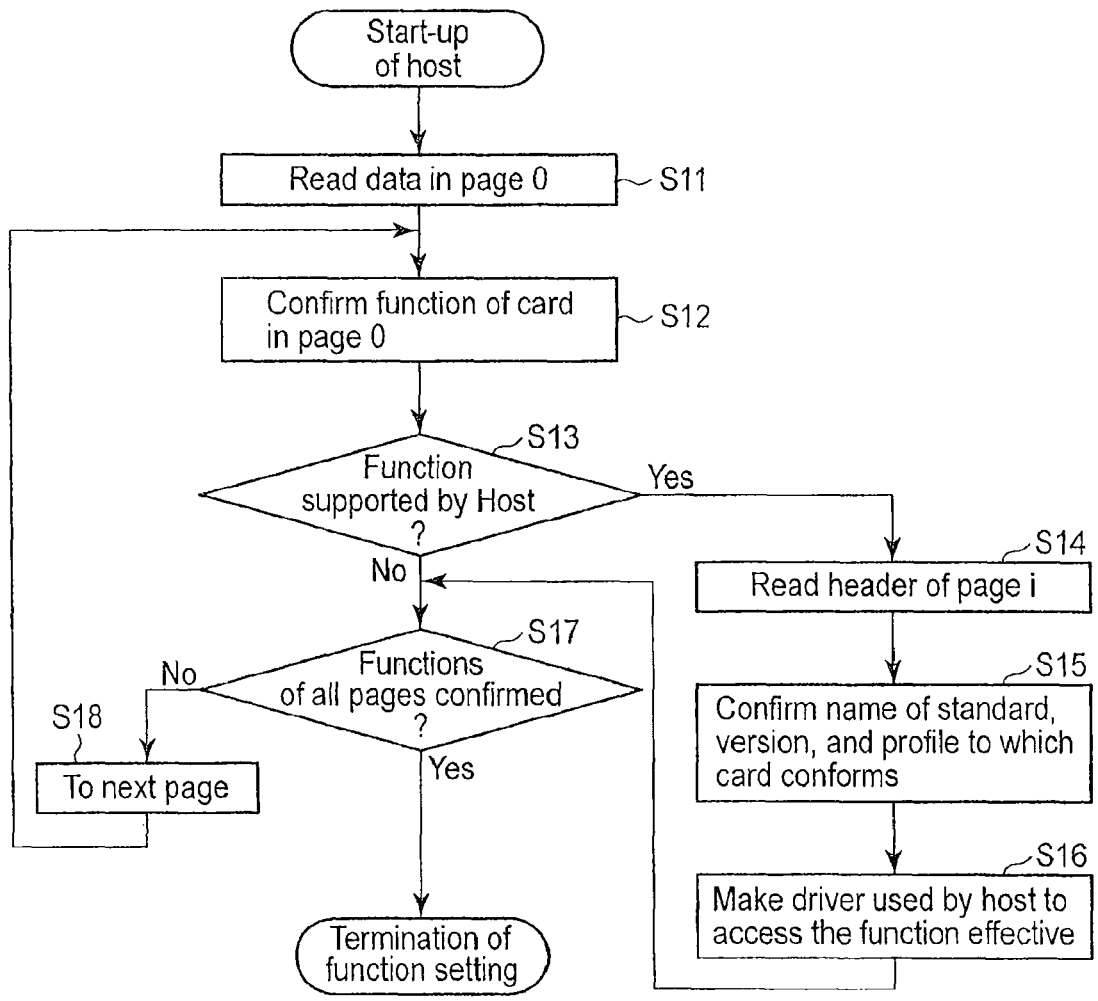
FIG. 40 is a flowchart showing an operation to be carried out at the time of start-up of a host device.

FIG. 40 shows operations of the host device 20 to be carried out at the time of start-up.

When the host device 20 is started, the host device 20 issues a read command (CMD 48), reads data in page 0 of the extension register 31, and confirms the wireless communication function as the extended function possessed by the SD card 11 (S11, S12). That is, it is confirmed what wireless communication functions such as Wi-Fi and Bluetooth are implemented in the SD card 11. Then, it is determined whether or not the host device 20 supports the extended function of the SD card 11 (S13). As a result, when the host device 20 supports the extended function, data in page i (i is a value other than 0) of the extension register 31 is read (S14) in order to make the extended function effective, and, for example, a name of a standard, version, profile, device information, and the like to which the SD card 11 conforms are confirmed (S15). On the basis of the above, the host device 20 makes an optimum driver possessed by the host device 20 effective (S16). Thereby, it becomes possible to access the extended function of the SD card 11.

Next, it is determined whether or not functions of all the pages of the extension register have been confirmed (S17). As a result, when there is a remaining unconfirmed page, a function of the card in the next page is confirmed (S18, S16) and, when all the pages have been confirmed, function setting is terminated.

FIG. 41 is a state transition diagram of the applications.

Each of the applications shown in FIG. 39 is configured in such a manner that the "Initial Application" is the initial state thereof, each application is caused to make a transition to each of other applications by the "StartApplication" command, and is returned to the initial state by the "EndApplication" command. Thereby, it is possible to prevent each application from being simultaneously executed, reduce the burden of implementation of the card, and simplify the usage method of the application of the host.

FIG. 42 is a state transition diagram of the wireless LAN.

The states of the wireless LAN are classified into "Initial/Failed", "Scan", "AP", "STA", and "Association".

"Initial/Failed" indicates the initial state of the wireless LAN; however, when any processing is unsuccessful, the wireless LAN makes a transition to a state identical to the initial state.

"Scan" is a state indicating that a search is being presently carried out by a command. When the search is terminated, and a "SSIDLIST" file is output, the state is returned to the initial state.

"AP" is a state where a wireless LAN is presently being constructed as an access point. "AP" is a state where a command configured to establish an AP of an infrastructure from the initial state is executed or a command configured to start an application which needs to become an AP is executed.

"Association" is a state where association is carried out in order to connect to a wireless LAN as an STA of an infrastructure, and a DHCP server carries out setting of an IP address or the like. When the above processing succeeds, the state makes a transition to a state where connection to the wireless LAN is established as an STA and, when the processing fails, the state is returned to a supplementary-note state.

It should be noted that the current state of the wireless LAN is reflected in the WLAN information of the Wi-Fi SD card status register shown in FIG. 24, and the host can learn the state of the wireless LAN at all times by issuing a command CMD 48, and execute a command corresponding to the current state of the wireless LAN.

Figure 43:
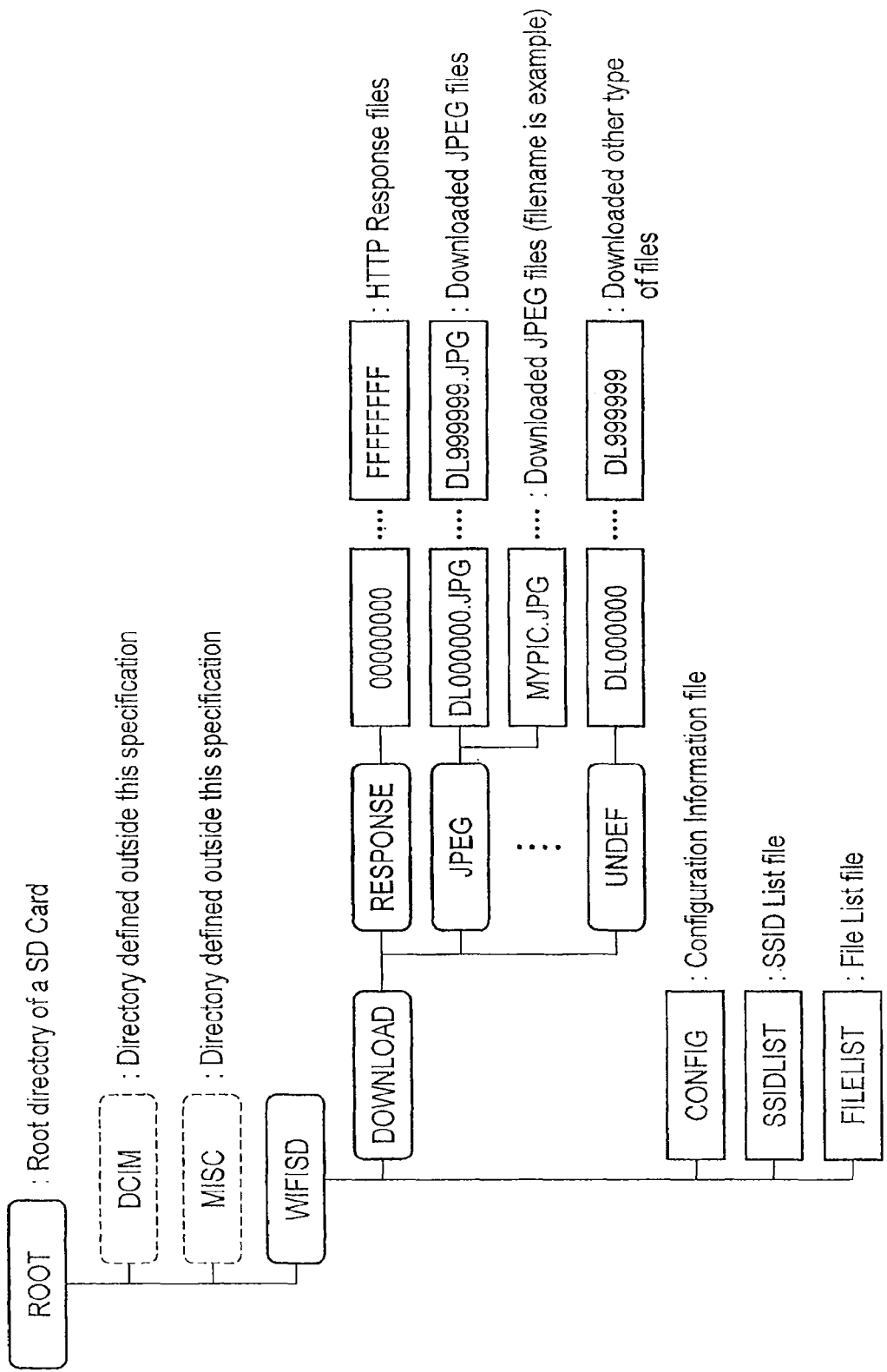
FIG. 43 is a view showing the directory configuration in a Wi-Fi SD card.

FIG. 43 shows the directory configuration in the Wi-Fi SD card.

The "DCIM" directory is a directory configured to record photographic data specified by the Design rule for Camera File system (DCF). Further, the MISC file is a directory configured to record data for photographic print specified by the Digital Print Order Format (DPOF) standard, and other data. The "WIFISD" directory is a directory configured to record data associated with the Wi-Fi SD card in the present embodiment.

Under the "WIFISD" directory, the "DOWNLOAD" directory, "CONFIG" directory, "SSIDLIST" file, and "FILELIST" file are recorded.

The "DOWNLOAD" directory is a directory configured to record an HTTP response message received from a server of the other party. When a "SendHttpMessage" command, "SendHttpFile" command, "SendHttpSSLMessage" command or "SendHttpSSLFile" command is executed, the card transmits an HTTP request message to the server of the other party, and the card saves an HTTP response message from the server of the other party under the "RESPONSE" directory as a file. At this time, an HTTP request line, HTTP message header, and HTTP message body are recorded in the file, and the filename at this time is distinguished from other HTTP response messages by using the "Wi-Fi SD command sequence id" of the issued command, and it becomes possible for the host to refer to the HTTP response message. When a file is to be recorded, it is also possible for the card to analyze the HTTP response message, extract data attached to the HTTP response message, and save the data as another file. For example, when data the MIME type of which is image/jpeg is attached to the HTTP response message, the card recognizes the subtype of the MIME type, and saves the data under the JPEG directory. As the filename at this time, one of specified serial numbers such as "DL000000.JPEG" to "DL999999.JPEG" is used. When filename information about a downloaded file is included in the HTTP response message, the filename may also be used. When data the MIME type of which is unknown is included in the HTTP response message, the whole message is saved in the "UNDEF" directory. As the filename at this time too, one of the specified serial numbers "DL000000" to "DL999999" is used.

The "CONFIG" file is a file configured to record the "Wi-Fi SD Card Configuration Information" shown in FIG. 33, and the host can edit the file. Further, when the host executes the "StartApplication" command to carry out connection to the wireless LAN or construction thereof, setting information of the "Card Configuration Information" is used for the connection thereto and setting thereof.

The "SSIDLIST" file is an output file. When "scanWiFi" command is executed, and when the card outputs a list to a file, a connectable SSID name, signal intensity, and a MAC address of "AP" are stored in the "SSIDLIST" file as a list. The host can select the SSID name to be connected by referring to the list, and can set the selected SSID name by using "SetSSID" command.

The "FILELIST" file is a file formed by recording a list of files (for example, photographic data) which can be transmitted by a sender executing the "P2P [Restricted] Server Application" to a receiver executing the "P2P client Application" as a file. It is possible to record, in the "FILELIST" file, a filepath and filename of a thumbnail file of a file to be transmitted, and a filepath and filename of a metadata file of the file together with a filepath and filename of the file. Thereby, it is possible for the receiver, before carrying out acquisition of a file from the sender, to receive only the thumbnail file, and select and receive only necessary files while confirming the thumbnails. Furthermore, it is possible, before carrying out acquisition of a file, to acquire only the metadata file from the sender, classify acquirable files by using information (for example, photographing time information of photography, photographing location information, photographing equipment information, photographing content information, and the like) included in the metadata file, and provide a hierarchical menu configured to select a file to be acquired to the user. It should be noted that when the thumbnail file and the metadata file are not present, they can be omitted.

FIG. 44 is a view showing a flow of command processing of the Wi-Fi SD card.

1. By writing the "Wi-Fi Command Information" to the Wi-Fi SD card command write register by using the command CMD 49, the host issues the Wi-Fi SD command to the card.

2. When the command is issued, information indicating whether or not the card could have received the issued command is registered by the card in the "Command Response Status" of the Wi-Fi SD card command response status register. Furthermore, when the issued command is an asynchronous command, the information is registered also in the "Command Response Status" of the Wi-Fi SD card asynchronous command response status register.

3. The host can read the "Command Response Status" of the Wi-Fi SD card command response status register or the Wi-Fi SD card asynchronous command response status register by using the command CMD 48, and confirm whether the card could have received the command issued by the host or the card could not have received the command for some reason (that there has been an error in the issued command and argument or that the card has already been in the process of processing of a command, and hence the card has been in a state where the card could not have received a new command).

4. Furthermore, the host can read the "Command Response Status" of the Wi-Fi SD card command response status register or the Wi-Fi SD card asynchronous command response status register by using the command CMD 48, and confirm the processing state (the command is in an unprocessed state, in an in-process state, in a successful state after the processing, in an unsuccessful state after the processing or in a process-suspended state) of the command issued by the host.

5. Commands for which processing has already completed may successively be deleted from the Wi-Fi SD card command response status register or the Wi-Fi SD card asynchronous command response status register, and commands which will later need to be referred to may be kept as they are. Further, as a result of completion of the command processing, the information items of the "Media Change", "SSID List Update", "File List Update", "Response Data Update", and the like of the Wi-Fi SD card status register are updated.

Here, the Wi-Fi SD card command response status register or the Wi-Fi SD card asynchronous command response status register can be implemented in the queue form. Thereby, it is possible for the host to issue a command at a timing determined by the host by previously learning the number of commands which can be received by the card. The card accepts issuance of commands from the host by the number corresponding to the number of commands which the card can receive, and does not accept commands of the number exceeding the above number. The card processes the commands in order of reception. It becomes possible for a command for which processing has already been completed to be deleted from the queue. If the host issues additional commands, all the processing-completed commands are deleted from the queue. Accordingly, it becomes possible for the card to accept commands of the number corresponding to the number of deleted commands.

FIG. 50 is a view showing a flow of the command response.

(1) Initially the Command Response Status is in the "initial" state. If the Card accepts the command, the status enters the "Command Processing" state. If rejected (for example, the Card is busy, the Card doesn't support the command, etc), the status enters the "Command Rejected" state, and "CRU (Command Response Update)" and "CRE (Command Response Error)" in the Status Register are set to "1b". (Initial state may be skipped depending on the timing of status registration)

(2) The host device confirms whether the issued command is accepted or rejected by reading the Command Response Status and the Error Status.

(3) The Card processes the issued commands sequentially in the order in the Wi-Fi SD Card Command Write Register Data if the Card accepts plural commands.

(4) If the Card finishes the command processing successfully, the status enters the "Process Succeeded" state, and "CRU (Command Response Update)" in the iSDIO Status is set to "1b". If failed, for example, network error, argument error, file system error (file not found, file open/close error etc), the status enters the "Process Failed" state, and "CRU (Command Response Update" and "CRE (Command Response Error)" in the Status Register are set to "1b". (Command Processing state may be skipped depending on the processing speed)

(5) While the command is registered in the queue, the host device may terminate the command by issuing the "Abort" command. If the Card is able to accept the termination, the status enters the "Process Terminated" state, and "CRU (Command Response Update)" in the iSDIO Status is set to "1b".

(6) The host device confirms whether the command processing has succeeded or failed by reading the Command Response Status.

Figure 45:
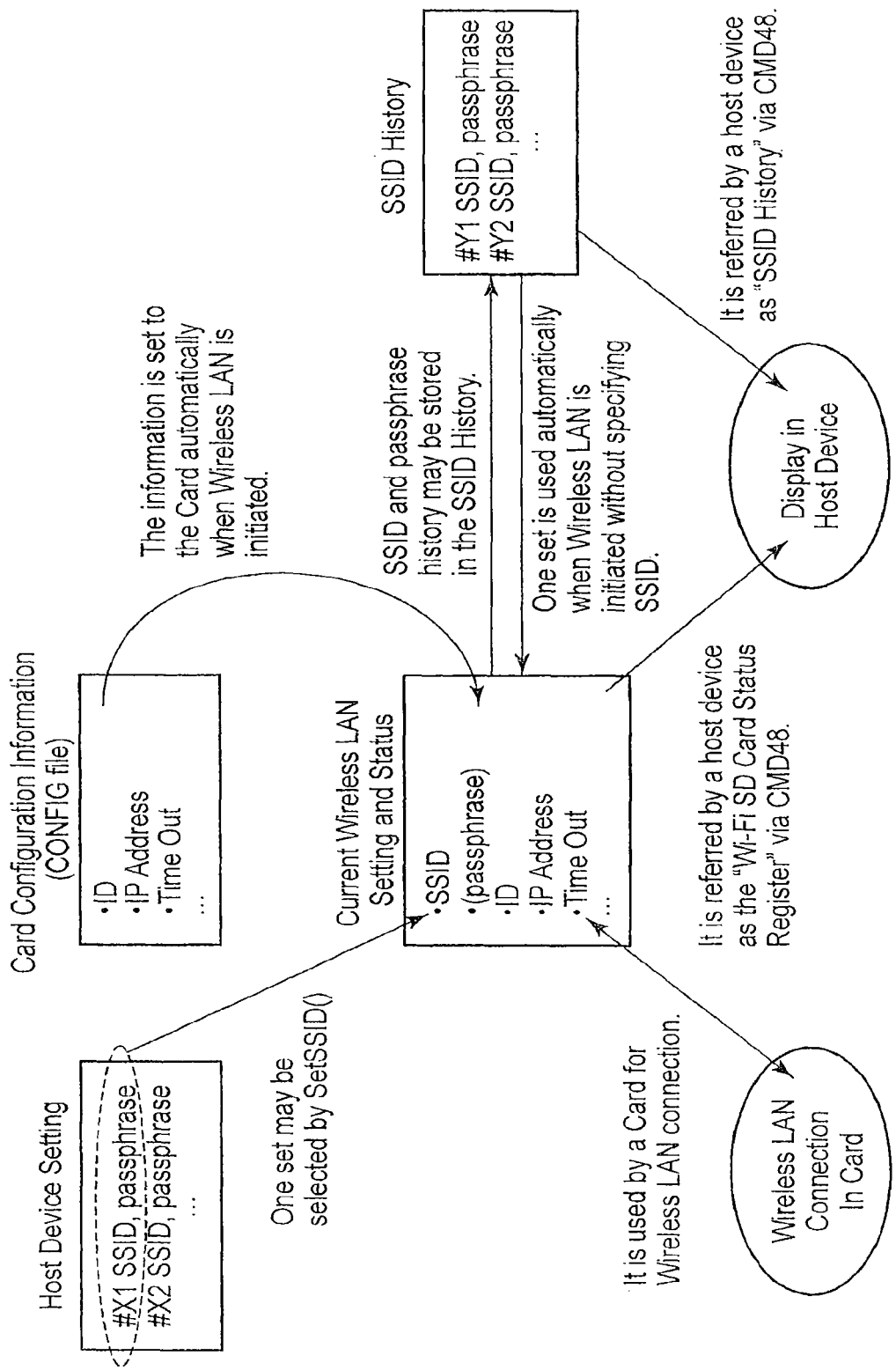
FIG. 45 is a view showing a flow of setting of a Wi-Fi SD card.

FIG. 45 is a view showing a flow of setting of the Wi-Fi SD card.

When the "CONFIG" file is not present in the card, the host creates a "CONFIG" file including the "Card Configuration Information". At this time, a value (initial value when there is no value to be designated) designated by the host is set to each information item in the "Card Configuration Information". When a wireless LAN is connected to the card or is constituted, the values set to the "Card Configuration Information" are automatically set to the card. When the "CONFIG" file is not present, the card operates on the premise that an initial value is set to the "Card Configuration Information".

However, regarding the SSID and passphrase, the host needs to execute the "SetSSID" command to set the SSID and passphrase recorded in the host before connecting to the wireless LAN or constructing a wireless LAN. This is because the passphrase is recorded in the file in order to prevent the passphrase from flowing out to the outside.

How the set SSID, and information items of the "Card Configuration Information" are set after the connection to the wireless LAN or construction of a wireless LAN can be learned by referring to the Wi-Fi SD card status register by using the command CMD 48.

Furthermore, the history of the set SSID is recorded in the card together with the passphrase and MAC address of "AP" and, even when information associated with the SSID is not set by using the "SetSSID" command, it is possible to carry out wireless LAN connection/construction by using the past history. It should be noted that regarding this information, the Wi-Fi SD card SSID history register can be referred to by using the command CMD 48, and regarding an unnecessary SSID (for example, an SSID currently nonexistent), a specific SSID can be deleted from the Wi-Fi SD card SSID history register by using the "RemoveSSID" command.

Figure 46:
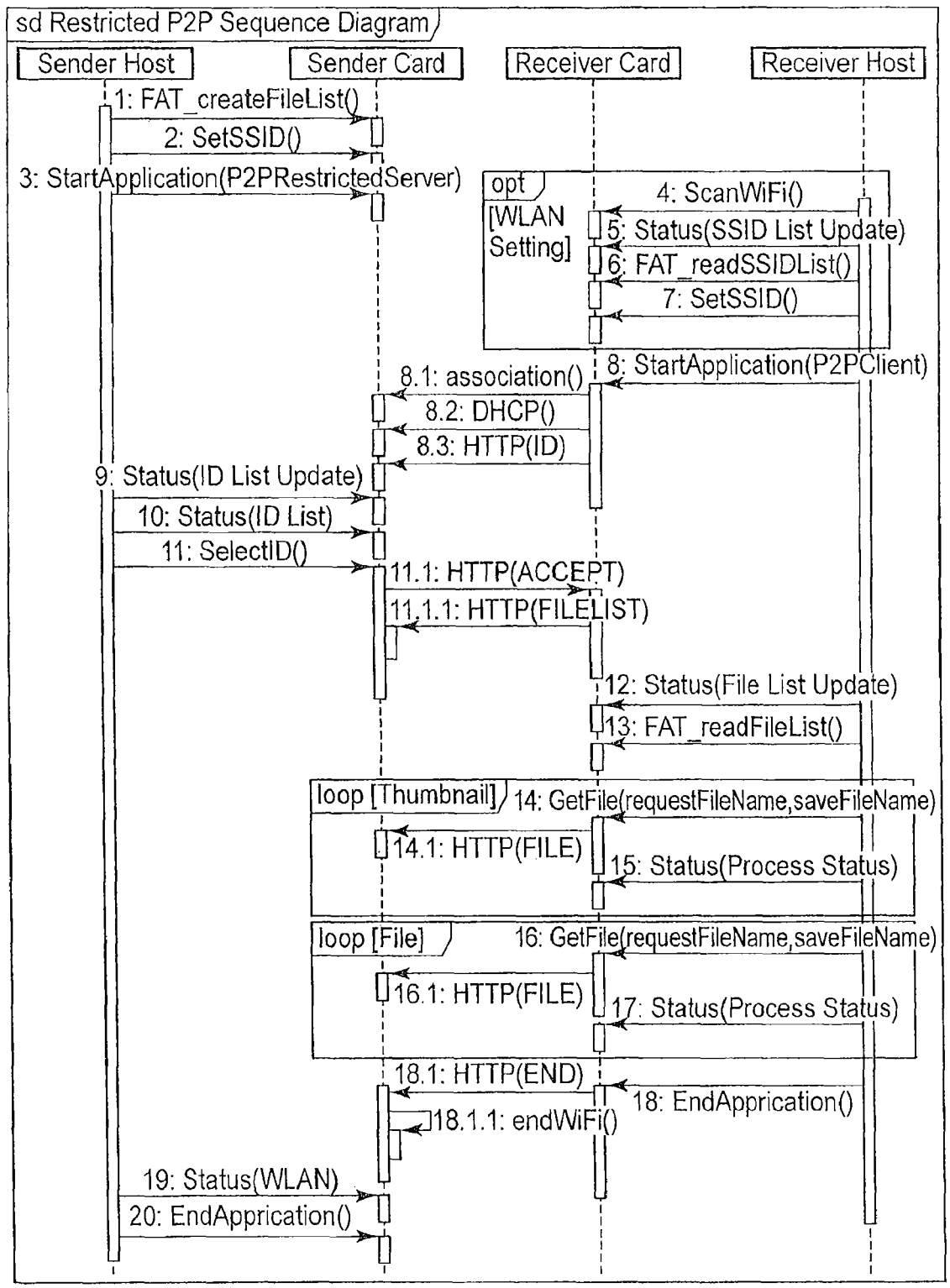
FIG. 46 is a view showing a flow of the P2P application.

FIG. 46 is a view showing a flow of the P2P application.

1: The sender host creates a "FILELIST" file obtained by forming names of files which can be accessed by the receiver card into a list.

2: In order to construct a wireless LAN, the sender host issues a "SetSSID" command by using a command CMD 49 to set the SSID name, passphrase, and authentication system to the sender card.

3: In order to start the "P2P Restricted Server Application" or the "P2P Server Application", the sender host issues the "StartApplication" command through the command CMD 49.

4: In order to search for a wireless LAN to which the receiver card can connect, the receiver host issues the "ScanWiFi" command by using the command CMD 49.

4.1: In order to connect to the wireless LAN, the receiver card carries out a search (not shown).

4.1.1: The receiver card creates an "SSIDLIST" file obtained by forming names of SSIDs to which the receiver card can be connected into a list in the card (not shown).

5: The receiver host reads the "SSID List Update" of the Wi-Fi SD card status register by using the command CMD 48 to confirm that the search for the wireless LAN carried out by the receiver card has been completed without any problem.

6: The receiver host reads the "SSIDLIST" file in the card.

7: The receiver host selects an SSID from the "SSIDLIST" file, and issues the "SetSSID" command by using the command CMD 49 in order to set the SSID and passphrase to the receiver card. Here, when the receiver host does not carry out the selection of the SSID, the receiver card uses the setting of the SSID in the "SSID History" recorded in the card, and set in the past. Further, it is also possible to carry out SSID setting for both the receiver card, and the sender card by the WPS.

8: In order to start the "P2P Client Application", the receiver host executes the "StartApplication" command by using the command CMD 49.

8.1: The receiver card requests association from the sender card.

8.2: When the receiver card connects to the sender card, the receiver card requests the sender card which is a DHCP server to carry out IP address assignment.

8.3: When the IP address is assigned to the receiver card, the receiver card transmits, to the sender card, the following HTTP request message configured to notify the sender card of the ID of the receiver. Here, as the "ReceiverID", the "ID" of the receiver is set, as the "ReceiverMACaddress", the MAC address of the receiver is set, and as the "SenderIPaddress", the IP address of the sender is set.

```
GET http://SenderIPaddress/command.cgi?op=0&id=Receiver
    ID&mac=ReceiverMACaddress
```

9: The sender host reads the "ID List Update" of the Wi-Fi SD card status register by using the command CMD 48, and confirms that the "ID List" is updated. (In the case of the P2P Restricted Server application not restricting the other party of reception, this processing can be omitted.)

10: When the "ID List" is updated, the sender host reads the Wi-Fi SD card ID list register by using the command CMD 48. (In the case of the P2P Restricted Server application not restricting the other party of reception, this processing can be omitted.)

11: The sender host issues the "SelectID" command by using the command CMD 49, and selects the ID of a receiver to be permitted to carry out reception from receiver IDs in the list. (In the case of the P2P Restricted Server application not restricting the other party of reception, this processing can be omitted.)

11.1: The sender card transmits the following HTTP request message to the sender card to notify the receiver card that reception has been permitted. Here, the "ReceiverIPaddress" indicates the IP address of the receiver. (In the case of the P2P Restricted Server application not restricting the other party of reception, this processing can be omitted.)

```
GET http://ReceiverIPaddress/command.cgi?op=1
```

11.1.1: If reception is permitted, the receiver card transmits the following HTTP request message to the sender card in order to download the "FILELIST" file from the sender card. Here, the "SenderIPaddress" indicates the IP address of the sender. (In the case of the P2P Restricted Server application not restricting the other party of reception, this processing is carried out on the premise that reception is permitted.)

12: The receiver host reads the "File List Update" of the Wi-Fi SD card status register to confirm that the download of the "FILELIST" file has been completed.

13: The receiver host reads the "FILELIST" file in the card.

14: The receiver host issues the "GetFile" command by using the command CMD 49, and instructs the receiver card to carry out a download of the thumbnail file and metadata file on the basis of the information (URL) written to the "FILELIST" file.

14.1: The receiver card transmits the following HTTP request message to the sender card, and downloads the designated thumbnail file or metadata file to record the file in the card. Here, the "SenderIPaddress" indicates the IP address of the sender, and the "filepath" indicates the filepath, and the "filename" indicates the filename.

```
GET http://SenderIPaddress/filepath/filename
```

15: The receiver host reads the "Current HTTP" of the Wi-Fi SD card status register or the "Command Response Status" of the Wi-Fi SD card command response status register by using the command CMD 48, and confirms that the download of the thumbnail file or the metadata file has been completed. The above-mentioned process is repeated the number of times corresponding to the number of the thumbnail files or the metadata files.

16: The receiver user selects a file to be received by using the thumbnail file or the metadata file acquired in advance. The receiver host issues the "GetFile" command by using the command CMD 49, and instructs the receiver card to download the file selected by the user on the basis of information (URL) described in the "FILELIST" file.

16.1: The receiver card transmits the following HTTP request message to the sender card, downloads the designated file, and records the file in the card. Here, the "SenderIPaddress" indicates the IP address of the sender, the "filepath" indicates the filepath, and the "filename" indicates the filename.

```
GET http://SenderIPaddress/filepath/filename
```

17: The receiver host reads the "Current HTTP" of the Wi-Fi SD card status register or the "Command Response Status" of the Wi-Fi SD card command response status register by using the command CMD 48, and confirms that the download of the file designated by the user has been completed. The above-mentioned process is repeated the number of times corresponding to the number of files designated by the user.

18: When the download of all the files carried out by the receiver card is completed, the receiver host issues the "EndApplication" command by using the command CMD 49, and instructs the receiver card to terminate the application, and terminate connection to the wireless LAN.

18.1: The receiver card transmits the following HTTP request message to the sender card to notify the sender card that the download has been completed. Here, the "SenderIPaddress" indicates the IP address of the sender.

```
GET http://SenderIPaddress/command.cgi?op=3
```

18.1.1: Completion of download has been notified from all the connected receiver cards, and the sender card terminates the construction of the wireless LAN.

19: The sender host reads the "WLAN" of the Wi-Fi SD card status register by using the command CMD 48, and confirms that the construction of the wireless LAN has been terminated.

20: When the construction of the wireless LAN has been terminated, the sender host issues the "EndApplication" command to instruct the sender card to terminate the application.

Figure 47:
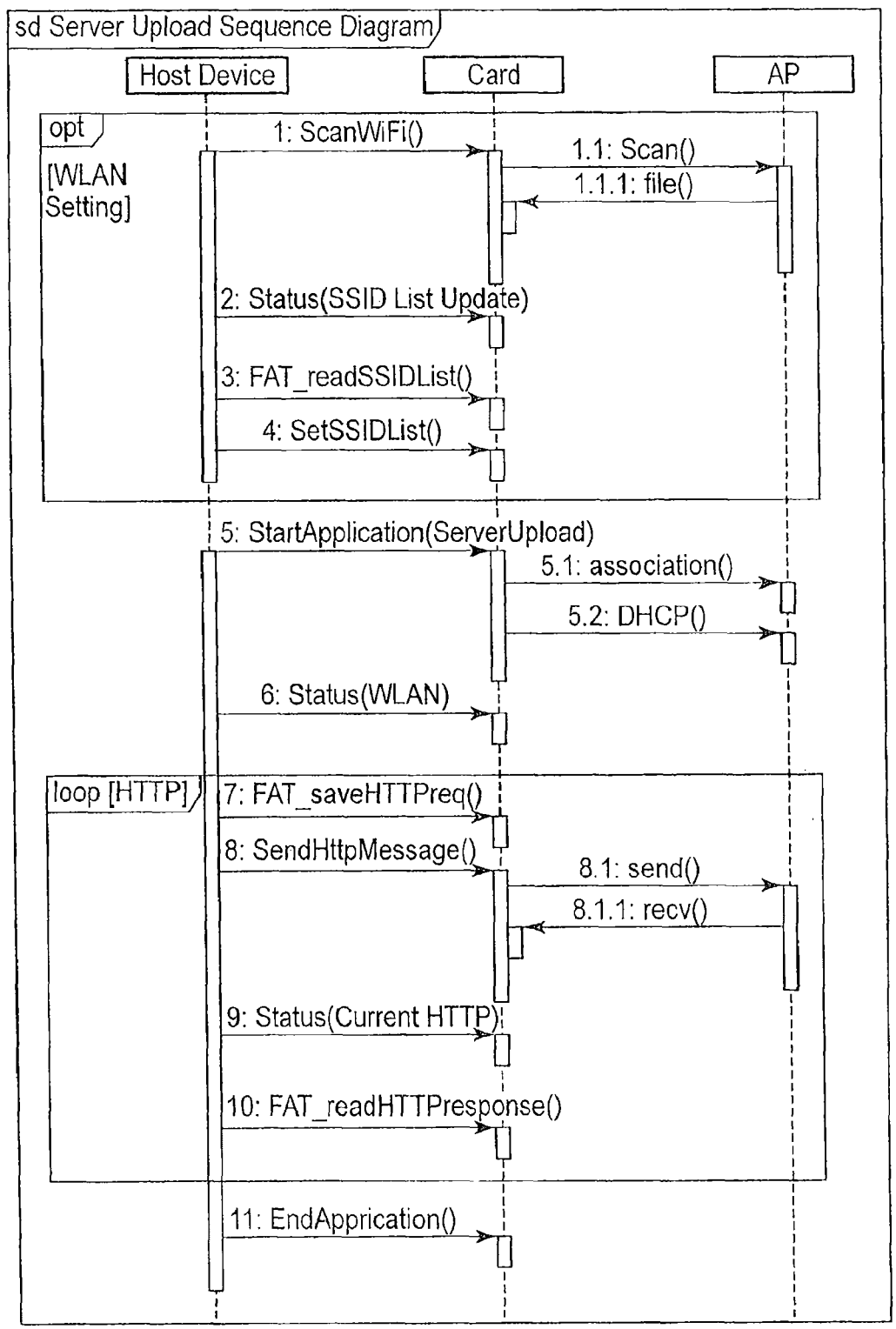
FIG. 47 is a view showing a flow of the Server Upload application.

FIG. 47 is a view showing a flow of the Server Upload application.

1: In order to search for a wireless LAN to which the host device can connect, the host issues the "ScanWiFi" command by using the command CMD 49.

1.1: In order to connect to the wireless LAN, the card carries out a search.

1.1.1: The card creates an "SSIDLIST" file obtained by forming names of SSIDs to which the card can be connected into a list in the card.

2: The host reads the "SSID List Update" of the Wi-Fi SD card status register by using the command CMD 48 to confirm that the search for the wireless LAN carried out by the card has been completed without any problem.

3: The host reads the "SSIDLIST" file in the card.

4: The host selects an SSID from the "SSIDLIST" file, and issues the "SetSSID" command by using the command CMD 49 in order to set the SSID and passphrase to the card. Here, when the host does not carry out the selection of the SSID, the card uses the setting of the SSID in the "SSID History" recorded in the card, and set in the past. Further, it is also possible to carry out SSID setting for both the card, and the "AP" connected thereto by the "WPS".

5: In order to start the Server Upload Application, the host executes the "StartApplication" command by using the command CMD 49.

5.1: The card requests association from the "AP".

5.2: When the card connects to the "AP", the card requests the "AP" which is a DHCP server to carry out IP address assignment.

6: The host reads the "WLAN" of the Wi-Fi SD card status register, and confirms that the connection to the wireless LAN is in progress without any problem.

7: When the "SendHttpMessage" command, "SendHttpFile" command, "SendHttpSSLMessage" command or "SendHttpSSLFile" command is issued, the host creates a file including the contents of an HTTP request message to be transmitted to the server of the other party in the card. On the other hand, when the "SendHttpMessageByRegister" command, "SendHttpFileByRegister" command, "SendHttpSSLMessageByRegister" command or "SendHttpSSLFileByRegister" command is issued, the host creates an HTTP request message to be transmitted to the server of the other party not in a file, but in the memory in the host device.

8: The host issues the "SendHttpMessage" command, "SendHttpFile" command, "SendHttpSSLMessage" command, "SendHttpSSLFile" command, "SendHttpMessageByRegister" command, "SendHttpFileByRegister" command, "SendHttpSSLMessageByRegister" command or "SendHttpSSLFileByRegister" command by using the command CMD 49 to instruct the card to transmit an HTTP request message.

8.1: The card reads the HTTP request message from a file created in the card or from the Wi-Fi SD card command write register, and transmits the HTTP message to the server of the other party. At this time, in the case of the "SendHttpFile" command, "SendHttpSSLFile" command, "SendHttpFileByRegister" command or "SendHttpSSLFileByRegister" command, transmission of the HTTP request message is carried out by shifting a specific character string in the HTTP request message to a designated file in the card, i.e., by attaching the file in the card to the HTTP request message.

8.1.1: The other party server returns an HTTP response message to the card in response to the transmitted HTTP request message. Here, in the case where the card has issued the "SendHttpMessage" command, "SendHttpFile" command, "SendHttpSSLMessage" command or "SendHttpSSLFile" command, the card records the HTTP response message in the card as a file. On the other hand, in the case where the card has issued the "SendHttpMessageByRegister" command, "SendHttpFileByRegister" command, "SendHttpSSLMessageByRegister" command or "SendHttpSSLFileByRegister" command, the card records the HTTP response message in the "message" of the Wi-Fi SD card response data register.

9: The host reads the "Current HTTP" of the Wi-Fi SD card status register or the "Command Response Status" of the Wi-Fi SD card command response status register by using the command CMD 48 to confirm that the transmission of the HTTP request message, and the reception of the HTTP response message have been completed.

10: The host reads the HTTP response message recorded in the file. Alternatively, the host reads the HTTP response message recorded in the HTTP response message by using the command CMD 48. The above-mentioned process is repeated the number of times corresponding to the number of the files designated by the user.

11: The host issues the "EndApplication" command by using the command CMD 49 to instruct the card to terminate the application, and connection to the wireless LAN.

Figure 48:
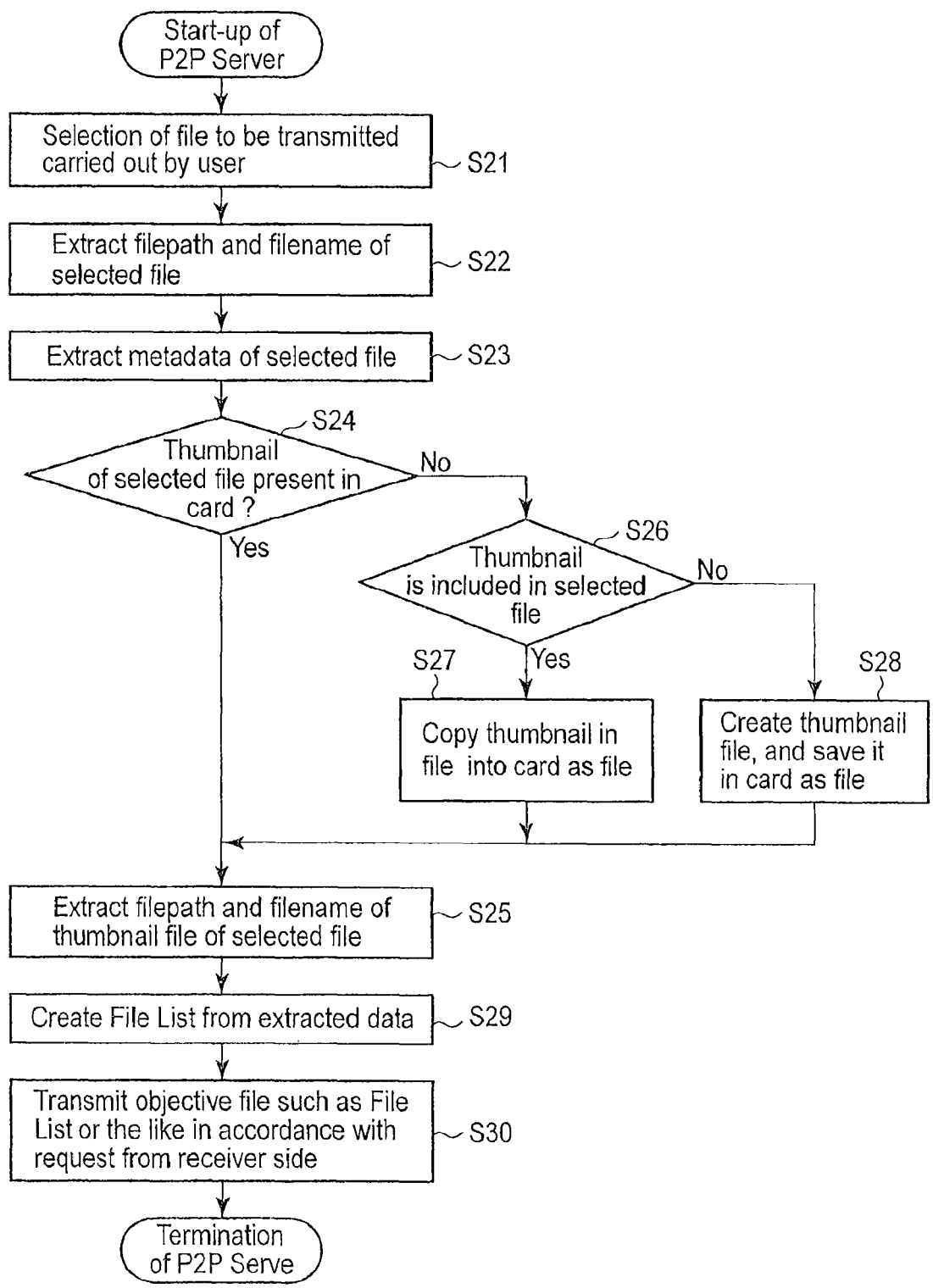
FIG. 48 is a view showing a flow of "File List" generation processing and file transmission processing of a sender side host in the P2P application.

FIG. 48 is a view showing a flow of "File List" generation processing and file transmission processing of a sender side host in the P2P application.

The sender host starts the P2P Server application or the P2P Restricted Server application.

Furthermore, the sender host displays a menu configured to select a file to be transmitted to the user, and the sender user selects a file to be transmitted according to the menu (S21).

The sender host extracts a filepath, and filename of the selected file (S22). Furthermore, the sender host extracts metadata of the selected file (S23).

Here, when a metadata file of the selected file is present, a filename and filepath of the metadata file are extracted.

On the other hand, regarding the thumbnail, the sender host first confirms whether or not a thumbnail of the selected file is present in the card (S24). If the thumbnail is present therein, the sender host extracts a filepath, and filename as a thumbnail file for transmission (S25). Next, if the thumbnail is not present, the sender host confirms whether or not a thumbnail is included in the file (S26) and, if a thumbnail is included therein, the sender host copies the thumbnail into the card as a thumbnail file for transmission, and extracts a filepath, and filename from the file (S27). If a thumbnail is not included in the file, the sender host creates a thumbnail of the file, saves the thumbnail in the card, and extracts a filepath, and filename (S28).

The sender host creates a "FILELIST" file from the extracted data described above, and saves the file in the card (S29).

The sender card transmits the "FILELIST" file to the receiver card in accordance with a request from the receiver card (S30). Furthermore, the sender card transmits a file described in the "File List" to the receiver card in accordance with a request from the receiver card.

When the transmission is completed, the sender host terminates the P2P Server application or the P2P Restricted Server application.

Figure 49:
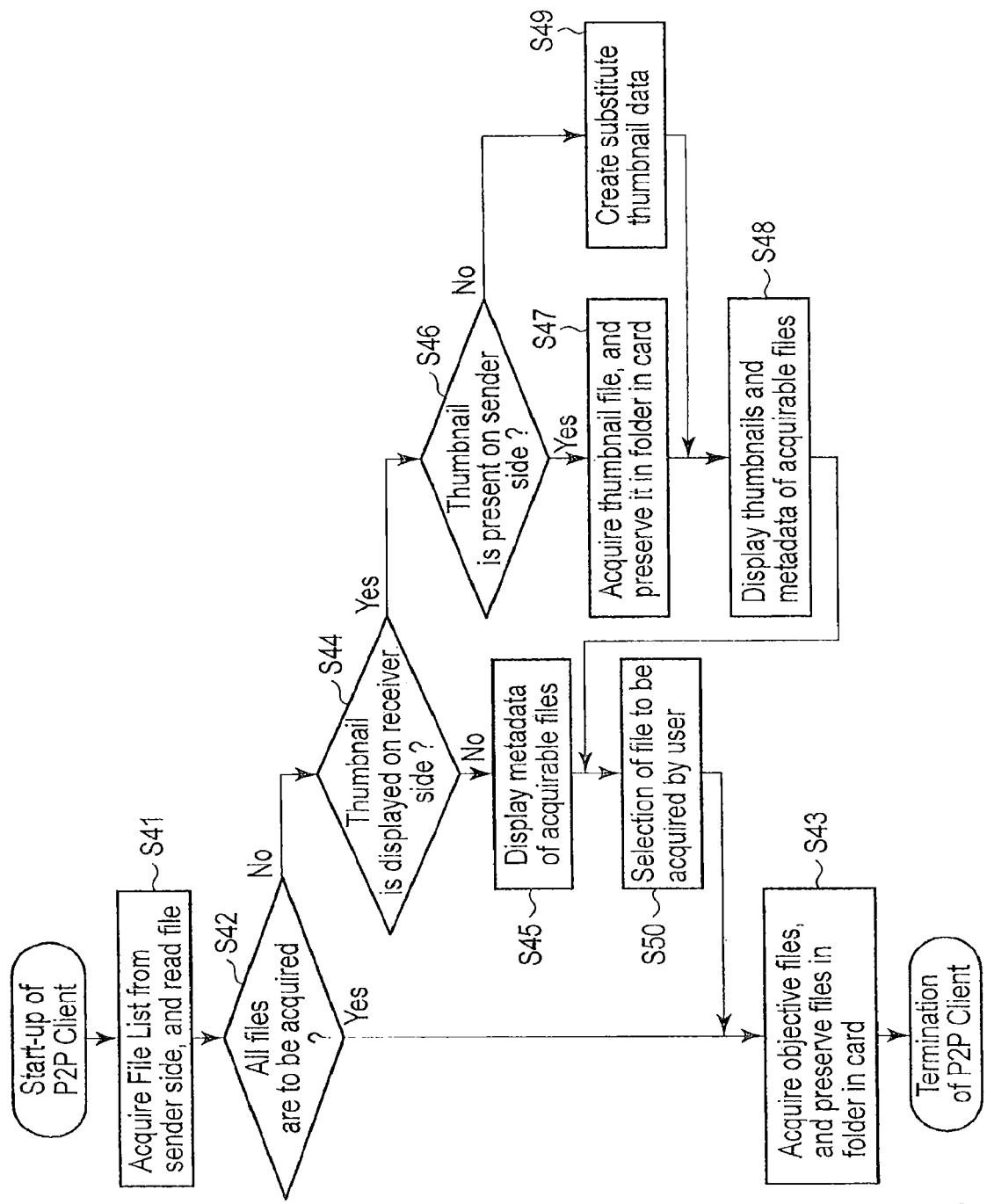
FIG. 49 is a view showing a flow of file selection processing and file acquisition processing of a receiver side host in the P2P application.

FIG. 49 is a view showing a flow of file selection processing and file acquisition processing of a receiver side host in the P2P application.

The receiver host starts the P2P Client application.

Furthermore, after the receiver card acquires a "File List" from the sender card, the receiver host reads the "File List" (S41).

When the receiver user desires to acquire all the files of the sender card, the receiver user downloads all the files described in the "File List" from the sender side, and preserves the files in a folder in the receiver card (S42, S43).

When the receiver user desires to select and acquire part of the files from the sender side card, the receiver host provides a menu for file selection to the receiver user.

At this time, when a thumbnail is not shown in the menu, metadata of an acquirable file is displayed on the menu (S44, S45).

When the thumbnail is shown in the menu, if a thumbnail file is present in the sender card, the receiver host acquires the thumbnail file, and displays thumbnails and the metadata of the acquirable file on the menu (S46, S47, S48). If a thumbnail file is not present in the sender card, the receiver host or the receiver card creates a substitute thumbnail (S49), and displays the thumbnails and metadata of the acquirable file on the menu (S48).

Here, if a metadata file is present in the sender card like the thumbnail file, the receiver host may acquire the metadata file, and may display more detailed metadata on the menu by referring to the metadata file.

The receiver user selects a file to be acquired on the basis of the displayed menu (S50).

The receiver host downloads the selected file from the sender card, and saves the file in a folder in the receiver card (S43).

When the reception is completed, the receiver host terminates the P2P Client application.

According to the above-mentioned embodiments, the following advantages can be obtained.

A number of card manufacturers implement arbitrary functions in the SD cards, and hence the types of communication functions incorporated in the SD cards have a wide range. In order to control these communication functions, it is necessary to assign definitions for various control items to the command space of the SD card. However, the communication functions range widely, and hence if definitions for control of all the communication functions are established, the address space of command becomes insufficient. Conversely, according to the above embodiment, the communication function possessed by the SD card is controlled by using an extension register constituted of a plurality of pages, and hence by defining a page used for delivery of data which is the communication object, it is possible to efficiently assign definitions for control of the communication functions to the command space.

Further, according to the above embodiment, it is possible to easily control the communication functions by using an extension register designated by the command (CMD 48, CMD 49).

Furthermore, it is possible even for a memory host controller to efficiently control the extension register by using the command (CMD 48, CMD 49).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system being connectable to a host device and an external device other than the host device, the system comprising:
   a host interface to connect to the host device;
   a wireless network interface to connect to the external device;
   a nonvolatile memory which can store data from the host device and the external device;
   a controller which controls the nonvolatile memory to write and read data in response to a request from the host device via the host interface;
   a wireless communication module configured to transmit data stored in the nonvolatile memory to the external device or to receive data from the external device via the wireless network interface with a wireless communication; and
   a register including a plurality of pages,
   wherein the controller processes a first command to read data from the register, and processes a second command to write data to the register,
   wherein a specific page of the register stores information indicating a number of one or more functions,
   wherein the register includes a first address region to which a first function of the wireless communication is assigned and a second address region to which a second function of the wireless communication is assigned, the first address region and the second address region being located at different pages of the register, and wherein the register further includes a first data port associated with the first function and a second data port associated with the second function.

2. The system according to claim 1, wherein the wireless communication module transmits data stored in the nonvolatile memory to the external device and receives data from the external device via the wireless network interface with a wireless communication through the first data port and the second data port.

3. The system according to claim 1, wherein the register further includes a Wi-Fi register by accessed the host interface and associated with a wireless communication specification.

4. The system according to claim 1, wherein the first command is a command to read data from the register in a unit of block, and
the second command is a command to write data to the register in a unit of block.

5. The system according to claim 1, wherein the wireless network interface includes a physical layer of IEEE802.11b/g/n.

6. The system according to claim 1, wherein the wireless network interface includes a network layer of IPv4 or IPv6.

7. The system according to claim 1, wherein the wireless network interface includes a transport layer of TCP.

8. The system according to claim 1, wherein the wireless network interface includes a presentation layer of SSL/TLS.

9. The system according to claim 1, wherein the wireless network interface includes an application layer of HTTP or FTP.

10. The system according to claim 1, wherein the wireless network interface includes a digital living network alliance (DLNA) function.

11. The system according to claim 1, wherein he external device is an external server, and
data through the first data port or the second data port is data downloaded from the external server.

12. The system according to claim 1, wherein the register further includes:
a first register which indicates a wireless communication function to support;
a second register for writing a third command to perform the wireless communication;
a third register for reading a processing state of the third command; and
a fourth register for reading an execution result of the third command.

13. The system according to claim 12, wherein the third command is constituted by one or more commands, and
the controller writes a processing state to the third register while a command written to the second register is sequentially processed, and writes one or more responses corresponding to a command which execution has completed, to the fourth register.

14. The system according to claim 13, wherein the third command controls the wireless communication function, and the controller transfers a file stored in the nonvolatile memory or data stored in the second register, to a server, and writes a response supplied from the server to a file stored in the nonvolatile memory or to the fourth register.

15. The system according to claim 1, wherein the system is conformed to at least one of an SD card specifications.

16. The system according to claim 15, wherein the system is capable of being inserted to a digital steel camera which has no wireless communication function.

* * * * *